(12) United States Patent
Tsuji et al.

(10) Patent No.: US 11,934,821 B2
(45) Date of Patent: Mar. 19, 2024

(54) DEVICE MANAGEMENT SYSTEM AND NON-TRANSITORY COMPUTER-READABLE STORAGE MEDIUM STORING DEVICE MANAGEMENT PROGRAM

(71) Applicant: KYOCERA Document Solutions Inc., Osaka (JP)

(72) Inventors: Chika Tsuji, Osaka (JP); Hisakazu Nishiyama, Osaka (JP); Jumpei Takagi, Osaka (JP); Atsushi Matsumoto, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 86 days.

(21) Appl. No.: 17/558,808

(22) Filed: Dec. 22, 2021

(65) Prior Publication Data

US 2022/0210288 A1    Jun. 30, 2022

(30) Foreign Application Priority Data

Dec. 28, 2020   (JP) .................................. 2020-219027
Dec. 28, 2020   (JP) .................................. 2020-219030

(51) Int. Cl.
  *G06F 8/65*        (2018.01)
  *G06F 9/48*        (2006.01)
  *G06F 8/654*       (2018.01)

(52) U.S. Cl.
  CPC .............. *G06F 8/65* (2013.01); *G06F 9/4825* (2013.01); *G06F 9/485* (2013.01); *G06F 8/654* (2018.02)

(58) Field of Classification Search
  CPC ..... G06F 8/60–66; G06F 9/485; G06F 9/4825

(Continued)

(56) References Cited

U.S. PATENT DOCUMENTS

2006/0168575 A1*   7/2006   Bhatt ........................ G06F 8/65
                                                             717/168
2018/0060061 A1*   3/2018   Savagaonkar ............ G06F 8/65
2019/0196805 A1*   6/2019   Lee ..................... G06F 21/6209

FOREIGN PATENT DOCUMENTS

JP        2002-288066        10/2002
JP        2004-139572         5/2004

(Continued)

OTHER PUBLICATIONS

Xia, Tong, et al., Safe Velocity: A Practical Guide to Software Deployment at Scale using Controlled Rollout, IEEE/ACM 41st International Conference on Software Engineering: Software Engineering in Practice, 2019, 10 pages, [retrieved on May 17, 2023], Retrieved from the Internet: <URL:http://ieeexplore.ieee.org/>.*

(Continued)

*Primary Examiner* — Geoffrey R St Leger
(74) *Attorney, Agent, or Firm* — LEX IP MEISTER, PLLC

(57) ABSTRACT

A device management system includes an automatic updater that automatically generates an automatic F/W update task in accordance with an automatic F/W update plan which is a setting for automatically generating the automatic F/W update task as a task for updating firmware of an image forming apparatus. The automatic F/W update plan includes specifying of firmware for update and a mode in which the update is fully executed on all electronic apparatuses of a target of the software update. The automatic updater automatically generates the automatic F/W update task in accordance with the automatic F/W update plan at a specific timing in a repeat manner.

13 Claims, 46 Drawing Sheets

(58) Field of Classification Search
USPC .................................................. 717/168–178
See application file for complete search history.

(56) References Cited

FOREIGN PATENT DOCUMENTS

JP          2008-065505          3/2008
WO       WO-2015184179 A1 * 12/2015     ............... G06F 8/60

OTHER PUBLICATIONS

Ashfaque, Akond, et al., Synthesizing Continuous Deployment Practices Used in Software Development, Agile Conference, 2015, 10 pages, [retrieved on Dec. 1, 2023], Retrieved from the Internet: <URL:http://ieeexplore.ieee.org/>.*

* cited by examiner

FIG. 4

24f DEVICE INFORMATION

| DEVICE ID | GROUP ID | MEDIATION DEVICE ID | MODEL | PERMITTED/ PROHIBITED | RELEASE TYPE | F/W VERSION | ... |
|---|---|---|---|---|---|---|---|
| D0001 | G0001 | | M0001 | PERMITTED | OFFICIAL | 1.01 | ... |
| D0002 | G9001 | D9001 | M0002 | PERMITTED | OFFICIAL | 2.01 | ... |
| ... | ... | ... | ... | ... | ... | ... | ... |

24j AUTOMATIC F/W UPDATE PLAN

| TARGET F/W PACKAGE | P0001 |
|---|---|
| TARGET GROUP | All Accessible (DELEGATED GROUP 71) |
| AUTOMATIC F/W UPDATE MODE | GRADUAL UPDATE |
| ENABLE/DISABLE | ENABLE |

| | PROGRESS |
|---|---|
| FIRST WEEK | 2% |
| SECOND WEEK | 15% |
| THIRD WEEK | 50% |
| FOURTH WEEK | 100% |

FIG. 10

24n TASK INFORMATION

| TASK ID | GENERATION DATE AND TIME | TASK TYPE | Status | TARGET DEVICE | RELATED PLAN | ... |
|---|---|---|---|---|---|---|
| T0001 | 2020/12/01 10:00:00 | AUTOMATIC F/W UPDATE TASK | PENDING | D0001 | PL0001 | ... |
| T0002 | 2020/12/01 10:01:01 | MANUAL F/W UPDATE TASK | EXECUTING | D0002 | ... | ... |
| ... | ... | ... | ... | ... | ... | ... |

FIG. 22

AUTOMATIC F/W UPDATE SETTING — 610
- 611 ○ ON
- 612 ○ OFF
- 613 ● SELECT

PLAN PERMITTED/PROHIBITED — 620

| 621a | 621b | 621c |
|---|---|---|
| PL0001 | ● PERMITTED | ○ PROHIBITED |
| PL0003 | ○ PERMITTED | ● PROHIBITED |
| ⋮ | ⋮ | ⋮ |

— 621

NOTIFICATION SETTING — 622

- 622a: U0001, U0002, ⋮
- 622b: U0005 ▼
- 622c: ADD
- 622d: DELETE

EXECUTE F/W UPDATE TEST — 623

- AUTOMATIC F/W UPDATE PLAN: PL0001 ▼ — 623a
- IMAGE FORMING APPARATUS: D0001 ▼ — 623b
- EXECUTION OF TEST — 623c

EXECUTION TIME ZONE SETTING — 630

DAY SETTING — 640
- 641 ○ EVERY DAY
- 642 ● DAY OF THE WEEK
- 643: ☐ MON. ☐ TUE. ☐ WED. ☐ THU. ☐ FRI. ☑ SAT. ☑ SUN.
  (643a, 643b, 643c, 643d, 643e, 643f, 643g)

TIME ZONE SETTING — 650
- From 21:00 ▼ to 24:00 ▼ (651, 652)

PRE-PRINT SETTING — 660

PRE-PRINT ON/OFF — 661
- 661a ● ON
- 661b ○ OFF

LANGUAGE SETTING — 662
- LANGUAGE SET IN ITS DELEGATED GROUP ▼ — 662a

671 CANCEL    SAVE 672

600

| SUCCESS | SKIP | FAILURE | NOT TARGET | EXECUTION WAITING | TOTAL |
|---|---|---|---|---|---|
| 2 | 0 | 0 | 1 | 2 | 5 |

| CYCLE | DAY | IMAGE FORMING APPARATUS | | | | | | | | SUCCESS | SKIP | FAILURE | NOT TARGET | EXECUTION WAITING | TOTAL |
|---|---|---|---|---|---|---|---|---|---|---|---|---|---|---|---|
| | | A | B | C | D | E | F | G | H | | | | | | |
| 1 | 1 | SUCCESS | NOT EXECUTED | NOT EXECUTED | NOT MANAGED | SUCCESS | NOT PERMITTED | NOT EXECUTED | NOT EXECUTED | 2 | 0 | 0 | 1 | 4 | 7 |
| 1 | 2 | — | SUCCESS | — | NOT MANAGED | — | — | — | — | 3 | 0 | 0 | 1 | 3 | 7 |
| 1 | 3 | — | — | FAILURE | NOT MANAGED | — | — | — | UNOFFICIAL | 3 | 0 | 1 | 2 | 1 | 7 |
| 1 | 4 | — | — | — | NOT MANAGED | — | NOT EXECUTED | NEW VERSION | — | 3 | 1 | 1 | 1 | 1 | 7 |
| 1 | 5 | — | — | — | NOT EXECUTED | — | — | — | — | 3 | 1 | 1 | 1 | 2 | 8 |
| 1 | 6 | — | — | — | — | — | — | — | — | 3 | 1 | 1 | 1 | 2 | 8 |
| 1 | 7 | — | — | — | — | — | — | — | — | 3 | 1 | 1 | 1 | 2 | 8 |
| 2 | 1 | SAME VERSION | — | — | — | — | — | NEW VERSION | — | 2 | 2 | 1 | 1 | 2 | 8 |
| 2 | 2 | — | SAME VERSION | — | — | — | — | — | UNOFFICIAL | 1 | 3 | 1 | 1 | 2 | 8 |
| 2 | 3 | — | — | SUCCESS | SUCCESS | — | — | — | — | 3 | 3 | 0 | 1 | 1 | 8 |
| 2 | 4 | — | — | — | — | SAME VERSION | SUCCESS | — | — | 3 | 4 | 0 | 1 | 0 | 8 |
| 2 | 5 | — | — | — | — | — | — | — | — | 3 | 4 | 0 | 1 | 0 | 8 |
| 2 | 6 | — | — | — | — | — | — | — | — | 3 | 4 | 0 | 1 | 0 | 8 |
| 2 | 7 | — | — | — | — | — | — | — | — | 3 | 4 | 0 | 1 | 0 | 8 |
| 3 | 1 | SAME VERSION | SAME VERSION | — | — | — | SAME VERSION | NEW VERSION | — | 2 | 5 | 0 | 1 | 0 | 8 |
| 3 | 2 | — | — | SAME VERSION | SAME VERSION | — | — | — | UNOFFICIAL | 2 | 5 | 0 | 1 | 0 | 8 |
| 3 | 3 | — | — | — | — | — | — | — | — | 0 | 7 | 0 | 1 | 0 | 8 |
| 3 | 4 | — | — | — | — | SAME VERSION | — | — | — | 0 | 7 | 0 | 1 | 0 | 8 |
| 3 | 5 | — | — | — | — | — | — | — | — | 0 | 7 | 0 | 1 | 0 | 8 |
| 3 | 6 | — | — | — | — | — | — | — | — | 0 | 7 | 0 | 1 | 0 | 8 |
| 3 | 7 | — | — | — | — | — | — | — | — | 0 | 7 | 0 | 1 | 0 | 8 |

DEVICE MANAGEMENT SYSTEM AND NON-TRANSITORY COMPUTER-READABLE STORAGE MEDIUM STORING DEVICE MANAGEMENT PROGRAM

INCORPORATION BY REFERENCE

This application is based upon, and claims the benefit of priority to Japanese Patent Application No. 2020-219027 and Japanese Patent Application No. 2020-219030 filed on Dec. 28, 2020, the entire contents of which are hereby incorporated herein by reference.

BACKGROUND

1. Field of the Invention

The present disclosure relates to a device management system for remotely updating software of an electronic apparatus and a non-transitory computer-readable storage medium storing a device management program.

2. Description of the Related Art

As a general device management system, a system for updating firmware serving as software of an image forming apparatus that is an electronic apparatus from a remote location has been used. Here, the firmware update is performed, for example, to add a new function to the image forming apparatus or to repair a defect that has occurred in the image forming apparatus.

SUMMARY

According to an aspect of the disclosure, a device management system has a plurality of modes, at least a length of a cycle in which update is fully executed on all electronic apparatuses to be subjected to the update of software or a rate of the number of electronic apparatuses which are subjected to the update per unit time to the number of all the electronic apparatuses is different among the plurality of modes, and a task of the update is generated for each of all the electronic apparatuses in a selected one of the plurality of modes.

According to another aspect of the disclosure, non-transitory computer-readable storage medium storing a device management program causes a computer to provide a plurality of modes in which at least a length of a cycle in which update is fully executed on all electronic apparatuses to be subjected to the update of software or a rate of the number of electronic apparatuses which are subjected to the update per unit time to the number of all the electronic apparatuses is different among the plurality of modes, and to generate a task of the update for each of all the electronic apparatuses in a selected one of the plurality of modes.

According to still another aspect of the disclosure, a device management system includes an automatic updater for automatically generating a task of update of software of an electronic apparatus in accordance with an automatic update plan which is a setting for automatically generating the task. The automatic update plan specifies the software for the update. The automatic updater automatically generates the task at a specific timing in a repeat manner in accordance with the automatic update plan.

According to still another aspect of the disclosure, non-transitory computer-readable storage medium stores a device management program that causes a computer to function as an automatic updater that automatically generates a task of update of software of an electronic apparatus in accordance with an automatic update plan which is a setting for automatically generating the task. The automatic update plan specifies the software for the update. The automatic updater automatically generates the task at a specific timing in a repeat manner in accordance with the automatic update plan.

These and other features, aspects and advantages of the disclosure will become better understood with reference to the following drawings, description and claims.

BRIEF DESCRIPTION OF THE DRAWINGS

FIG. 4 is a diagram illustrating an example of device information illustrated in FIG. 3;

FIG. 10 is a diagram illustrating an example of task information illustrated in FIG. 3;

FIG. 22 is a diagram illustrating an example of a group setting edit screen displayed in the user terminal in the operation illustrated in FIGS. 20 and 21;

FIG. 50 is a diagram illustrating an example of a change in the progress displayed in the progress screen illustrated in FIG. 47.

DETAILED DESCRIPTION

Hereinafter, an embodiment of the present disclosure will be described with reference to the accompanying drawings.

First, a configuration of an information processing system according to the embodiment of the present disclosure will be described.

Figure 1:
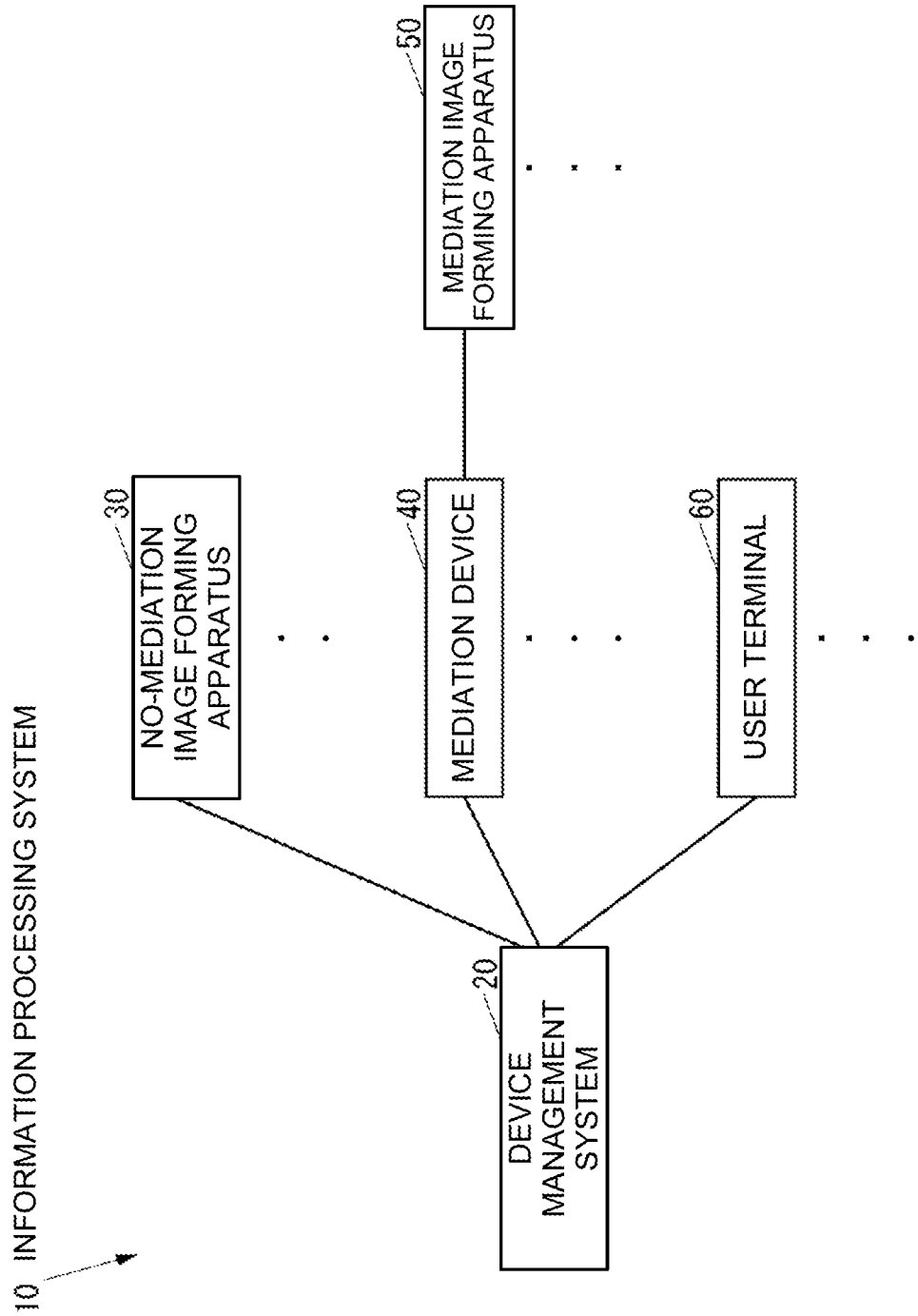
FIG. 1 is a block diagram of an information processing system according to an embodiment of the present disclosure.

FIG. 1 is a block diagram illustrating an information processing system 10 according to this embodiment.

As shown in FIG. 1, the information processing system 10 includes a device management system 20 that manages an image forming apparatus that is an electronic apparatus. The device management system 20 may execute a manual F/W update in which a user of the device management system 20 individually specifies a task (hereinafter referred to as an "F/W update task") of update of firmware (hereinafter referred to as "F/W update") serving as software of the image forming apparatus and automatic F/W update in which the device management system 20 automatically generates an F/W update task in response to an instruction issued by the user of the device management system 20. The device management system 20 may be constituted by a single computer or a plurality of computers.

The information processing system 10 includes an image forming apparatus 30 (hereinafter referred to as a "no-mediation image forming apparatus") capable of not only accessing the device management system 20 without a mediation device described below but also accepting access from the device management system 20 without a mediation device. The information processing system 10 may include at least one no-mediation image forming apparatus in addition to the no-mediation image forming apparatus 30. The no-mediation image forming apparatus other than the no-mediation image forming apparatus 30 may be arranged in the same local area network (LAN) as the no-mediation image forming apparatus 30 or arranged in a LAN different from the LAN including the no-mediation image forming apparatus 30.

The information processing system 10 includes a mediation device 40 that mediates between the device management system 20 and an image forming apparatus, and an image forming apparatus 50 that is located on the same LAN as the LAN in which the mediation device 40 is located and that is mediated with the device management system 20 by the mediation device 40 (hereinafter, an image forming apparatus that is located on the same LAN as the LAN in which a mediation device is located and that is mediated with the device management system 20 by the mediation device is referred to as a "mediation image forming apparatus"). The mediation device 40 may access the device management system 20, but does not accept access from the device management system 20 due to, for example, a firewall not shown in the figure. The information processing system 10 may include, in addition to the mediation image forming apparatus 50, at least one mediation image forming apparatus that is located on the same LAN as the LAN in which the mediation image forming apparatus 50 is located and that is mediated with the device management system 20 by the mediation device 40. The information processing system 10 may include at least one mediation device that is located on a LAN different from the LAN in which the mediation device 40 is located and that mediates between the device management system 20 and an image forming apparatus. The information processing system 10 may include at least one mediation image forming apparatus that is located on the same LAN as a LAN in which a mediation device that is different from the mediation device 40 is located and that is mediated with the device management system 20 by the mediation device.

An image forming apparatus in the information processing system 10 is constituted by, for example, a multifunction peripheral (MFP), a printer-dedicated machine, or the like. A mediation device in the information processing system 10 is constituted by, for example, a computer, such as a personal computer (PC).

The information processing system 10 includes a user terminal 60 used by a user of the device management system 20. The information processing system 10 may include, in addition to the user terminal 60, at least one user terminal to be used by the user of the device management system 20. The user terminal is constituted by, for example, a computer, such as a PC. Examples of the user of the device management system 20 include an administrator who is a person of a dealer providing an image forming apparatus to a user of the image forming apparatus (hereinafter referred to as a "device user") and who manages the image forming apparatus provided by the dealer to the device user (hereinafter referred to as "dealer-side administrator"), a service person who is a person of the dealer and who performs maintenance and other services for the image forming apparatus provided by the dealer to the device user (hereinafter referred to as a "dealer-side service person"), an administrator who is a person of a distributor providing the image forming apparatus to the device user and managing the dealer and who manages either the image forming apparatus provided by this distributor to the device user or the image forming apparatus provided by the dealer managed by the distributor to the device user (hereinafter referred to as a "distributor-side administrator"), and a service person who is a person of the distributor and who performs maintenance and other services for the image forming apparatus provided by the distributor to the device user and the image forming apparatus provided by the dealer managed by the distributor to the device user (hereinafter referred to as a "distributor-side service person").

Figure 2:
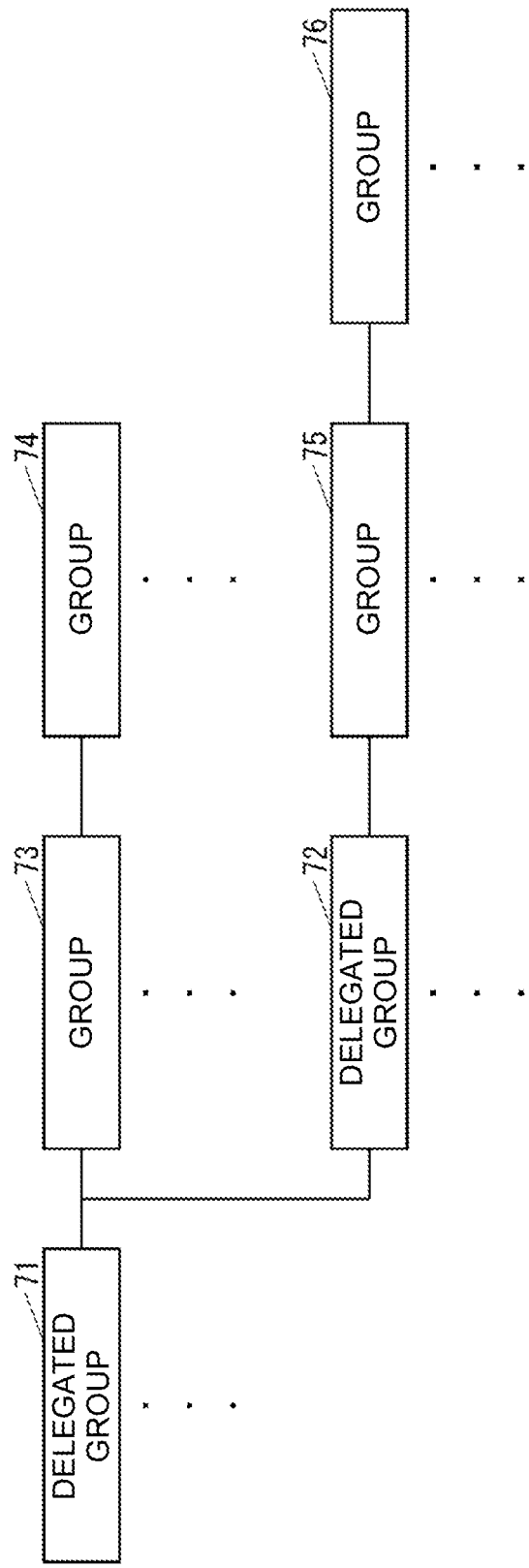
FIG. 2 is a diagram illustrating an example of groups of image forming apparatuses in the information processing system illustrated in FIG. 1.

FIG. 2 is a diagram illustrating an example of groups of image forming apparatuses in the information processing system 10.

As shown in FIG. 2, the image forming apparatuses included in the information processing system 10 are managed by the device management system 20 in a hierarchical structure.

The hierarchical structure managed by the device management system 20 has a delegated group 71 corresponding to a specific distributor. The hierarchical structure managed by the device management system 20 may have a delegated group corresponding to a distributor for each distributor in addition to the delegated group 71.

The hierarchical structure managed by the device management system 20 has a delegated group 72 corresponding to a specific dealer under the delegated group 71 corresponding to the distributor managing the dealer. The hierarchical structure managed by the device management system 20 may have a delegated group corresponding to a dealer for each dealer under the delegated group corresponding to the distributor managing the dealer.

The hierarchical structure managed by the device management system 20 has a group 73 corresponding to a specific device user under the delegated group 71 corresponding to the distributor directly managing the device user. The hierarchical structure managed by the device management system 20 may have a group corresponding to the device user for each device user under the delegated group corresponding to the distributor directly managing the device user.

The hierarchical structure managed by the device management system 20 has a group 74 to which at least some of image forming apparatuses used by a specific device user belong under the group 73 corresponding to the device user. For example, the group 74 includes image forming apparatuses installed in a specific office of the device user corresponding to the group 73. The hierarchical structure managed by the device management system 20 may include a group to which at least some of image forming apparatuses used by the device user directly managed by the distributor belong under the group corresponding to the device user.

The hierarchical structure managed by the device management system 20 has a group 75 corresponding to a specific device user under the delegated group 72 corresponding to the dealer directly managing the device user. The hierarchical structure managed by the device management system 20 may have a group corresponding to the device user for each device user under the delegated group corresponding to the dealer directly managing the device user.

The hierarchical structure managed by the device management system 20 has a group 76 to which at least some of the image forming apparatuses used by a specific device user belong under the group 75 corresponding to the device user. For example, the group 76 includes image forming apparatuses that are installed in a specific office of the device user corresponding to the group 75. The hierarchical structure managed by the device management system 20 may include a group to which at least some of the image forming apparatuses used by a specific device user directly managed by a dealer belong under the group corresponding to the device user.

Figure 3:
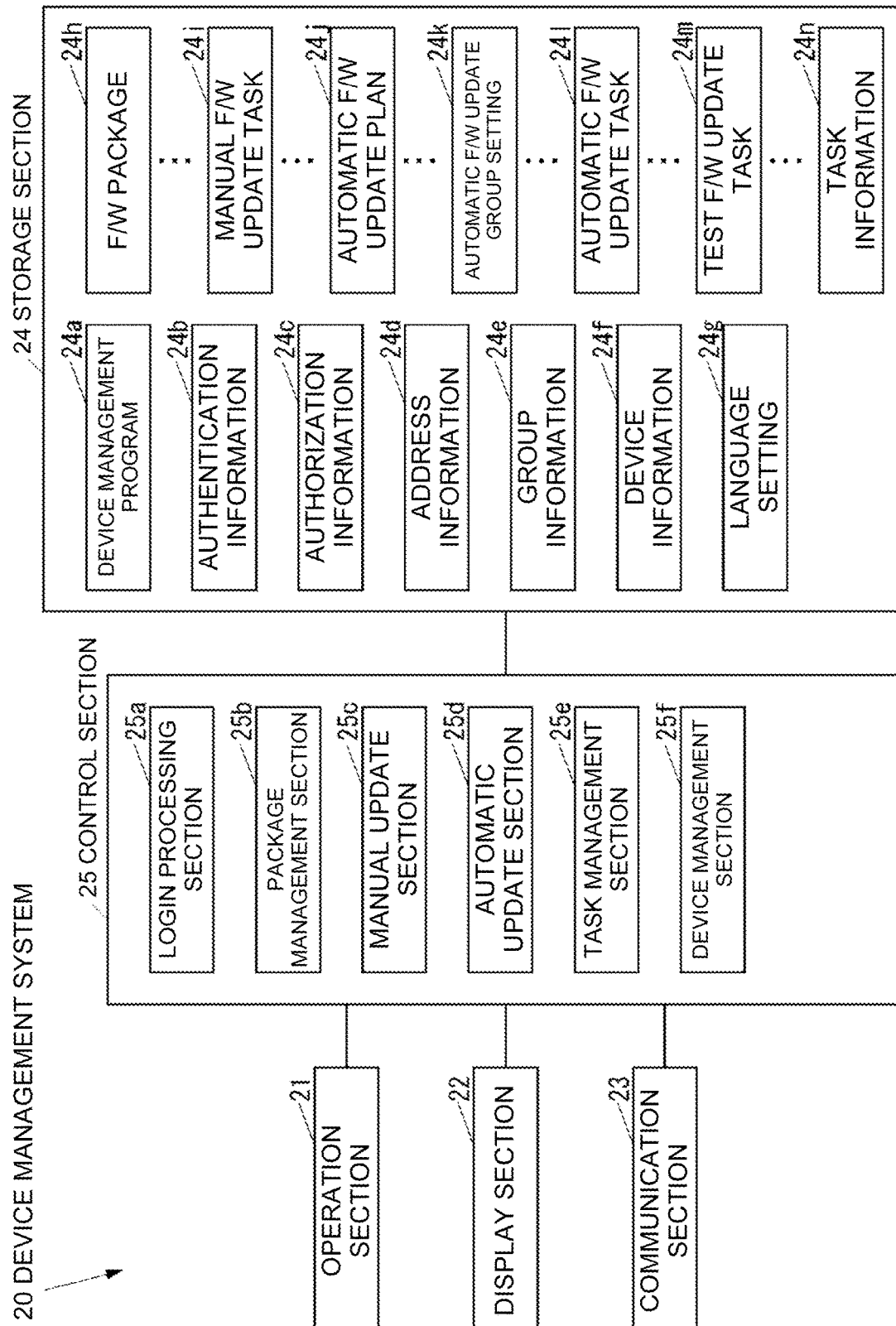
FIG. 3 is a block diagram of a device management system illustrated in FIG. 1 configured by a single computer.

FIG. 3 is a block diagram of the device management system 20 when the device management system 20 is configured by one computer.

As illustrated in FIG. 3, the device management system 20 includes an operation section 21 as an operation device, such as a keyboard or a mouse, through which various operations are input, a display section 22 as a display device, such as a liquid crystal display (LCD), for displaying various types of information, a communication section 23 as a communication device for communicating with external apparatuses over a network, such as a LAN or the Internet, or with no networks but directly through a wired or wireless connection, a storage section 24 as a non-volatile storage device, such as a semiconductor memory or a hard disk drive (HDD), for storing various types of information, and a control section 25 that controls the entire device management system 20.

The storage section 24 may store a device management program 24*a* for managing the image forming apparatus. The device management program 24*a* may be installed in the device management system 20 at the manufacturing stage of the device management system 20, may be additionally installed in the device management system 20 from an external storage medium, such as a universal serial bus (USB) memory, or may be additionally installed in the device management system 20 from the network, for example.

The storage section 24 stores authentication information 24*b* indicating information required for authentication of a user of the device management system 20 for each identification information of a user (hereinafter referred to as a "user ID").

The storage section 24 stores authorization information 24*c* indicating authority of a user of the device management system 20 for each user ID. The authority of a user of the device management system 20 includes, for example, authority of an administrator of the device management system 20 (hereinafter referred to as a "system administrator"), authority of a distributor-side administrator of a specific distributor, authority of a dealer-side administrator of a specific dealer, authority of a distributor-side service person of a specific distributor, and authority of a dealer-side service person of a specific dealer.

The storage section 24 stores address information 24*d* indicating an electronic mail address of a user of the device management system 20 for each user ID.

The storage section 24 stores group information 24*e* indicating information on a group managed by the device management system 20. The group information 24*e* includes, for example, information on a hierarchical structure as shown in FIG. 2.

The storage section 24 stores device information 24*f* indicating information on an image forming apparatus managed by the device management system 20.

The storage section 24 may store a language setting 24*g* indicating, for each delegated group, a language to be used for various outputs, such as a display language for a group setting edit screen, a test progress screen, a package management screen, an influence notification screen, and a plan edit screen, described below.

The storage section 24 may store a package of firmware of the image forming apparatus (hereinafter referred to as an "F/W package") 24*h*. The storage section 24 may store at least one F/W package other than the F/W package 24*h*.

The storage section 24 may store a manual F/W update task 24*i* which is an F/W update task in a manual F/W update. The storage section 24 may store at least one manual F/W update task in addition to the manual F/W update task 24*i*.

The storage section 24 may store an automatic F/W update plan 24*j* which is a setting for automatically generating an automatic F/W update task which is an F/W update task in an automatic F/W update. The storage section 24 may store at least one automatic F/W update plan having a similar configuration to the automatic F/W update plan 24*j*, in addition to the automatic F/W update plan 24*j*.

The storage section 24 may store an automatic F/W update group setting 24*k* which is a setting for each group to which the image forming apparatus belongs, for executing an automatic F/W update. The storage section 24 may store an automatic F/W update group setting having a similar configuration to the automatic F/W update group settings 24*k* for each of the groups shown in FIG. 2.

The storage section 24 may store an automatic F/W update task 24*l*. The storage section 24 may store at least one automatic F/W update task in addition to the automatic F/W update task 24*l*. The storage section 24 may store one automatic F/W update task for one image forming apparatus for each automatic F/W update plan.

The storage section 24 may store a test F/W update task 24*m* which is an F/W update task for a test of the F/W update. The storage section 24 may store at least one test F/W update task in addition to the test F/W update task 24*m*.

The storage section 24 may store task information 24*n* indicating various information on the F/W update task.

The control section 25 includes, for example, a central processing unit (CPU), a read only memory (ROM) that stores programs and various data, and a random access memory (RAM) as a volatile storage device used as a work area of the CPU of the control section 25. The CPU of the control section 25 executes the programs stored in the storage section 24 or the ROM of the control section 25.

The control section 25, by executing the device management program 24*a*, realizes a login processing section 25*a* that executes a process for login of a user of the device management system 20, a package management section 25*b* that manages F/W packages, a manual update section 25*c* that executes a manual F/W update, an automatic update section 25*d* that executes an automatic F/W update, a task management section 25*e* that manages F/W update tasks, and a device management section 25*f* that manages image forming apparatuses.

FIG. 4 is a table illustrating an example of the device information 24*f*.

As shown in FIG. 4, the device information 24*f* includes, for example, a device ID which is identification information of an image forming apparatus, a group ID which is identification information of a group to which the image forming apparatus belongs, a mediation device ID which is identification information of a mediation device managing the image forming apparatus when the image forming apparatus is a mediation image forming apparatus, information indicating a model of the image forming apparatus, information indicating whether an F/W update using the device management system 20 is permitted to be performed on the image forming apparatus, a type of release of firmware installed in the image forming apparatus (hereinafter, the type of release of the firmware is simply referred to as a "release type"), and a version of the firmware installed in the image forming apparatus (hereinafter the version of firmware is referred to as an "F/W version") for each image forming apparatus. Here, there are two types of release types: "Official" which indicates that the firmware is official and not customized, and "Customized" which indicates that the firmware is customized.

Figure 5:
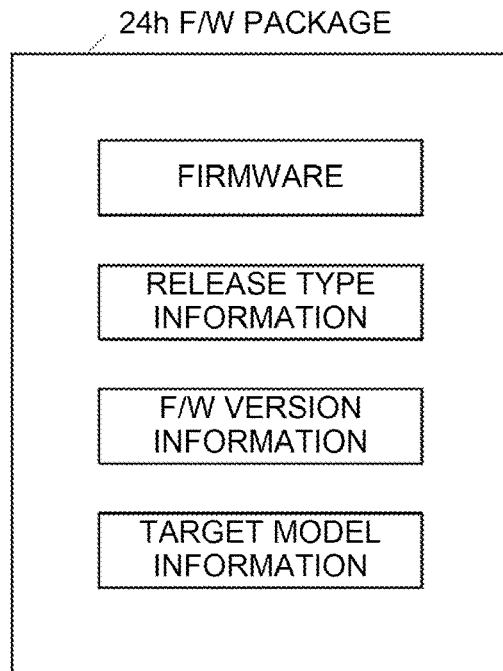
FIG. 5 is a diagram illustrating an example of an F/W package illustrated in FIG. 3.

FIG. 5 is a diagram illustrating an example of the F/W package 24*h*.

As shown in FIG. 5, the F/W package 24*h* includes the firmware, release type information indicating a release type of the firmware, F/W version information indicating an F/W version of the firmware, and target model information indicating a model of an image forming apparatus targeted by the firmware (hereinafter referred to as a "target model").

Figure 6:
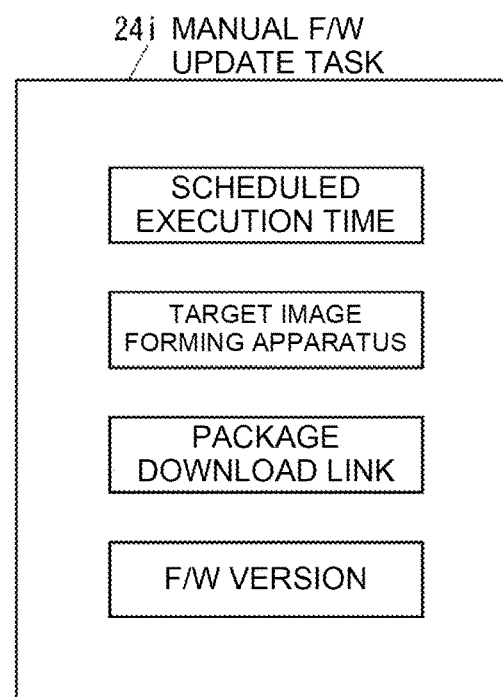
FIG. 6 is a diagram illustrating an example of a manual F/W update task illustrated in FIG. 3.

FIG. 6 is a diagram illustrating an example of the manual F/W update task 24*i*.

As shown in FIG. 6, the manual F/W update task 24*i* includes, for example, a scheduled time of execution of the manual F/W update task 24*i* (hereinafter, the scheduled time of execution is simply referred to as a "scheduled execution time"), an image forming apparatus that is a target of the manual F/W update task 24i, a link for downloading an F/W package that is a target of the manual F/W update task 24i from the device management system 20 (hereinafter referred to as a "package download link"), and an F/W version of the firmware in the F/W package of the target of the manual F/W update task 24i, which are set therein. In the manual F/W update task 24i, the target image forming apparatus is represented by a device ID. A configuration of the manual F/W update task other than the manual F/W update task 24i, a configuration of the automatic F/W update task, and a configuration of the test F/W update task are similar to the configuration of the manual F/W update task 24i.

Figures 7, 8:
FIG. 7 is a diagram illustrating an example of an automatic F/W update plan illustrated in FIG. 3.
FIG. 8 is a table illustrating specific content of "Gradual Update" in an item "Automatic F/W Update Mode" illustrated in FIG. 7.

FIG. 7 is a diagram illustrating an example of the automatic F/W update plan 24j.

As shown in FIG. 7, the automatic F/W update plan 24j includes an item "Target F/W Package" indicating a target F/W package of the automatic F/W update, an item "Target Group" indicating a target group of the automatic F/W update, an item "Automatic F/W Update Mode" indicating a mode of the automatic F/W update, and an item "Enable/Disable" indicating whether the automatic F/W update plan 24j itself is enabled or disabled.

The item "Target F/W Package" specifies an F/W package by, for example, identification information of the F/W package (hereinafter referred to as a "package ID"). For example, in the example shown in FIG. 7, an F/W package identified by a package ID "P0001" is specified in the item "Target F/W Package".

In the item "Target Group", a value "All Accessible" indicating all groups under a specified delegated group, a value "Exclusively Managed" indicating all groups directly under a specified delegated group, or a value "Off" for independently specifying a group may be specified.

When "All Accessible" is specified in the item "Target Group", one of the delegated groups is further specified in the item "Target Group". For example, in the example of FIG. 7, "All Accessible" is specified in the item "Target Group", and the delegated group 71 is further specified in the item "Target Group". When "All Accessible" and the delegated group 71 are specified in the item "Target Group", as shown in FIG. 2, not only the groups 73 and 74 corresponding to device users directly managed by the distributor corresponding to the delegated group 71, but also the groups 75 and 76 corresponding to device users directly managed by the dealer managed by this distributor are also targets of the automatic F/W update.

When "Exclusively Managed" is specified in the item "Target Group", one of the delegated groups is further specified in the item "Target Group". For example, when "Exclusively Managed" and the delegated group 71 are specified in the item "Target Group", as shown in FIG. 2, although the groups 73 and 74 corresponding to the device users directly managed by the distributor corresponding to the delegated group 71 are targets of the automatic F/W update, the groups 75 and 76 corresponding to the device users directly managed by the dealer managed by this distributor are not targets of the automatic F/W update.

When "Off" is specified in the item "Target Group", a target group of the automatic F/W update is further specified in the item "Target Group" in an individual manner.

In the item "Automatic F/W Update Mode", a value "Gradual Update" in which the F/W update is executed in 4 weeks for all the image forming apparatuses of targets of the automatic F/W update by increasing the number of the image forming apparatuses of actual targets of the F/W update every week in all the image forming apparatuses of targets of the automatic F/W update or a value "Quick Update" in which the F/W update is executed in 1 week for all the image forming apparatuses of targets of the automatic F/W update may be set. In other words, the item "Automatic F/W Update Mode" specifies a speed of the F/W update. Note that a default value for the item "Automatic F/W Update Mode" is "Gradual Update".

FIG. 8 is a table illustrating specific content of "Gradual Update" in the item "Automatic F/W Update Mode".

As shown in FIG. 8, the F/W update is attempted for 2% of all the image forming apparatuses that are targets of the automatic F/W update in the first week, 15% of all the image forming apparatuses that are targets of the automatic F/W update including the image forming apparatuses for which the update was attempted in the first week by the second week, 50% of all the image forming apparatuses that are targets of the automatic F/W update including the image forming apparatuses for which the update was attempted by the second week by the third week, and all the image forming apparatuses that are targets of the automatic F/W update by the fourth week. As shown in FIG. 8, "Gradual Update" is a mode in which the speed of the F/W update is increased every week. Note that "Quick Update" is a mode in which the speed of the F/W update is not changed.

In the item "Enable/Disable" shown in FIG. 7, a value "Enable" indicating that the automatic F/W update plan 24j itself is enabled or "Disable" indicating that the automatic F/W update plan 24j itself is disabled may be specified. Note that, in the item "Enable/Disable", "Enable" is a default value.

Figure 9:
FIG. 9 is a diagram illustrating an example of an automatic F/W update group setting illustrated in FIG. 3.

FIG. 9 is a diagram illustrating an example of the automatic F/W update group setting 24k.

As shown in FIG. 9, the automatic F/W update group setting 24k includes an item "Automatic F/W Update Setting" indicating a setting of an automatic update plan used to generate an automatic F/W update task, an item "Plan Permitted/Prohibited" indicating whether a group of a target of the automatic F/W update group setting 24k allows the automatic F/W update for each automatic F/W update plan that is a target of the automatic F/W update, an item "Notification Setting" indicating a user to whom a group of a target of the automatic F/W update group setting 24k transmits a notification by an e-mail when an event associated with the automatic F/W update plan that is a target of the automatic F/W update plan occurs, an item "Execution Time Zone Setting" indicating a time zone at which execution of the F/W update is started in the automatic F/W update, and an item "Pre-Print Setting" indicating a setting associated with pre-printing in which a notification of execution of the automatic F/W update is printed by an image forming apparatus of a target of the automatic F/W update before the execution of the automatic F/W update.

In the item "Automatic F/W Update Setting", a value "ON" indicating that the automatic F/W update task is to be generated according to all automatic F/W update plans, a value "OFF" indicating that none of the automatic F/W update plans is employed so that an automatic F/W update task is not to be generated, or a value "Select" indicating that the automatic F/W update task is to be generated in accordance with an individually-selected automatic F/W update plan, may be selected. Note that a default value for the item "Automatic F/W Update Setting" is "OFF".

In the item "Plan Permitted/Prohibited", "Permitted" indicating that the automatic F/W update is permitted or "Prohibited" indicating that the automatic F/W update is not permitted may be specified for each automatic F/W update plan for which a target group of the automatic F/W update group setting 24k is a target of the automatic F/W update. In the item "Plan Permitted/Prohibited", the automatic F/W update plan is indicated by identification information (hereinafter referred to as a "plan ID"). For example, according to the example shown in FIG. 9, at least permission of an automatic F/W update using an automatic F/W update plan identified by a plan ID "PL0001" and prohibition of an automatic F/W update using an automatic F/W update plan identified by a plan ID "PL0003" are shown. In the item "Plan Permitted/Prohibited", "Prohibited" is a default value.

In the item "Notification Setting", a user is specified by a user ID, for example. For example, in the example shown in FIG. 9, the user identified by the user ID "U0001" and the user identified by the user ID "U0005" are at least specified in the item "Notification Setting". Examples of the users specified in the item "Notification Setting" include the dealer-side service person and the distributor-side service person.

The item "Execution Time Zone Setting" includes an item "Day Setting" indicating a day on which execution of the F/W update starts in the automatic F/W update and an item "Time Zone Setting" indicating a time zone on which execution of the F/W update starts in the automatic F/W update. In the item "Day Setting", "Every Day" indicating that the execution of the F/W update in the automatic F/W update is to start every day or "Day of the Week" indicating that the execution of the F/W update in the automatic F/W update is to start on a specified day of the week may be specified. When "Day of the Week" is specified in the item "Day Setting", at least one day of the week on which the F/W update is to be started in the automatic F/W update is further specified in the item "Day Setting". For example, in the example shown in FIG. 9, Saturday and Sunday are specified in the item "Day Setting". The image forming apparatus may not be used while the F/W update is being performed. Therefore, it is preferable that, as the item "Execution Time Zone Setting", a time zone in which there is little problem even if the device user may not use the image forming apparatus is specified.

The item "Pre-Print Setting" includes an item "Pre-Print On/Off" indicating whether to perform pre-printing, and an item "Language Setting" indicating a language of a notification for a target of pre-printing. In the item "Pre-Print On/Off", a value "ON" indicating that pre-printing is to be executed or a value "OFF" indicating that pre-printing is not to be executed may be specified. Note that, in the item "Pre-Print On/Off", "Off" is a default value. In the item "Language Setting", a value "Language Set in Its Delegated Group" indicating a language set in the delegated group to which a target group of the automatic F/W update group setting 24k belongs in the language setting 24g or a value of a language specifically specified may be set. Note that, in the item "Language Setting", the value "Language Set in Its Delegated Group" is a default value.

FIG. 10 is a diagram illustrating an example of the task information 24n.

As shown in FIG. 10, the task information 24n includes, for example, an item "Task ID" indicating a task ID as identification information of an F/W update task, an item "Generation Date and time" indicating a date and time of generation of the F/W update task, an item "Task Type" indicating a type of the F/W update task, such as "Manual F/W Update Task", "Automatic F/W Update Task", and "Test F/W update task", an item "Status" indicating a status of the F/W update task, an item "Target Device" indicating a target image forming apparatus of the F/W update task, and an item "Related Plan" indicating, when the F/W update task is an automatic F/W update task, an automatic F/W update plan that generates the automatic F/W update task. Examples of the status shown in the item "Status" include "Pending" indicating a status before the F/W update task is executed, "Canceled" indicating a status in which the F/W update task is canceled, "Execution Waiting" indicating a status in which execution of the F/W update task is waited, "Executing" indicating a status in which the F/W update task is being executed, "Success" indicating a status in which F/W update based on the F/W update task has been successfully performed, and "Failure" indicating a status in which F/W update based on the F/W update task has failed. In the task information 24n, the image forming apparatus is represented by a device ID. In the task information 24n, the automatic F/W update plan is represented by a plan ID.

Figure 11:
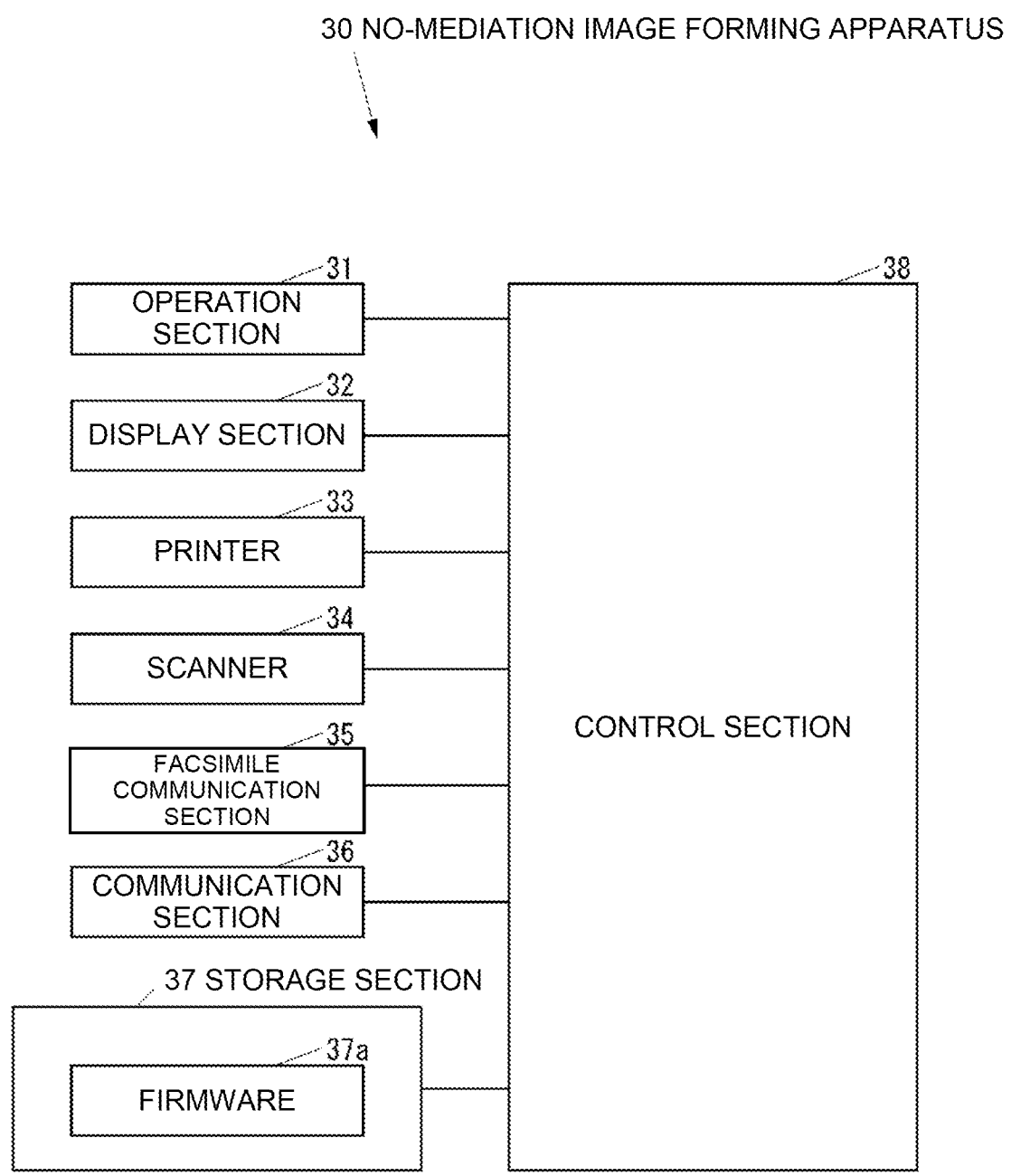
FIG. 11 is a block diagram illustrating a no-mediation image forming apparatus illustrated in FIG. 1 that is constituted of a multifunction peripheral (MFP)

FIG. 11 is a block diagram illustrating the no-mediation image forming apparatus 30 that is configured by an MFP.

As illustrated in FIG. 11, the no-mediation image forming apparatus 30 includes an operation section 31 serving as an input device, such as a button, through which various operations are input, a display section 32 serving as a display device, such as an LCD, for displaying various types of information, a printer 33 serving as a printing device for printing an image on a recording medium, such as a sheet of paper, a scanner 34 serving as a reading device for reading an image from an original, a facsimile communication section 35 serving as a faxing device that performs facsimile communications with external facsimile machines (not illustrated) through a communications line, such as a public telephone line, a communication section 36 serving as a communication device for communicating with external apparatuses over a network, such as a LAN and the Internet, or with no networks but directly through a wired or wireless connection, a storage section 37 serving as a non-volatile storage device, such as a semiconductor memory or an HDD, for storing various types of information, and a control section 38 that controls the entire no-mediation image forming apparatus 30.

The storage section 37 may store firmware 37a for controlling the no-mediation image forming apparatus 30. The firmware 37a, for example, may be installed in the no-mediation image forming apparatus 30 at a manufacturing stage of the no-mediation image forming apparatus 30, may be additionally installed in the no-mediation image forming apparatus 30 from an external storage medium, such as a USB stick, or may be additionally installed in the no-mediation image forming apparatus 30 through a network.

The control section 38 includes, for example, a CPU, a ROM storing programs and various data, and a RAM as a volatile storage device used as a work area of the CPU of the control section 38. The CPU of the control section 38 executes programs stored in the storage section 37 or the ROM of the control section 38.

The configuration of the image forming apparatus in the information processing system 10 is the same as the configuration of the no-mediation image forming apparatus 30.

Figure 12:
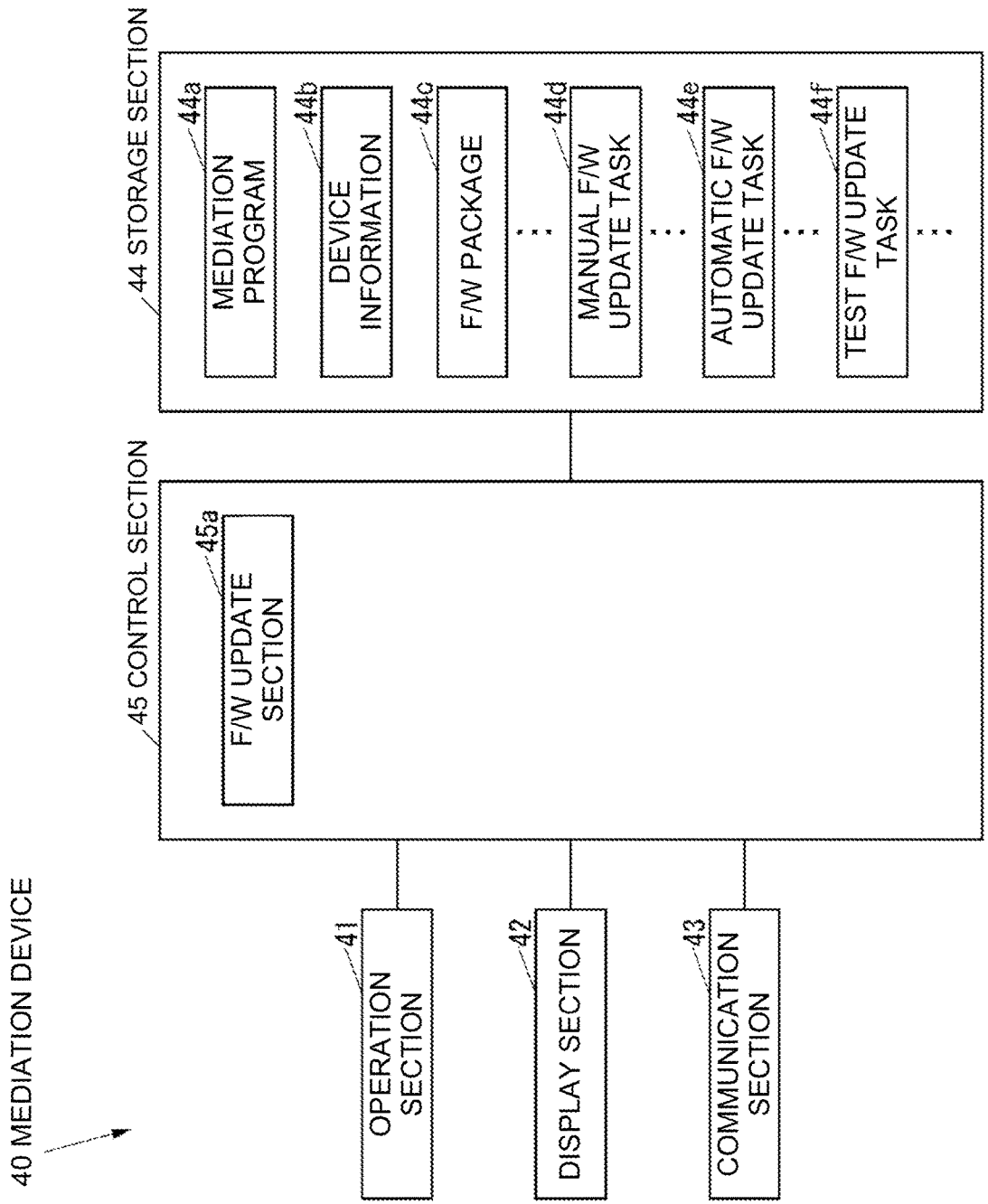
FIG. 12 is a block diagram of a mediation device illustrated in FIG. 1.

FIG. 12 is a block diagram illustrating the mediation device 40.

As illustrated in FIG. 12, the mediation device 40 includes an operation section 41 serving as an operation device, such as a keyboard and a mouse that allows input of various operations, a display section 42 serving as a display device, such as an LCD, that displays various types of information, a communication section 43 serving as a communication device that communicates with an external device over a network, such as a LAN or the Internet, or with no network but directly through a wired or wireless connection, a storage section 44 serving as a non-volatile storage device, such as a semiconductor memory or an HDD, that stores various types of information, and a control section 45 that controls the entire mediation device 40.

The storage section 44 may store a mediation program 44a for performing mediation between the device management system 20 and the mediation image forming apparatus. The mediation program 44a, for example, may be installed in the mediation device 40 at a manufacturing stage of the mediation device 40, may be additionally installed in the mediation device 40 from an external storage medium, such as a USB stick, or may be additionally installed in the mediation device 40 through a network.

The storage section 44 stores device information 44b indicating information on an image forming apparatus that is mediated with the device management system 20 by the mediation device 40, that is, information on an image forming apparatus managed by the mediation device 40.

The storage section 44 may store an F/W package 44c. The storage section 44 may store at least one F/W package in addition to the F/W package 44c.

The storage section 44 may store a manual F/W update task 44d. The storage section 44 may store at least one manual F/W update task in addition to the manual F/W update task 44d.

The storage section 44 may store an automatic F/W update task 44e. The storage section 44 may store at least one automatic F/W update task in addition to the automatic F/W update task 44e.

The storage section 44 may store a test F/W update task 44f. The storage section 44 may store at least one test F/W update task in addition to the test F/W update task 44f.

The control section 45 includes, for example, a CPU, a ROM storing programs and various data, and a RAM as a volatile storage device used as a work area of the CPU of the control section 45. The CPU of the control section 45 executes programs stored in the storage section 44 or the ROM of the control section 45.

The control section 45 realizes an F/W update section 45a that executes the F/W update by executing the mediation program 44a.

The configuration of a mediation device in the information processing system 10 is the same as the configuration of the mediation device 40.

Next, operation of the information processing system 10 will be described.

First, an operation of the device management system 20 performed when the device information 24f is updated will be described.

The no-mediation image forming apparatus periodically transmits various information about itself, such as a release type and an F/W version of the firmware installed therein, to the device management system 20, for example, once a day. Furthermore, the no-mediation image forming apparatus transmits the various information about itself, such as a release type and an F/W version of the firmware installed therein, to the device management system 20 also at a time when connection to the device management system 20 is started. Accordingly, the device management section 25f of the device management system 20 updates the device information 24f using the information transmitted from the no-mediation image forming apparatus every time the information is transmitted from the no-mediation image forming apparatus.

Furthermore, the mediation device periodically obtains various information about the mediation image forming apparatus, such as a release type and an F/W version of the firmware installed in the mediation image forming apparatus managed by the mediation device, from this mediation image forming apparatus, for example, once a day, and transmits the obtained information to the device management system 20 every time the mediation device obtains the information. Accordingly, the device management section 25f of the device management system 20 updates the device information 24f using the information transmitted from the mediation device every time the information is transmitted from the mediation device.

Next, an operation of the device management system 20 performed when a user logs in the device management system 20 will be described.

Figure 13:
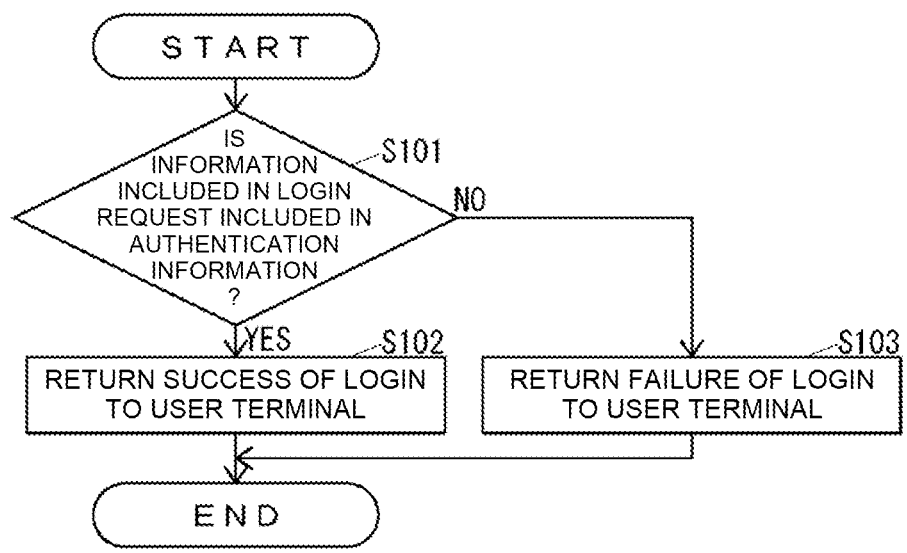
FIG. 13 is a flowchart of an operation of the device management system shown in FIG. 3 logged in by a user.

FIG. 13 is a flowchart of the operation of the device management system 20 when a user logs in the device management system 20.

A user of the device management system 20 may transmit a request for login to the device management system 20 to the device management system 20 via a user terminal. Here, the request includes information required for authentication of the user of the device management system 20. When receiving a request to log in to the device management system 20, the control section 25 of the device management system 20 performs the operation shown in FIG. 13.

As shown in FIG. 13, the login processing section 25a determines whether or not the authentication information 24b includes information required for authentication of the user of the device management system 20 which is included in the request for login to the device management system 20 (S101).

When determining that the information included in the request for login to the device management system 20 is included in the authentication information 24b in step S101, the login processing section 25a returns a successful login to the user terminal which is a transmission source of the request for login to the device management system 20 (S102) and terminates the operation shown in FIG. 13.

When determining that the information included in the request for login to the device management system 20 is not included in the authentication information 24b in step S101, the login processing section 25a returns a failure of the login to the user terminal which is the transmission source of the request for login to the device management system 20 (S103) and terminates the operation shown in FIG. 13.

Next, an operation of the device management system 20 performed when an F/W package is managed will be described.

Figure 14:
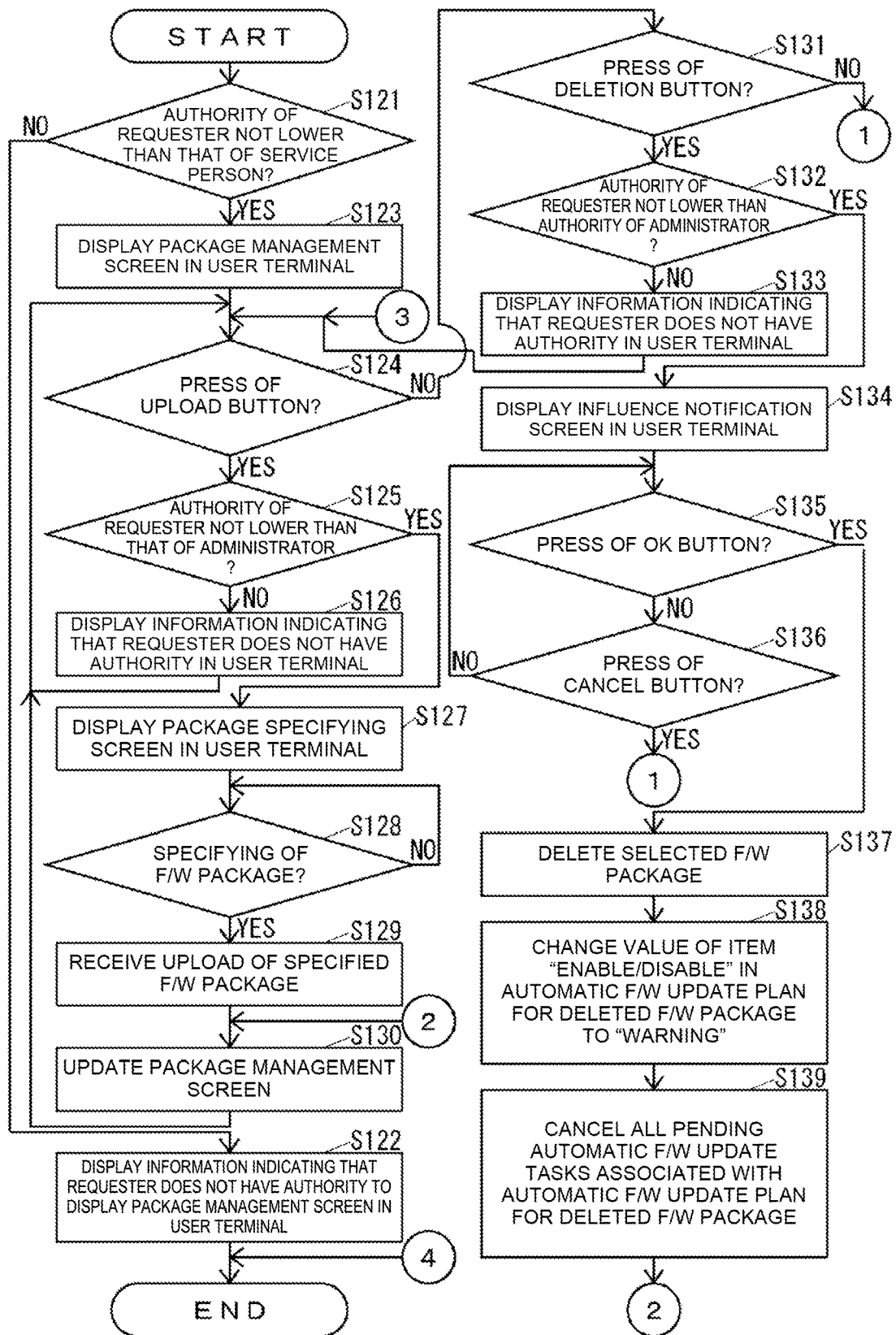
FIG. 14 is a flowchart of a portion of an operation of the device management system illustrated in FIG. 3 performed when an F/W package is managed.
Figure 15:
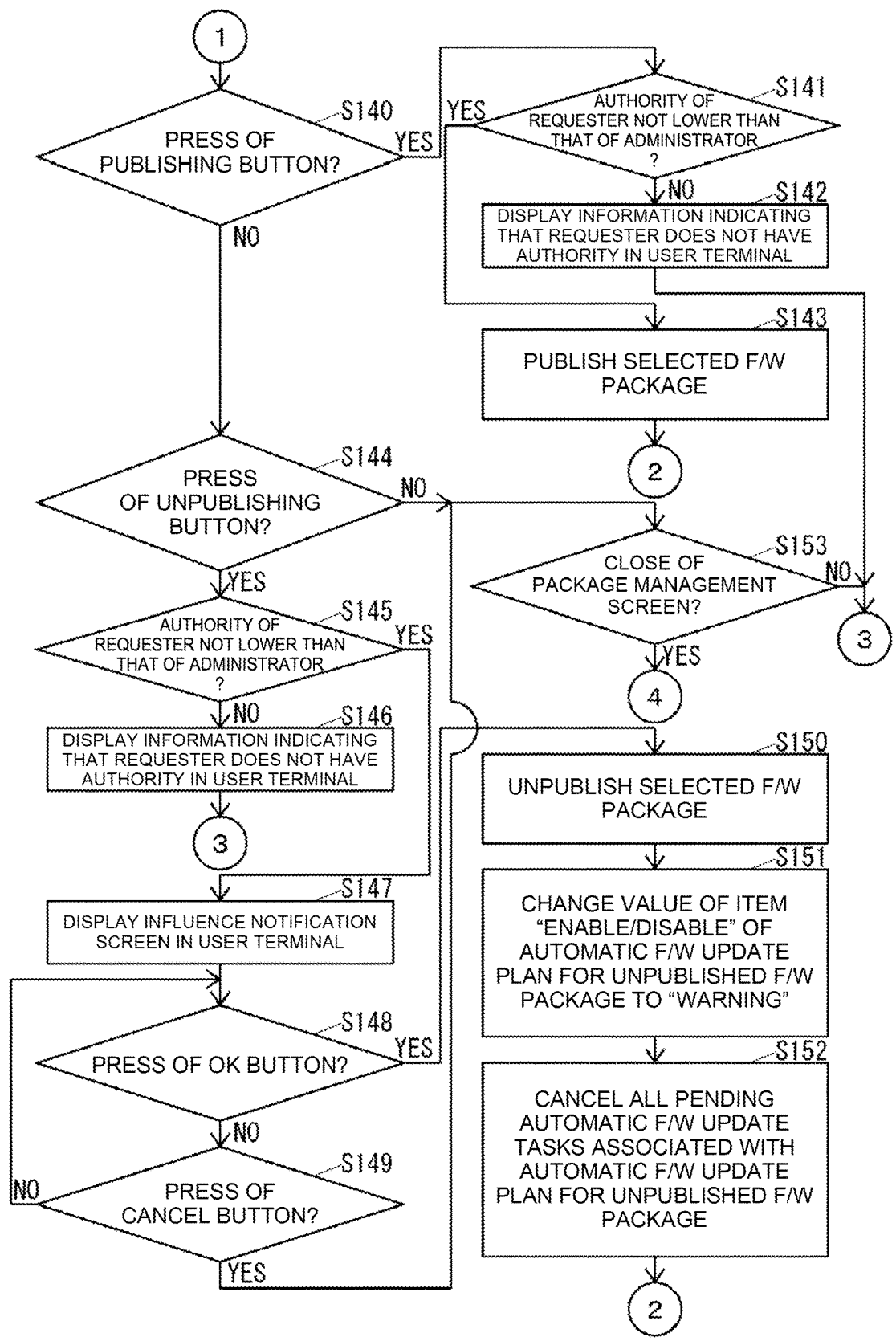
FIG. 15 is a flowchart following the flowchart of FIG. 14.

FIG. 14 is a flowchart of a portion of an operation of the device management system 20 performed when an F/W package is managed. FIG. 15 is a flowchart following the flowchart of FIG. 14.

A user who is logging into the device management system 20 may transmit a request (hereinafter referred to as a "package management screen display request") for displaying a screen (hereinafter referred to as a "package management screen") for managing an F/W package to the device management system 20 via a user terminal (hereinafter referred to as a "target user terminal" in a description made with reference to FIGS. 14 and 15). When receiving the package management screen display request, the control section 25 of the device management system 20 performs the operation shown in FIGS. 14 and 15.

As shown in FIGS. 14 and 15, the package management section 25b determines whether authority of the user who sent the package management screen display request (hereinafter referred to as the "requester" in the description of FIGS. 14 and 15) is not lower than that of a service person based on a user ID of this requester and the authorization information 24*c* (S121). Here, examples of the authority not lower than that of a service person include authority of a dealer-side service person and authority of a distributor-side service person, and authority of an administrator or higher. Examples of the authority of an administrator or higher include authority of a dealer-side administrator which is higher than the authority of a dealer-side service person, authority of a dealer-side administrator, authority of a distributor-side administrator which is higher than the authority of a distributor-side service person, and authority of a system administrator higher than the authority of a distributor-side administrator.

When determining in S121 that the authority of the requester is lower than that of a service person, the package management section 25*b* causes the user terminal to display information indicating that the requester does not have authority to display the package management screen (S122) and terminates the operation shown in FIGS. 14 and 15.

When determining in S121 that the authority of the requester is not lower than that of a service person, the package management section 25*b* transmits data on the package management screen to the target user terminal so as to display the package management screen in the target user terminal (S123).

Figure 16:
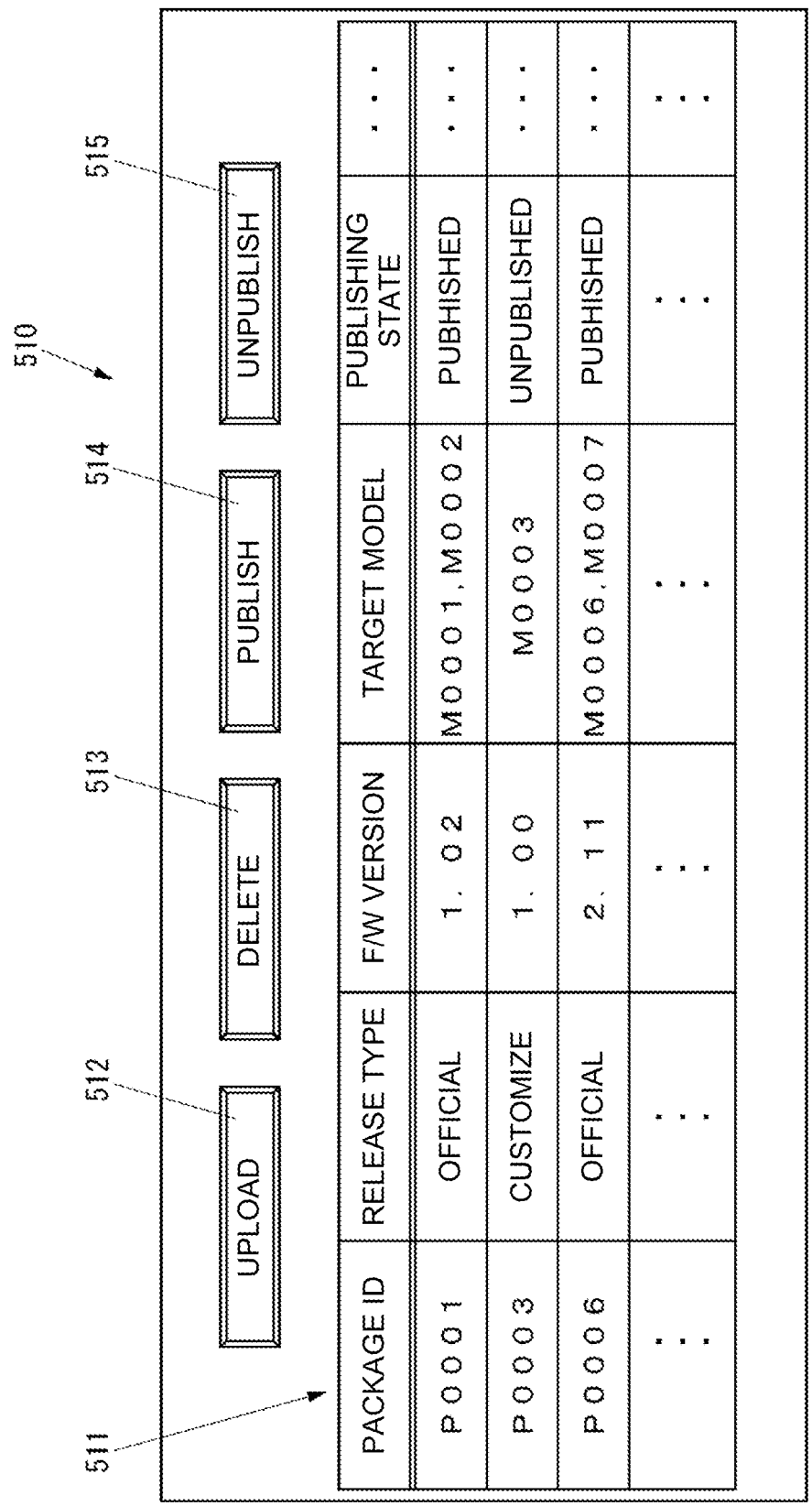
FIG. 16 is a diagram illustrating an example of a package management screen displayed in a user terminal in the operation shown in FIGS. 14 and 15.

FIG. 16 is a diagram illustrating an example of a package management screen 510 displayed in the user terminal in the operation shown in FIGS. 14 and 15.

As shown in FIG. 16, the package management screen 510 includes a list 511 of F/W packages stored in the storage section 24, an upload button 512 for uploading an F/W package to the device management system 20, a delete button 513 for deleting an F/W package selected in the list 511 from the device management system 20, a publishing button 514 for publishing an F/W package selected in the list 511, and an unpublishing button 515 for unpublishing an F/W package selected in the list 511.

The list 511 includes a package ID, a release type, an F/W version, and a target model of firmware in an F/W package, and a publishing status indicating whether the F/W package has been published for each F/W package.

The delete button 513, the publishing button 514, and the unpublishing button 515 may be operated only when at least one F/W package is selected in the list 511.

As shown in FIGS. 14 and 15, after the process in step S123, the package management section 25*b* determines whether the upload button 512 has been pressed (S124).

When determining in step S124 that the upload button 512 has been pressed, the package management section 25*b* determines whether the authority of the requester is not lower than that of an administrator based on a user ID of this requester and the authorization information 24*c* (S125). Examples of the authority of an administrator or higher include the authority of a dealer-side administrator, the authority of distributor-side administrator which is higher than the authority of a dealer-side administrator, and the authority of a system administrator which is higher than that of a distributor-side administrator. On the other hand, the examples of the authority not lower than that of an administrator do not include the authority of a dealer-side service person and the authority of a distributor-side service person.

When determining in step S125 that the authority of the requester is lower than that of an administrator, the package management section 25*b* causes the target user terminal to display information indicating that the requester does not have authority to upload an F/W package (S126) and executes the process in step S124.

When determining in step S125 that the authority of the requester is not lower than that of an administrator, the package management section 25*b* causes the target user terminal to display a package specifying screen to be used by the user to specify an F/W package to be uploaded (S127). Here, the package specifying screen is closed when an F/W package is specified.

After the process in step S127, the package management section 25*b* determines whether an F/W package has been specified in the package specifying screen until it is determined that an F/W package has been specified in the package specifying screen (S128).

When determining that an F/W package has been specified in the package specifying screen in step S128, the package management section 25*b* accepts upload of the F/W package specified in the package specifying screen (S129). Specifically, the package management section 25*b* stores the F/W package specified in the package specifying screen in the storage section 24.

After the process in step S129, the package management section 25*b* updates the package management screen so that the latest information is displayed in the list 511 (S130) and executes the process in step S124.

When determining in step S124 that the upload button 512 has not been pressed, the package management section 25*b* determines whether the delete button 513 has been pressed (S131).

When it is determined in step S131 that the delete button 513 has been pressed, the automatic update section 25*d* determines whether the authority of the requester is not lower than that of an administrator in the same manner as in step S125 (S132).

When it is determined in step S132 that the authority of the requester is lower than that of an administrator, the package management section 25*b* causes the target user terminal to display information indicating that the requester does not have authority to delete an F/W package (S133) and executes the process in step S124.

When it is determined in step S132 that the authority of the requestor is not lower than that of an administrator, the package management section 25*b* causes the target user terminal to display a screen for notifying that an automatic F/W update is affected (hereinafter referred to as an "influence notification screen") in the target user terminal (S134).

Figure 17:
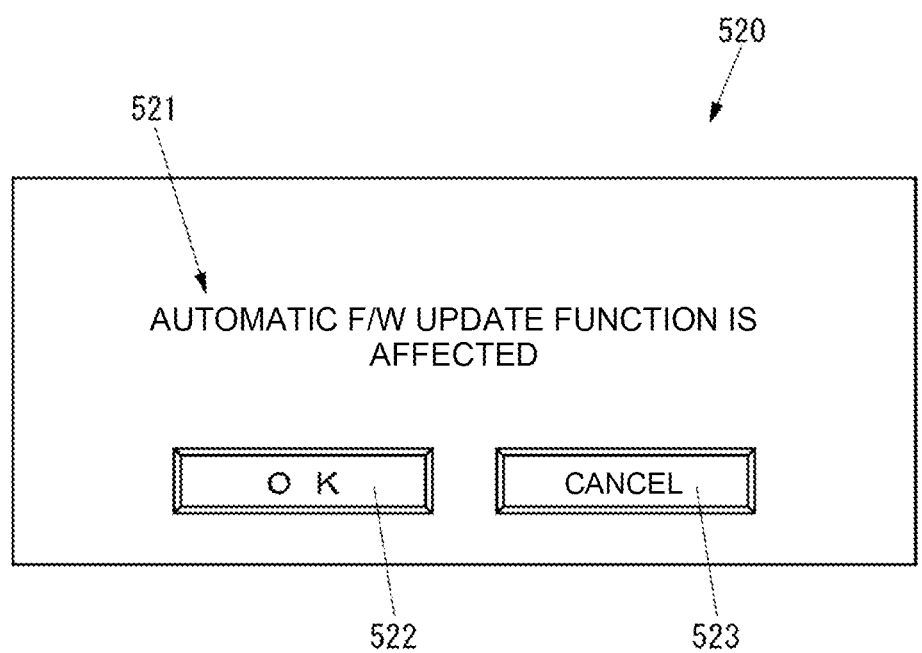
FIG. 17 is a diagram illustrating an example of an influence notification screen displayed in the user terminal in the operation illustrated in FIGS. 14 and 15.

FIG. 17 is a diagram illustrating an example of an influence notification screen 520 displayed in the user terminal in the operation illustrated in FIGS. 14 and 15.

As shown in FIG. 17, the influence notification screen 520 includes a message 521 indicating that automatic F/W update is affected, an OK button 522 for instructing continuation of the process, and a cancel button 523 for instructing cancellation of the process. The influence notification screen 520 is closed when the OK button 522 or the cancel button 523 is pressed.

As shown in FIGS. 14 to 15, after the process in step S134, the automatic update section 25*d* determines whether the OK button has been pressed in the influence notification screen (S135).

When determining in step S135 that the OK button has not been pressed in the influence notification screen, the automatic update section 25*d* determines whether the cancel button has been pressed in the influence notification screen (S136).

When determining in step S136 that the cancel button has not been pressed in the influence notification screen, the automatic update section 25d executes the process in step S135.

When it is determined in step S135 that the OK button has been pressed in the influence notification screen, the package management section 25b deletes the F/W package which is being selected in the list 511 at a time when the delete button 513 is pressed from the storage section 24 (S137).

After the process in step S137, the automatic update section 25d changes a value of the item "Enable/Disable" of the automatic F/W update plan which represents that the F/W package deleted in step S137 is a target of the automatic F/W update to "Warning" indicating that the automatic F/W update plan is in an inappropriate situation (S138).

Thereafter, the automatic update section 25d sets a value of the item "Status" of the task information 24n to "Cancel" in all automatic F/W update tasks having a value of the item "Status" of the task information 24n of "Pending" included in the automatic F/W update tasks associated with the automatic F/W update plan in which the F/W package deleted in step S137 is a target of the automatic F/W update (S139), and then performs the process in step S130.

When it is determined in step S136 that the cancel button has been pressed in the influence notification screen or determined in step S131 that the deletion button 513 has not been pressed, the package management section 25b determines whether the publishing button 514 has been pressed (S140).

When determining in step S140 that the publishing button 514 has been pressed, the package management section 25b determines whether the authority of the requester is not lower than that of an administrator in the same manner as in step S125 (S141).

When determining in step S141 that the authority of the requester is lower than that of an administrator, the package management section 25b causes the target user terminal to display information indicating that the requester does not have authority to publish an F/W package (S142) and executes the process in step S124.

When determining in step S141 that the authority of the requester is not lower than that of an administrator, the package management section 25b publishes the F/W package which is being selected in the list 511 at a time when the publishing button 514 is pressed (S143).

After the process in step S143, the package management section 25b executes the process in step S130.

When determining in step S140 that the publishing button 514 has not been pressed, the package management section 25b determines whether the unpublishing button 515 has been pressed (S144).

When it is determined in step S144 that the unpublishing button 515 has been pressed, the automatic update section 25d determines whether the authority of the requester is not lower than that of an administrator in the same manner as in step S125 (S145).

When it is determined in step S145 that the authority of the requester is lower than that of an administrator, the package management section 25b causes the target user terminal to display information indicating that the requester does not have authority to unpublish an F/W package (S146) and executes the process in step S124.

When it is determined in step S145 that the authority of the requester is not lower than that of an administrator, the package management section 25b causes the target user terminal to display the influence notification screen in the same manner as in step S134 (S147).

After the process in step S147, the automatic update section 25d determines whether the OK button has been pressed in the influence notification screen (S148).

When determining in step S148 that the OK button has not been pressed in the influence notification screen, the automatic update section 25d determines whether the cancel button has been pressed in the influence notification screen (S149).

When determining in step S149 that the cancel button has not been pressed in the influence notification screen, the automatic update section 25d executes the process in step S148.

When it is determined in step S148 that the OK button has been pressed in the influence notification screen, the package management section 25b unpublishes the F/W package which is being selected in the list 511 at a time when the unpublishing button 515 is pressed (S150).

After the process in step S150, the automatic update section 25d changes a value of the item "Enable/Disable" of the automatic F/W update plan which represents that the F/W package unpublished in step S150 is a target of the automatic F/W update to "Warning" (S151).

Thereafter, the automatic update section 25d sets a value of the item "Status" of the task information 24n to "Cancel" in all the automatic F/W update tasks in which a value of the item "Status" of the task information 24n is "Pending" included in the automatic F/W update tasks associated with the automatic F/W update plan in which the F/W package unpublished in step S150 is a target of the automatic F/W update (S152), and then performs the process in step S130.

When it is determined in step S144 that the unpublishing button 515 has not been pressed or when it is determined in step S149 that the cancel button has been pressed in the influence notification screen, the package management section 25b determines whether the package management screen 510 has been closed (S153).

When determining in step S153 that the package management screen 510 has not been closed, the package management section 25b executes the process in step S124.

When determining in step S153 that the package management screen 510 has been closed, the package management section 25b terminates the operation illustrated in FIGS. 14 and 15.

Next, an operation of the device management system 20 performed when the manual F/W update is executed will be described.

Figure 18:
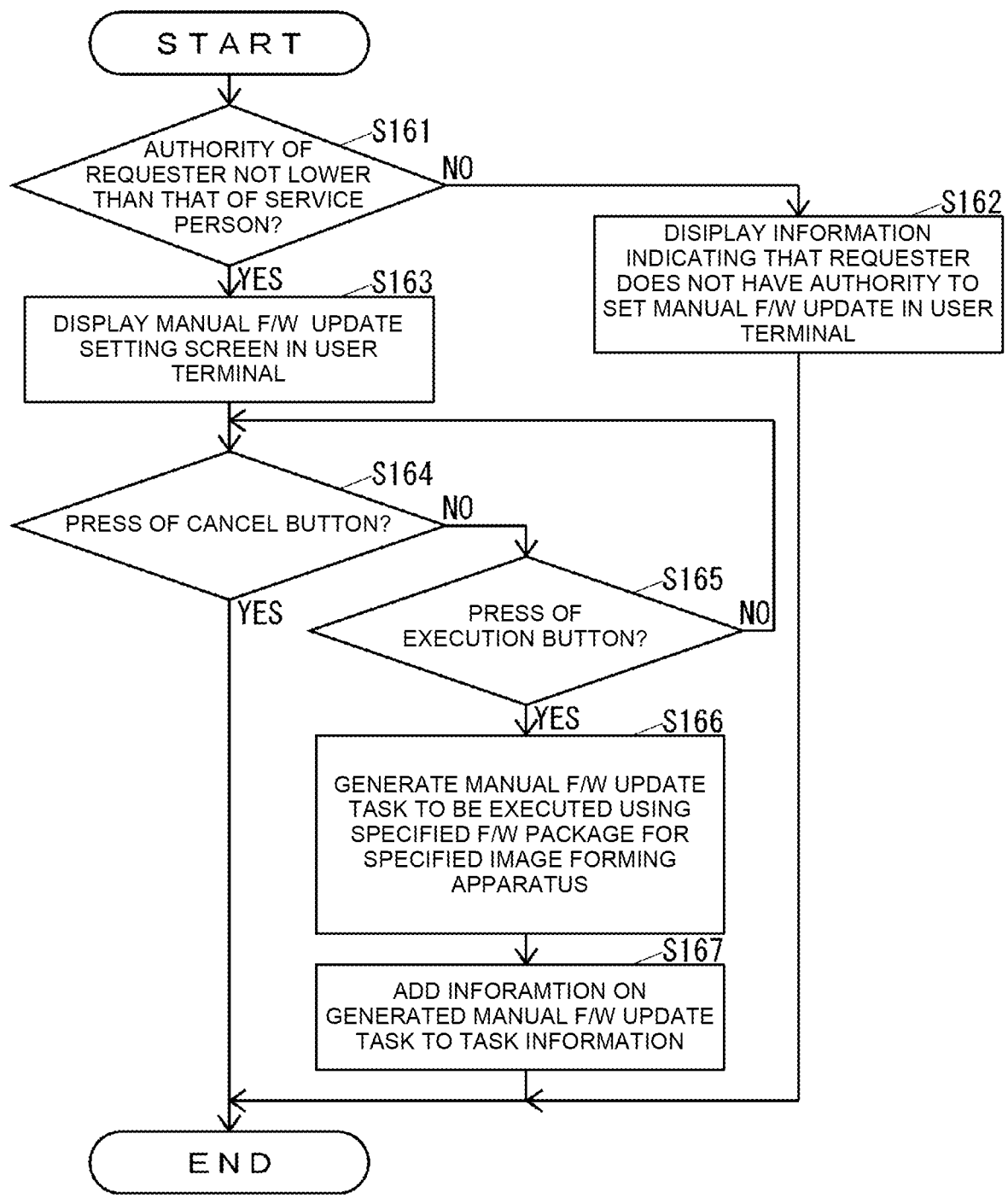
FIG. 18 is a flowchart of an operation of the device management system illustrated in FIG. 3 performed when manual F/W update is executed.

FIG. 18 is a flowchart of an operation of the device management system 20 performed when the manual F/W update is executed.

A user who is logging into the device management system 20 may transmit a request (hereinafter referred to as a "manual F/W update setting request") for setting the manual F/W update to the device management system 20 through a user terminal (hereinafter referred to as a "target user terminal" in a description made with reference to FIG. 18). When receiving the manual F/W update setting request, the manual update section 25c of the device management system 20 performs the operation shown in FIG. 18.

As shown in FIG. 18, the manual update section 25c determines whether authority of the user who has transmitted the manual F/W update setting request (hereinafter referred to as a "requester" in the description of FIG. 18) is not lower than that of a service person in the same manner as in the process in step S121 (S161).

When determining in step S161 that the authority of the requester is lower than that of a service person, the manual update section 25c causes the target user terminal to display information indicating that the requester does not have authority to set the manual F/W update (S162) and terminates the operation shown in FIG. 18.

When determining in step S161 that the authority of the requester is not lower than that of a service person, the manual update section 25c transmits data on a screen for setting the manual F/W update (hereinafter referred to as a "manual F/W update setting screen") to the target user terminal so as to cause the target user terminal to display the manual F/W update setting screen (S163).

Figure 19:
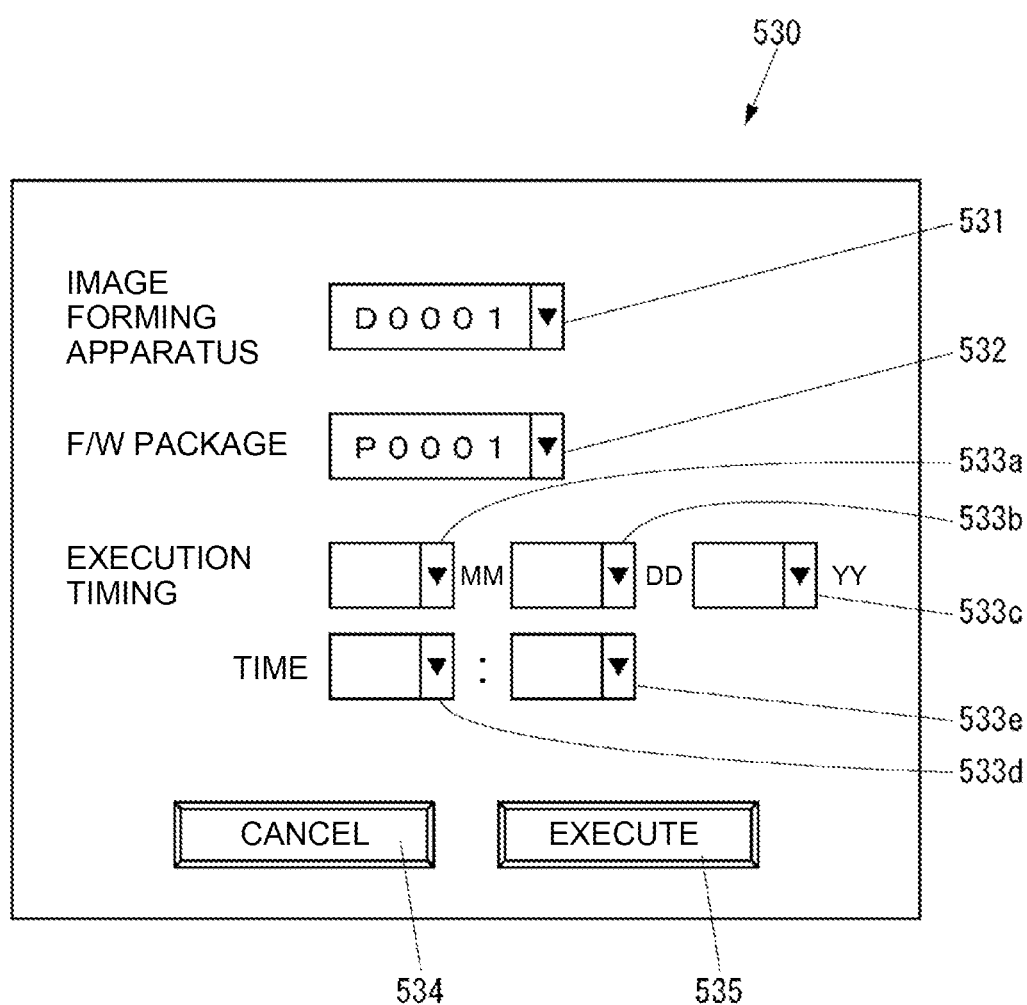
FIG. 19 is a diagram illustrating an example of a manual F/W update setting screen displayed in the user terminal in the operation illustrated in FIG. 18.

FIG. 19 is a diagram illustrating an example of a manual F/W update setting screen 530 displayed in the user terminal in the operation illustrated in FIG. 18.

As shown in FIG. 19, the manual F/W update setting screen 530 includes a drop-down list 531 for selecting an image forming apparatus of a target of the manual F/W update, a drop-down list 532 for selecting a F/W package of a target of the manual F/W update, and drop-down lists 533a to 533e for selecting "month", "day", "year", "hour", and "minute", respectively, of a scheduled time of execution of the manual F/W update, a cancel button 534 for canceling settings in the manual F/W update setting screen 530, and an execution button 535 for executing the settings in the manual F/W update setting screen 530. In the drop-down list 531, an image forming apparatus is represented by a device ID. In the drop-down list 532, an F/W package is represented by a package ID. The manual F/W update setting screen 530 is closed when a cancel button 534 or an execution button 535 is pressed.

As shown in FIG. 18, the manual update section 25c determines whether the cancel button 534 has been pressed (S164) after the process in step S163.

When the manual update section 25c determines in step S164 that the cancel button 534 has been pressed, the operation shown in FIG. 18 is terminated.

When determining in step S164 that the cancel button 534 has not been pressed, the manual update section 25c determines whether the execution button 535 has been pressed (S165).

When determining in step S165 that the execution button 535 has not been pressed, the manual update section 25c executes the process in step S164.

When determining in step S165 that the execution button 535 has been pressed, the manual update section 25c generates, in the storage section 24, a manual F/W update task to be executed, using the F/W package specified in the drop-down list 532 at the time when the execution button 535 is pressed, on the image forming apparatus specified in the drop-down list 531 at a time when the execution button 535 is pressed while the scheduled execution time specified by the drop-down lists 533a to 533e at the time when the execution button 535 is pressed is set (S166).

After the process in step S166, the manual update section 25c adds information on the manual F/W update task generated in step S166 to the task information 24n (S167). Here, when adding information to the task information 24n in step S167, the manual update section 25c adds "Pending" as a value of the item "Status" in the information to be added.

After the process in step S167, the manual update section 25c terminates the operation illustrated in FIG. 18.

Next, an operation of the device management system 20 performed when the automatic F/W update group setting is edited will be described.

Figure 20:
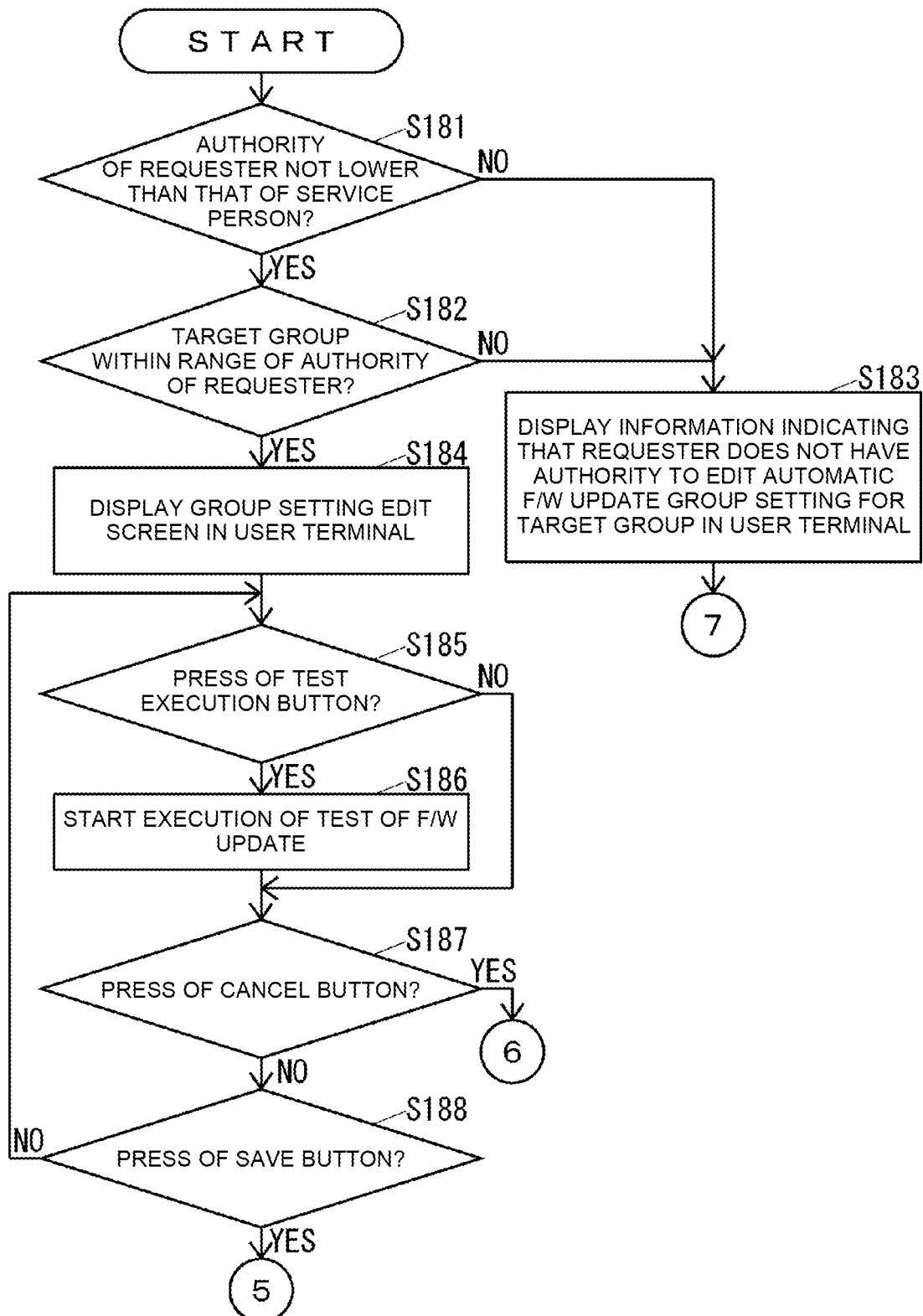
FIG. 20 is a flowchart of an operation of the device management system illustrated in FIG. 3 performed when the automatic F/W update group setting is edited.
Figure 21:
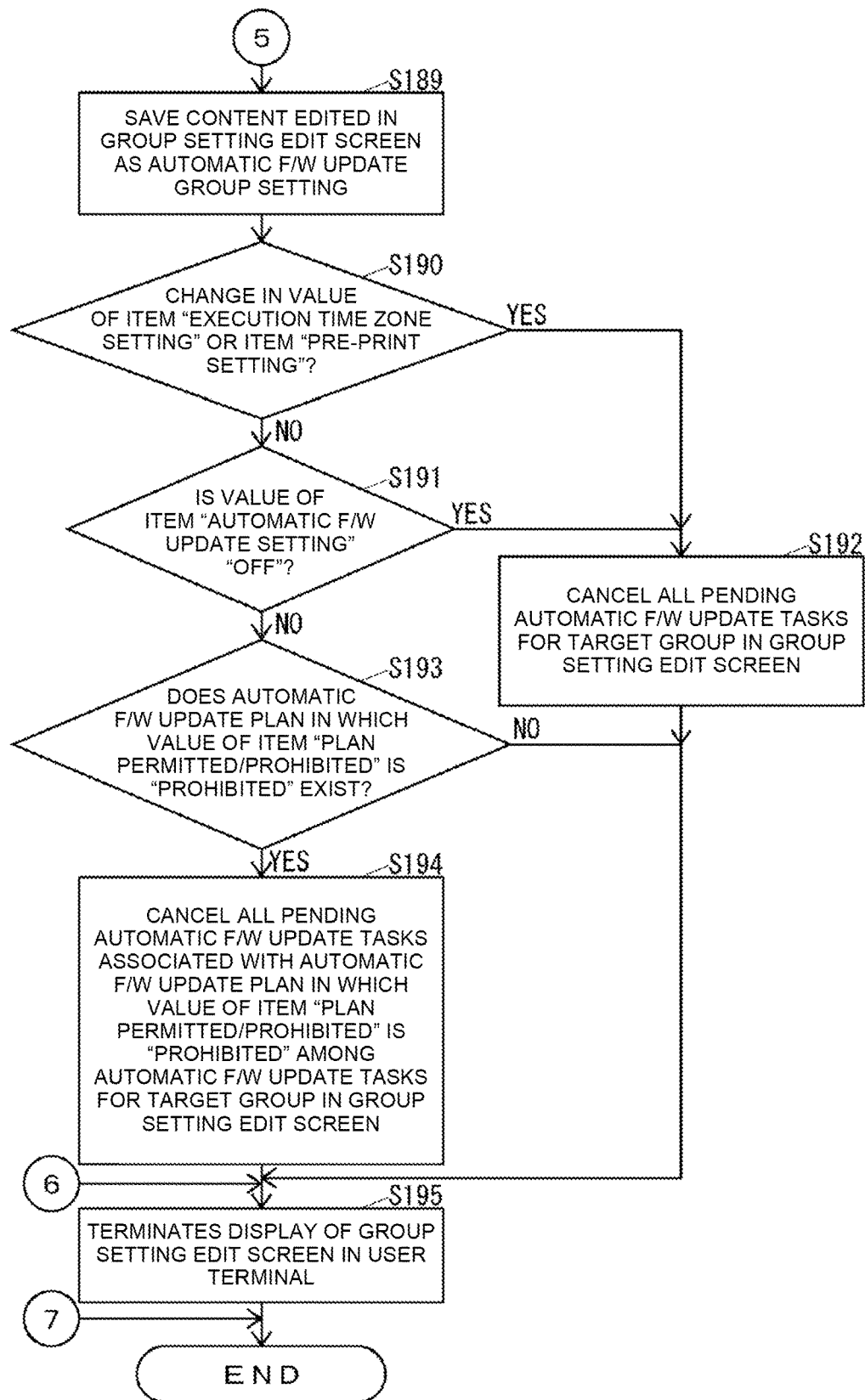
FIG. 21 is a flowchart following the flowchart of FIG. 20.

FIG. 20 is a flowchart of a portion of an operation of the device management system 20 performed when the automatic F/W update group setting is edited. FIG. 21 is a flowchart following the flowchart of FIG. 20.

A user who is logging into the device management system 20 may transmit a request (hereinafter referred to as a "group setting edit start request") for starting edit of the automatic F/W update group setting of one group specified by the group information 24e to the device management system 20 through a user terminal (hereinafter referred to as a "target user terminal" in a description made with reference to FIGS. 20 and 21 and a description made below with reference to FIG. 23). When receiving the group setting edit start request, the control section 25 of the device management system 20 performs an operation shown in FIGS. 20 and 21.

As shown in FIGS. 20 and 21, the automatic update section 25d determines whether authority of the user who has transmitted the group setting edit start request (hereinafter referred to as a "requester" in the description of FIGS. 20 and 21 and the description of FIG. 23 below) is not lower than that of a service person in the same manner as in the process in step S121 (S181).

When determining in step S181 that the authority of the requester is not lower than that of a service person, the automatic update section 25d determines whether a target group of the group setting edit start request is within a range of the authority of the requester (S182).

When determining in step S181 that the authority of the requester is lower than that of a service person or determining in step S182 that the target group of the group setting edit start request is not within the range of the authority of the requester, the automatic update section 25d causes the target user terminal to display information indicating that the requester does not have the authority to edit the automatic F/W update group setting for the group of the target of the group setting edit start request (S183), and thereafter, terminates the operation in FIGS. 20 and 21.

When determining in step S182 that the target group of the group setting edit start request is within the range of the authority of the requester, the automatic update section 25d transmits data on a screen (hereinafter referred to as a "group setting edit screen") for editing the automatic F/W update group setting to the target user terminal so as to cause the target user terminal to display the group setting edit screen (S184).

FIG. 22 is a diagram illustrating an example of a group setting edit screen 600 displayed on the user terminal in the operation illustrated in FIGS. 20 and 21.

As shown in FIG. 22, the group setting edit screen 600 includes a region 610 for editing the item "Automatic F/W update setting" in the automatic F/W update group setting, a region 630 for editing the item "Execution Time Zone Setting" in the automatic F/W update group setting, a region 660 for editing the item "Pre-print setting" in the automatic F/W update group setting, a cancel button 671 for canceling editing in the group setting edit screen 600, and a save button 672 for saving the edited content in the group setting edit screen 600.

The region 610 includes a radio button 611 for specifying "ON" as a value of the item "Automatic F/W Update Setting" in the automatic F/W update group setting, a radio button 612 for specifying "OFF" as a value of the item "Automatic F/W Update Setting" in the automatic F/W update group setting, a radio button 613 for specifying "Select" as a value of the item "Automatic F/W Update Setting" in the automatic F/W update group setting, and a region 620 that is operable only when the radio button 613 is selected. Only one of the radio buttons 611 to 613 is always be selected.

The region 620 includes a region 621 for editing the item "Plan Permitted/Prohibited" in the automatic F/W update group setting, a region 622 for editing the item "Notification Setting" in the automatic F/W update group setting, and a region 623 used to perform a test of the F/W update.

The region 621 includes a list 621a showing a list of automatic F/W update plans to be set in the item "Plan Permitted/Prohibited" in the automatic F/W update group setting, a radio button 621b for specifying "Permitted" indicating that the automatic F/W update based on the automatic F/W update plan shown in the list 621a is permitted, and a radio button 621c for specifying "Prohibited" indicating that the automatic F/W update based on the automatic F/W update plan shown in the list 621a is not permitted. In the list 621a, the automatic F/W update plan is represented by a plan ID. The automatic update section 25d shows in the list 621a automatic F/W update plans in which a target group of the group setting edit screen 600 is a target of the automatic F/W update, regardless of whether the automatic F/W update plans are in an enabled state, a disabled state, or a Warning state. The radio button 621b and the radio button 621c are arranged for each automatic F/W update plan shown in the list 621a. Only one of the radio buttons 621b and 621c is always be selected for each automatic F/W update plan.

The region 622 includes a list 622a showing a list of users that can be set to the item "Notification Setting" in the automatic F/W update group setting, a drop-down list 622b for selecting a user to be added to the list 622a, an addition button 622c for adding a user selected in the drop-down list 622b to the list 622a, and a deletion button 622d for removing a user selected in the list 622a from the list 622a. In the list 622a and the drop-down list 622b, a user is represented by a user ID. The automatic update section 25d may display only the users included in the address information 24d in the drop-down list 622b.

The region 623 includes a drop-down list 623a for selecting an automatic F/W update plan to execute a test of the F/W update, a drop-down list 623b for selecting an image forming apparatus of a target of the test of the F/W update, and a test execution button 623c for executing the test of the F/W update. In the drop-down list 623a, an automatic F/W update plan is represented by a plan ID. In the drop-down list 623b, an image forming apparatus is represented by a device ID. The automatic update section 25d may show in the drop-down list 623a only an automatic F/W update plan in which a target group of the group setting edit screen 600 is a target of the automatic F/W update, regardless of whether the automatic F/W update plan is in an enabled state, a disabled state, or a Warning state. The automatic update section 25d may display in the drop-down list 623b, based on the device information 24f, only an image forming apparatus of a target model of an F/W package of the automatic F/W update plan selected in the drop-down list 623a among the image forming apparatuses belonging to the target group of the group setting edit screen 600.

The region 630 includes a region 640 for editing the item "Day Setting" in the item "Execution Time Zone Setting" in the automatic F/W update group setting, and a region 650 for editing the item "Time Zone Setting" in the item "Execution Time Zone Setting" in the automatic F/W update group setting.

The region 640 includes a radio button 641 for specifying "Everyday" as a value of the item "Day Setting" in the item "Execution Time Zone Setting" in the automatic F/W update group setting, a radio button 642 for specifying "Day of the Week" as a value of the item "Day Setting" in the item "Execution Time Zone Setting" in the automatic F/W update group setting, a region 643 that is operable only when the radio button 642 is selected. Only one of the radio buttons 641 and 642 is always be selected. The region 643 includes check boxes 643a, to 643g for specifying "Monday", "Tuesday", "Wednesday", "Thursday", "Friday", "Saturday", and "Sunday", respectively, as values of the item "Day Setting" of the item "Execution Time Zone Setting" in the automatic F/W update group setting.

The region 650 includes a drop-down list 651 for specifying a start point of a time zone that is a value of the item "Time Zone Setting" in the item "Execution Time Zone Setting" in the automatic F/W update group setting, and a drop-down list 652 for specifying an end point of the time zone that is a value of the item "Time Zone Setting" in the item "Execution Time Zone Setting" in the automatic F/W update group setting.

The region 660 includes a region 661 for editing the item "Pre-Print On/Off" in the item "Pre-Print Setting" in the automatic F/W update group setting, and a region 662 for editing the item "Language Setting" in the item "Pre-Print Setting" in the automatic F/W update group setting.

The region 661 includes radio buttons 661a and 661b for specifying "ON" and "OFF", respectively, as values of the item "Pre-Print On/Off" of the item "Pre-Print Setting" in the automatic F/W update group setting. Only one of the radio buttons 661a and 661b is always be selected.

The region 662 includes a drop-down list 662a for specifying a value of the item "Language Setting" in the item "Pre-Print Setting" in the automatic F/W update group setting. The automatic update section 25d may display a "Language Set in Its Delegated Group" indicating a language set in the delegated group to which a target group of the group setting edit screen 600 belongs in the language setting 24g and various specific languages in the drop-down list 662a.

As shown in FIGS. 20 and 21, after the process in step S184, the automatic update section 25d determines whether the test execution button 623c has been pressed (S185).

When the automatic update section 25d determines in step S185 that the test execution button 623c has been pressed, the automatic update section 25d starts execution of a test of the F/W update for the image forming apparatus that is selected in the drop-down list 623b at a time when the test execution button 623c is pressed, using the F/W package of a target of the automatic F/W update plan selected in the drop-down list 623a at the time when the test execution button 623c is pressed (S186).

When determining in step S185 that the test execution button 623c has not been pressed or when terminating the process in step S186, the automatic update section 25d determines whether the cancel button 671 has been pressed (S187).

When determining in step S187 that the cancel button 671 has not been pressed, the automatic update section 25d determines whether the save button 672 has been pressed (S188).

When determining in step S188 that the save button 672 has not been pressed, the automatic update section 25d executes the process in step S185.

When determining in step S188 that the save button 672 has been pressed, the automatic update section 25d saves content of edit performed in the group setting edit screen 600 at a time when the save button 672 is pressed in the storage section 24 as the automatic F/W update group setting (S189). Here, when the radio button 613 is not selected in the group setting edit screen 600 at the time when the save button 672 is pressed, the automatic update section 25d does not store values of the item "Plan Permitted/Prohibited" and the item "Notification setting" in the automatic F/W update group setting to be saved in step S189.

After the processing in step S189, when the automatic F/W update group setting saved in step S189 is not a newly-created setting, that is, when the existing automatic F/W update group setting is edited, the automatic update section 25d determines whether a value of the item "Execution Time Zone Setting" or a value of the item "Pre-print setting" in the automatic F/W update group setting has been changed by saving in step S189 (S190).

When determining that the value of the item "Execution Time Zone Setting" and the value of the item "Pre-print setting" in the automatic F/W update group setting are not changed by the saving in S189, in step S190, the automatic update section 25d determines whether a value of the item "Automatic F/W Update Setting" is "Off" in the automatic F/W update group setting saved in step S189 (S191).

When determining in step S190 that the value of the item "Execution Time Zone Setting" or the value of the item "Pre-print setting" in the automatic F/W update group setting is changed by the saving in step S189, or when determining in step S191 that the value of the item "Automatic F/W Update Setting" in the automatic F/W update group setting saved in step S189 is "OFF", the automatic update section 25d sets a value "Cancel" to the item "Status" of the task information 24n in all automatic F/W update tasks in which the value of the item "Status" in the task information 24n is "Pending" among the automatic F/W update tasks for the target group in the group setting edit screen 600 (S192).

When determining in step S191 that the value of the item "Automatic F/W Update Setting" in the automatic F/W update group setting saved in S189 is not "Off", the automatic update section 25d determines whether at least one of the automatic F/W update plans has a value of the item "Automatic F/W Update Setting" of "Select" and a value of the item "Plan Permitted/Prohibited" of "Prohibited" in the automatic F/W update group setting saved in step S189 (S193).

When determining in step S193 that at least one of the automatic F/W update plans has the value of the item "Automatic F/W Update Setting" of "Select" and the item "Plan Permitted/Prohibited" of "Prohibited" in the automatic F/W update group setting saved in step S189, the automatic update section 25d sets a value "Cancel" to the item "Status" of the task information 24n in all the automatic F/W update tasks in which the value of the item "Status" in the task information 24n is "Pending" among the automatic F/W update tasks associated with the automatic F/W update plan having the value of the item "Plan Permitted/Prohibited" of "Prohibited" in the automatic F/W update group setting saved in step S189 in the automatic F/W update tasks for the target group of the group setting edit screen 600 (S194).

When the automatic update section 25d determines in step S187 that the cancel button 671 has been pressed, when the automatic update section 25d determines in step S193 that an automatic F/W update plan in which a value of the item "Automatic F/W Update Setting" is "Select" and a value of the item "Plan Permitted/Prohibited" is "Prohibited" does not exist in the automatic F/W update group setting" saved in S189, or when the process in step S192 or step S194 is terminated, the automatic update section 25d causes the target user terminal to terminate the display of the group setting edit screen 600 (S195), and thereafter, the operation illustrated in FIGS. 20 and 21 is terminated.

Note that the operation shown in FIGS. 20 and 21 corresponds to an operation of the device management system 20 performed when the automatic F/W update group setting of one specific group is edited. However, the device management system 20 may simultaneously edit automatic F/W update group settings of a plurality of groups in a similar manner.

Figure 23:
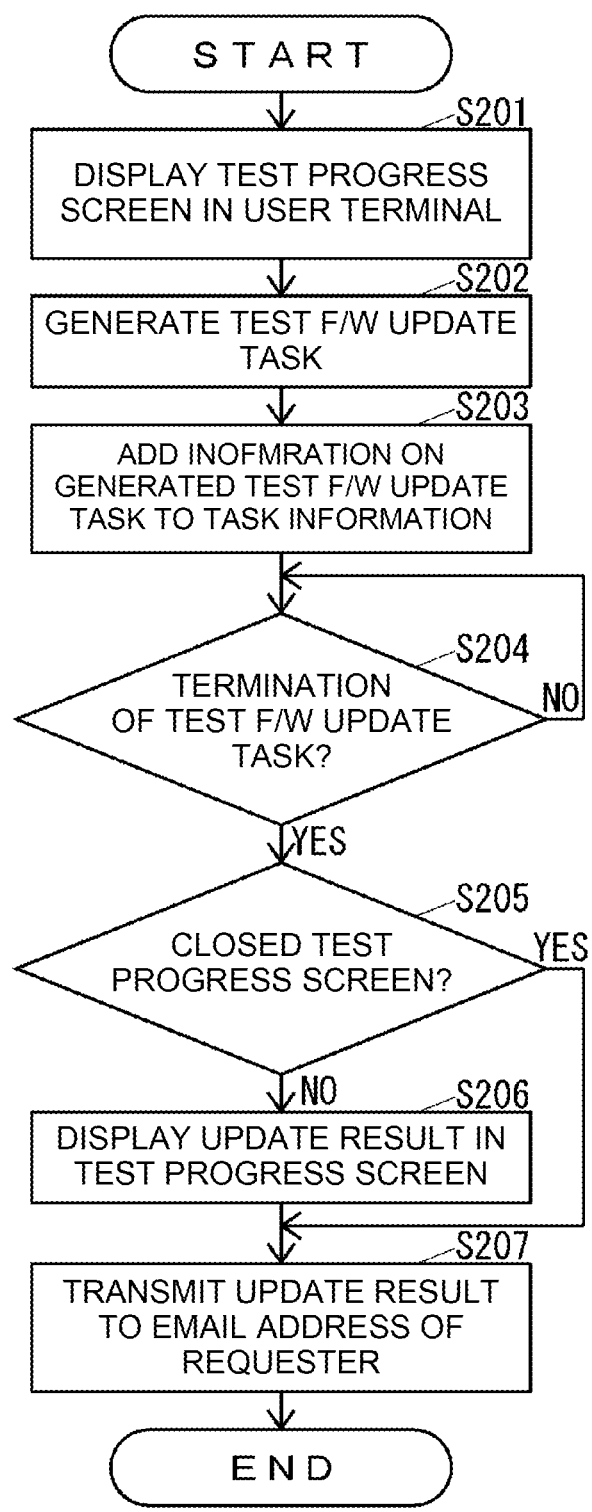
FIG. 23 is a flowchart of an operation of the device management system illustrated in FIG. 3 performed when an F/W update test is executed.

FIG. 23 is a flowchart of an operation of the device management system 20 performed when an F/W update test is executed.

After executing the process in step S186 in the process shown in FIGS. 20 and 21, the automatic update section 25d displays a test progress screen indicating progress a test of the F/W update in the target user terminal (S201) as shown in FIG. 23. Note that, thereafter, the automatic update section 25d displays the progress of the test of the F/W update on the test progress screen at an appropriate timing, such as a timing when a change in the progress has occurred. The test progress screen may be closed by the user of the target user terminal.

After the process in step S201, the automatic update section 25d generates in the storage section 24 a test F/W update task to be executed using an F/W package of a target of the automatic F/W update plan selected in the drop-down list 623a at a time when the test execution button 623c is pressed for the image forming apparatus selected in the drop-down list 623b at the time when the test execution button 623c is pressed (S202). Here, the test F/W update task is an F/W update task immediately executed when the F/W update in the target image forming apparatus is executable. Therefore, the automatic update section 25d does not set a specific scheduled execution time for the test F/W update task.

After the process in step S202, the automatic update section 25d adds information on the test F/W update task generated in step S202 to the task information 24n (S203). Here, when adding information to the task information 24n in step S203, the automatic update section 25d adds "Pending" as a value of the item "Status" in the information to be added.

After the process in step S203, the automatic update section 25d determines whether execution of the test F/W update task generated in step S202 has been completed (S204) until it is determined that the execution of the test F/W update task generated in step S202 has been completed. Here, the automatic update section 25d determines that the execution of the test F/W update task generated in step S202 is completed when the value of the item "Status" of the task information 24n becomes "Cancel", "Success", or "Failure" in the test F/W update task generated in step S202.

When determining that the execution of the test F/W update task generated in step S202 is terminated in step S204, the automatic update section 25d determines whether the test progress screen has been closed (S205).

When determining in step S205 that the test progress screen has not been closed, the automatic update section 25d displays a result of the update performed in accordance with the execution of the test F/W update task generated in step S202 on the test progress screen (S206).

When the automatic update section 25d determines in step S205 that the test progress screen is closed or when the process in step S206 is completed, the automatic update section 25d transmits, to an e-mail address of the requester stored in the address information 24d, the result of the update performed in accordance with the execution of the test F/W update task generated in step S202 (S207), and thereafter, the operation shown in FIG. 23 is completed.

The user who confirms the result displayed on the test progress screen in step S206 or the result notified in step S207 may set the value "Permitted" to the item "Plan Permitted/Prohibited" for the automatic F/W update plan of the test target via the group setting edit screen when the update is successfully performed as results of the display in the test progress screen in step S206 and the notification in step S207, or the user may set the value "Prohibited" to the item "Plan Permitted/Prohibited" for the automatic F/W update plan of the test target through the group setting edit screen when the update has failed as a result of the display in the test progress screen in step S206 or a result of the notification performed in step S207.

Next, an operation of the device management system 20 performed when an automatic F/W update plan is edited will be described.

Figure 24:
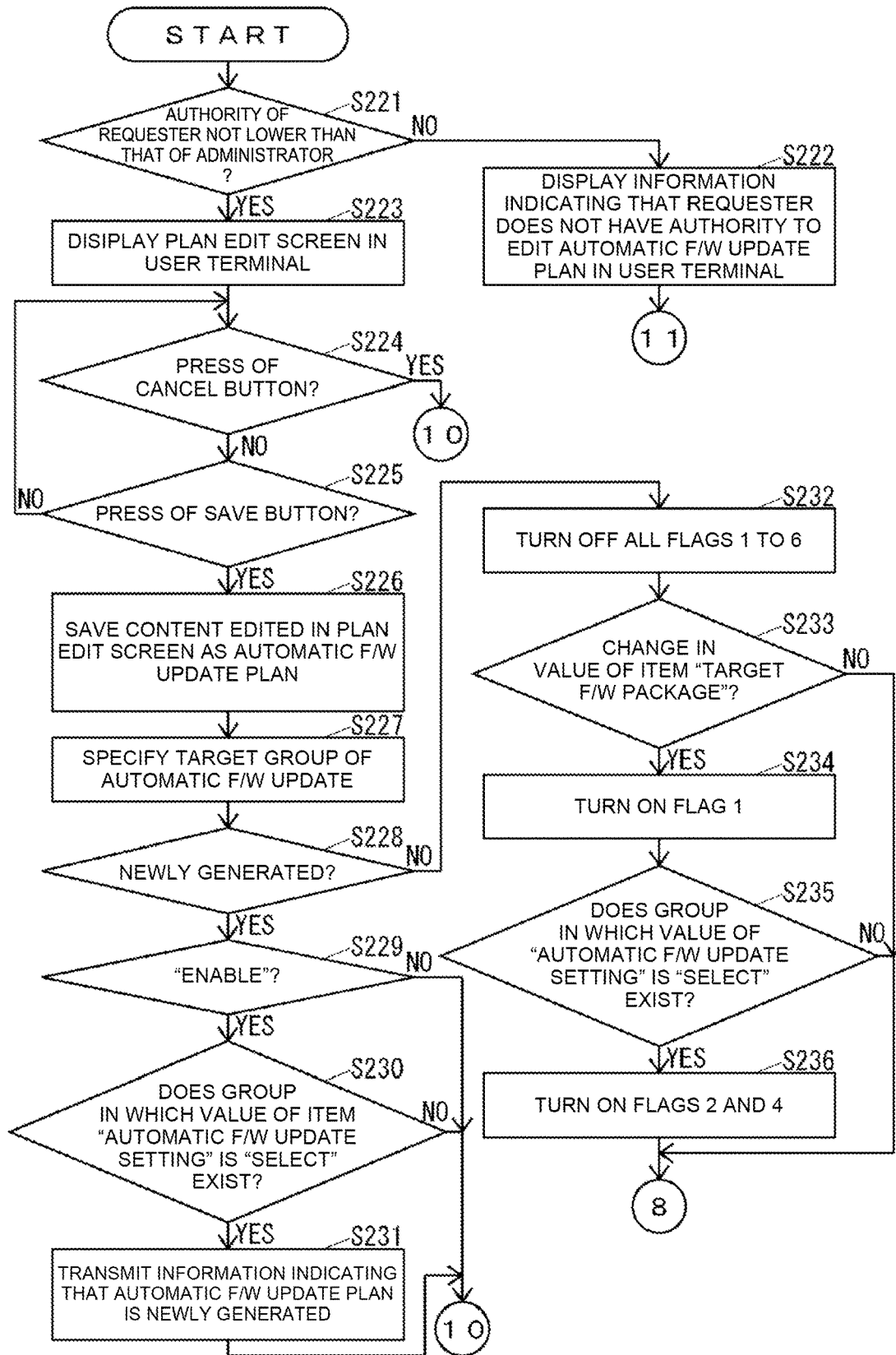
FIG. 24 is a flowchart of an operation of the device management system illustrated in FIG. 3 performed when the automatic F/W update plan is edited.
Figure 25:
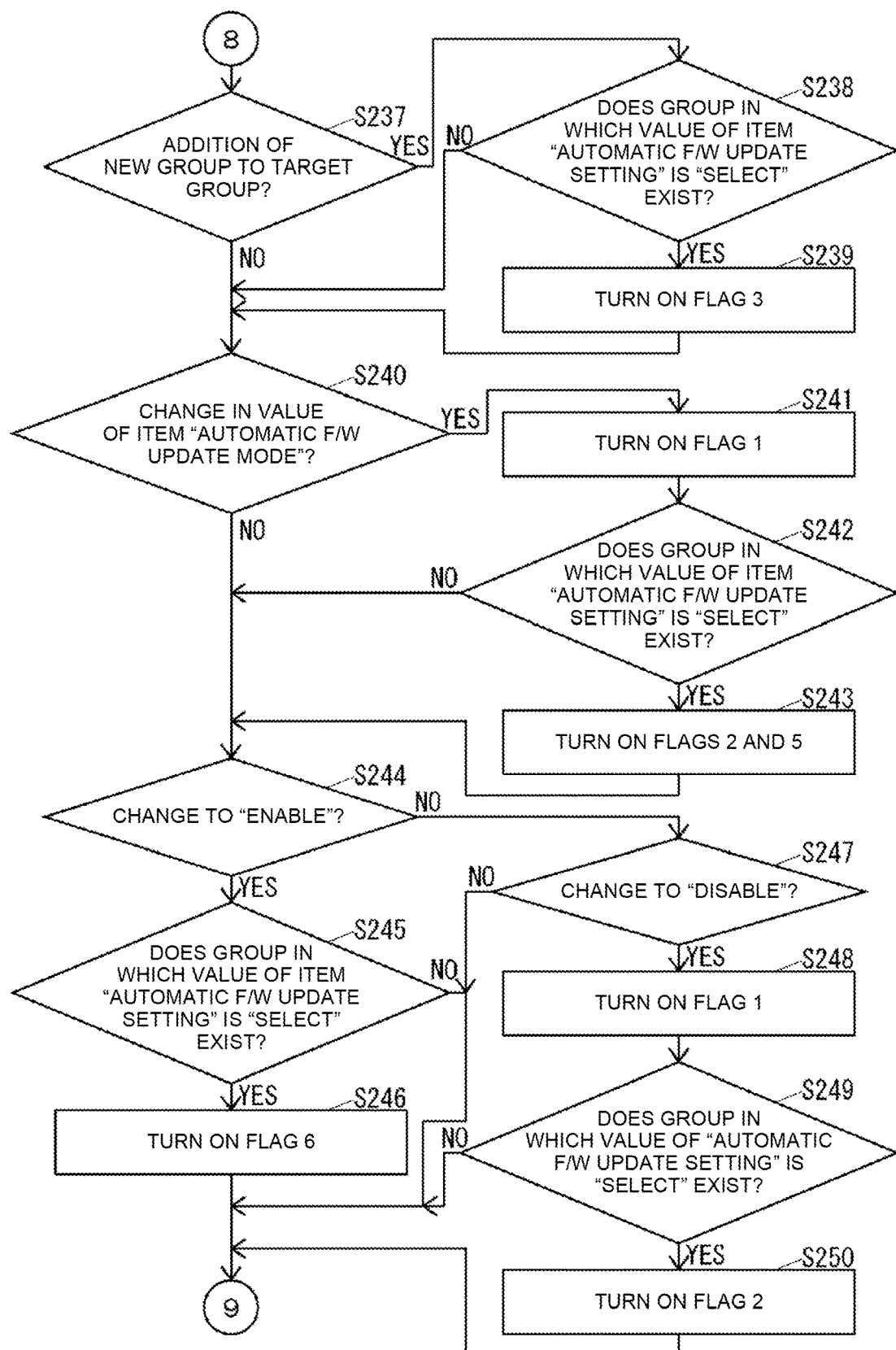
FIG. 25 is a flowchart following the flowchart of FIG. 24.
Figure 26:
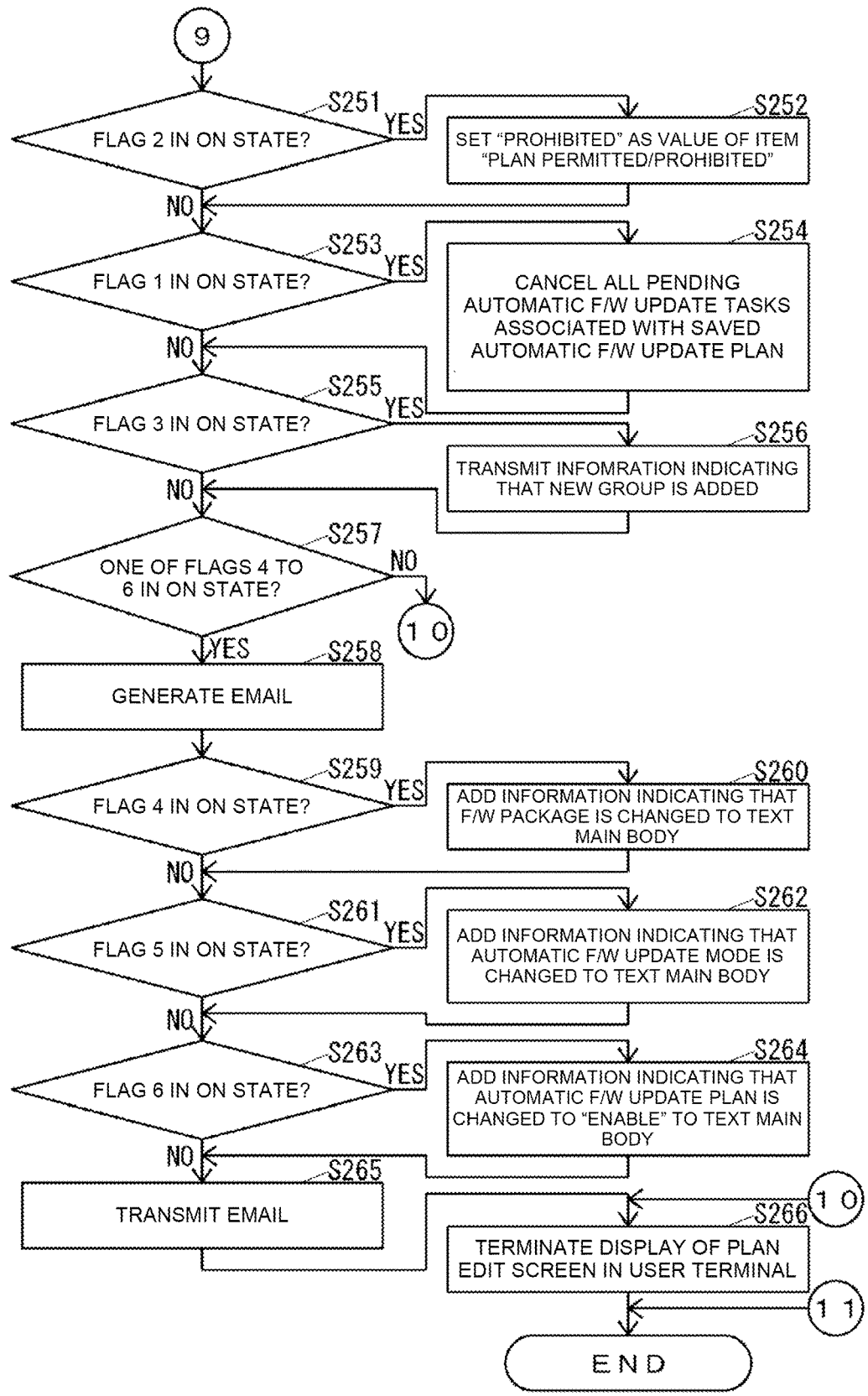
FIG. 26 is a flowchart following the flowchart of FIG. 25.

FIG. 24 is a flowchart of an operation of the device management system 20 performed when an automatic F/W update plan is edited. FIG. 25 is a flowchart following the flowchart of FIG. 24. FIG. 26 is a flowchart following the flowchart of FIG. 25.

A user who is logging into the device management system 20 may transmit a request (hereinafter referred to as a "plan edit start request") for starting edit of the automatic F/W update plan to the device management system 20 through a user terminal (hereinafter referred to as a "target user terminal" in a description made with reference to FIGS. 24 to 26). When receiving the plan edit start request, the control section 25 of the device management system 20 performs the operation shown in FIGS. 24 and 26.

As shown in FIGS. 24 to 26, the automatic update section 25d determines whether authority of the user who has transmitted the plan edit start request (hereinafter referred to as a "requester" in the description of FIGS. 24 to 26) is not lower than that of an administrator in the same manner as in the process in step S125 (S221).

When determining in step S221 that the authority of the requester is lower than that of an administrator, the automatic update section 25d causes the target user terminal to display information indicating that the requester does not have authority to edit the automatic F/W update plan (S222) and terminates the operation shown in FIGS. 24 to 26.

When determining in step S221 that the authority of the requester is not lower than that of an administrator, the automatic update section 25d transmits data on a screen (hereinafter referred to as a "plan edit screen") for editing the automatic F/W update plan to the target user terminal so as to cause the target user terminal to display the plan edit screen (S223).

Figure 27:
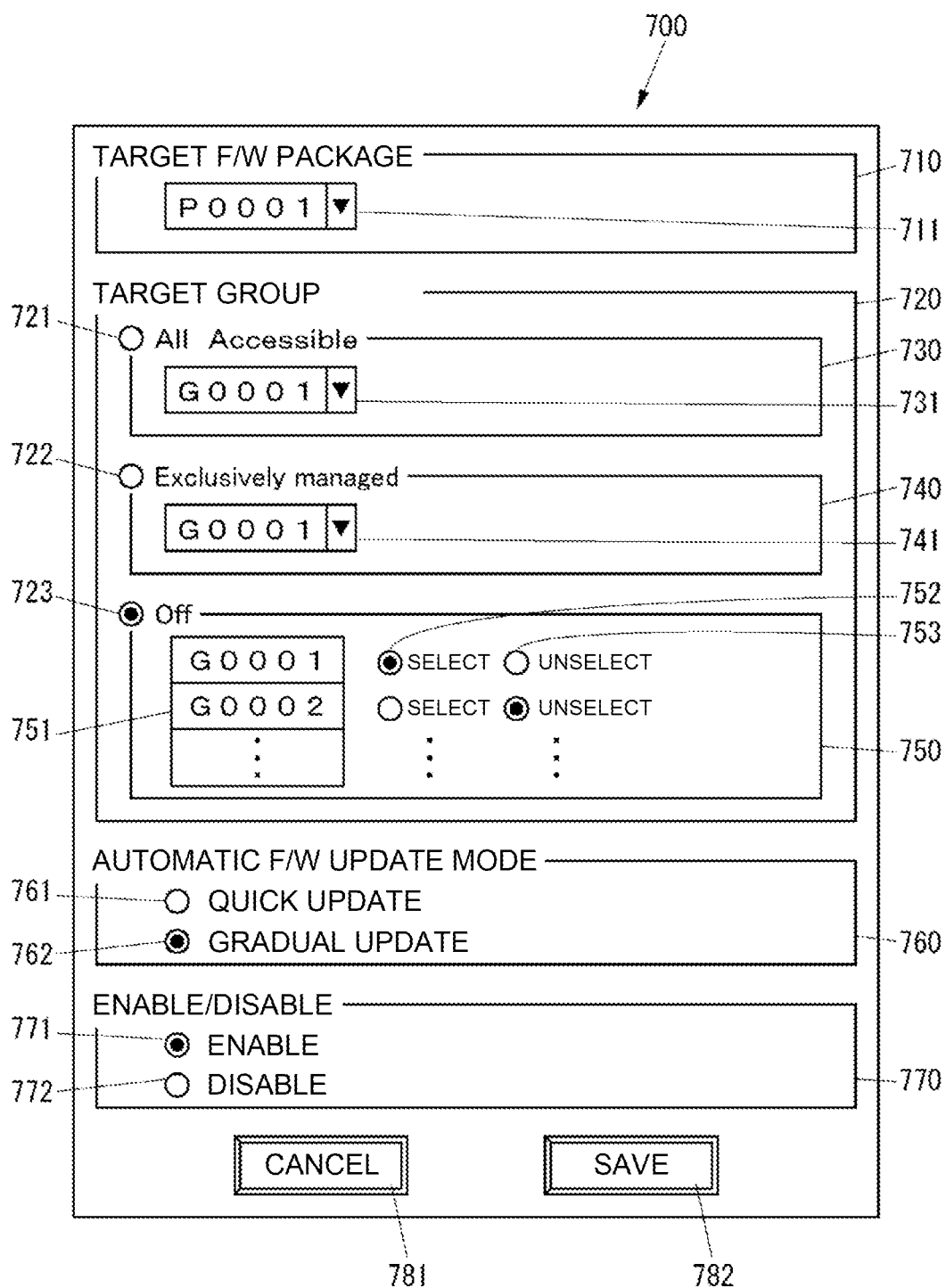
FIG. 27 is a diagram illustrating an example of a plan edit screen displayed in the user terminal in the operation illustrated in FIGS. 24 to 26.

FIG. 27 is a diagram illustrating an example of a plan edit screen 700 displayed in the user terminal in the operation illustrated in FIGS. 24 to 26.

As shown in FIG. 27, the plan edit screen 700 includes a region 710 for editing the item "Target F/W Package" in the automatic F/W update plan, a region 720 for editing the item "Target Group" in the automatic F/W update plan, a region 760 for editing the item "Automatic F/W Update Mode" in the automatic F/W update plan, a region 770 for editing the item "Enable/Disable" in the automatic F/W update plan, a cancel button 781 for canceling editing in the plan edit screen 700, and a save button 782 for saving the edited content in the plan edit screen 700.

The region 710 includes a drop-down list 711 for selecting an F/W package to be set in the item "Target F/W Package" in the automatic F/W update plan. In the drop-down list 711, an F/W package is represented by a package ID. The automatic update section 25d may display in the drop-down list 711 only F/W packages uploaded to the device management system 20, that is, only F/W packages that are published and that have a release type of firmware of "Official" among F/W packages stored in the storage section 24.

The region 720 includes a radio button 721 for specifying "All Accessible" as a value of the item "Target Group" in the automatic F/W update plan, a radio button 722 for specifying "Exclusively Managed" as a value of the item "Target Group" in the automatic F/W update plan, and a radio button 723 for specifying "Off" as a value of the item "Target Group" in the automatic F/W update plan, a region 730 operable only when the radio button 721 is selected, a region 740 operable only when the radio button 722 is selected, and a region 750 operable only when the radio button 723 is selected. Only one of the radio buttons 721 to 723 is always be selected.

The region 730 includes a drop-down list 731 for selecting a delegated group to be set in the item "Target Group" when "All Accessible" is specified in the item "Target Group" in the automatic F/W update plan. In the drop-down list 731, the delegated group is represented by a group ID. The automatic update section 25d may display only delegated groups within a range of the authority of the requester in the drop-down list 731 based on the group information 24e.

The region 740 includes a drop-down list 741 for selecting a delegated group to be set in the item "Target Group" when "Exclusively Managed" is specified in the item "Target Group" in the automatic F/W update plan. In the drop-down list 741, the delegated group is represented by a group ID. The automatic update section 25d may display only delegated groups within a range of the authority of the requester in the drop-down list 741 based on the group information 24e.

The region 750 includes a list 751 showing a list of groups that may be set to the item "Target Group" when "Off" is specified in the item "Target Group" in the automatic F/W update plan, a radio button 752 for specifying "Select" indicating that one of the groups shown in the list 751 is to be selected, and a radio button 753 for specifying "Unselect" indicating that none of the groups shown in the list 751 is selected. In the list 751, a group is represented by a group ID. The automatic update section 25d shows groups within a range of the authority of the requester in the list 751 based on the group information 24e. The radio button 752 and the radio button 753 are arranged for each group shown in the list 751. Only one of the radio buttons 752 and 753 is always selected for each group.

The region 760 includes a radio button 761 for specifying "Quick Update" as a value of the item "Automatic F/W Update Mode" in the automatic F/W update plan, and a radio button 762 for specifying "Gradual Update" as a value of the item "Automatic F/W Update Mode" in the automatic F/W update plan. Only one of the radio buttons 761 and 762 is always be selected.

The region 770 includes a radio button 771 for specifying "Enable" as a value of the item "Enable/Disable" in the automatic F/W update plan, and a radio button 772 for specifying "Disable" as a value of the item "Enable/Disable" in the automatic F/W update plan. Only one of the radio buttons 771 and 772 is always be selected.

As shown in FIGS. 24 to 26, the automatic update section 25d determines whether the cancel button 781 has been pressed after the process in step S223 (S224).

When determining in step S224 that the cancel button 781 has not been pressed, the automatic update section 25d determines whether the save button 782 has been pressed (S225).

When determining in step S225 that the save button 782 has not been pressed, the automatic update section 25d executes the process in step S224.

When determining in step S225 that the save button 782 has been pressed, the automatic update section 25d saves content edited in the plan edit screen 700 at a time when the save button 782 is pressed in the storage section 24 as an automatic F/W update plan (S226).

After the process in step S226, the automatic update section 25d identifies target groups of the automatic F/W update based on information shown in the item "Target Group" in the automatic F/W update plan saved in step S226 (S227).

After the process in step S227, the automatic update section 25d determines whether the automatic F/W update plan saved in step S226 is a newly-generated plan (S228).

When determining in step S228 that the automatic F/W update plan saved in step S226 is a newly-generated plan, the automatic update section 25d determines whether a value of the item "Enable/Disable" in the automatic F/W update plan saved in step S226 is "Enable" (S229).

When determining in step S229 that the value of the item "Enable/Disable" in the automatic F/W update plan stored in step S226 is "Enable", the automatic update section 25d determines whether a group in which a value of the item "Automatic F/W Update Setting" set in the automatic F/W update group setting is "Select" is included in target groups of the automatic F/W update specified in step S227 (S230).

When the automatic update section 25d determines in step S230 that a group in which a value of the item "Automatic F/W Update Setting" in the automatic F/W update group setting is "Select" is included in the target groups of the automatic F/W update specified in step S227, the automatic update section 25d transmits information indicating that an automatic F/W update plan stored in step S226 is newly generated to an e-mail address stored in the address information 24d, of a user indicated in the item "Notification Setting" of the automatic F/W update group setting of a group having a value of the item "Automatic F/W Update Setting" of "Select" in the automatic F/W update group setting among the target groups of the automatic F/W update specified in step S227 (S231). Therefore, when receiving the notification in step S231, the user may set, through the group setting edit screen, "Permitted" to a value of the item "Plan Permitted/Prohibited" for the automatic F/W update plan stored in step S226 in the automatic F/W update group setting of a group having a value of the item "Automatic F/W Update Setting" of "Select" in the automatic F/W update group setting among the target groups of the automatic F/W update specified in step S227, for example. Note that, when transmitting an e-mail in step S231 to the e-mail address of the user indicated in the item "Notification Setting" of the automatic F/W update group setting of the group in which the value of the item "Automatic F/W Update Setting" in the automatic F/W update group setting is "Select", a link of a URL (Uniform Resource Locator) of a page of the group setting edit screen of the automatic F/W update group setting is given to the e-mail.

When determining in step S228 that the automatic F/W update plan saved in step S226 is not a newly-generated plan, that is, the automatic F/W update plan saved in step S226 is obtained by editing an existing automatic F/W update plan, the automatic update section 25d turns off all flags 1 to 6 (S232).

Subsequently, the automatic update section 25d determines whether the value of the item "Target F/W Package" in the automatic F/W update plan has been changed by the saving performed in step S226 (S233).

When determining in step S233 that the value of the item "Target F/W Package" in the automatic F/W update plan has been changed by the saving performed in step S226, the automatic update section 25d turns the flag 1 on (S234).

Subsequently, the automatic update section 25d determines whether a group having a value of the item "Automatic F/W Update Setting" set in the automatic F/W update group setting of "Select" is included in the target groups of the automatic F/W update specified in step S227 (S235).

Subsequently, when determining that a group having a value of the item "Automatic F/W Update Setting" in the automatic F/W update group setting of "Select" is included in the target groups of the automatic F/W update specified in step S227, the automatic update section 25d turns the flags 2 and 4 on (S236).

When it is determined in step S233 that the value of the item "Target F/W Package" in the automatic F/W update plan saved in step S226 has not been changed, when it is determined in step S235 that the group having the value of the item "Automatic F/W update setting" in the automatic F/W update group setting of "Select" is not included in the target groups of the automatic F/W update specified in step S227, or when the process in step S236 is terminated, the automatic update section 25d determines whether a group is newly added to the target groups of the automatic F/W update by the saving performed in step S226 (S237).

When determining in step S237 that a group is newly added to the target groups of the automatic F/W update by the saving performed in step S226, the automatic update section 25d determines whether a group having a value of the item "Automatic F/W Update Setting" in the automatic F/W update group setting of "Select" is included in the group newly added by the saving performed in step S226 to the target groups of the automatic F/W update (S238).

Subsequently, when determining whether a group having a value of the item "Automatic F/W Update Setting" in the automatic F/W update group setting of "Select" is included in the group newly added by the saving performed in step S226 to the target groups of the automatic F/W update in S238, the automatic update section 25d turns the flag 3 on (S239).

When it is determined in step S237 that a group is not newly added to the target groups of the automatic F/W update by the saving performed in step S226, when it is determined in step S238 that the value of the item "Automatic F/W update setting" in the automatic F/W update group setting of "Select" is not included in the group newly added to the target groups of the automatic F/W update by the saving in step S226, or when the process in step S239 is terminated, the automatic update section 25d determines whether a value of the item "Automatic F/W Update Mode" in the automatic F/W update plan has been changed by the saving performed in step S226 (S240).

When determining in step S240 that the value of the item "Automatic F/W Update Mode" in the automatic F/W update plan has been changed by the saving performed in step S226, the automatic update section 25d turns the flag 1 on (S241).

Subsequently, the automatic update section 25d determines whether a group in which a value of the item "Automatic F/W Update Setting" set in the automatic F/W update group setting is "Select" is included in the target groups of the automatic F/W update specified in step S227 (S242).

When determining in step S242 that a group in which a value of the item "Automatic F/W Update Setting" in the automatic F/W update group setting is "Select" is included in the target groups of the automatic F/W update specified in step S227, the automatic update section 25d turns the flags 2 and 5 on (S243).

When it is determined in step S240 that the value of the item "Automatic F/W Update Mode" in the automatic F/W update plan has not been changed by the saving performed in step S226, when it is determined in step S242 that a group in which the value of the item "Automatic F/W Update Setting" in the automatic F/W update group setting is "Select" is not included in the target groups of the automatic F/W update specified in step S227, or when the process in step S243 is terminated, the automatic update section 25d determines whether a value of the item "Enable/Disable" in the automatic F/W update plan saved in step S226 has been changed to "Enable" by the saving performed in step S226 (S244).

When determining in step S244 that the value of the item "Enable/Disable" in the automatic F/W update plan saved in step S226 has been changed to "Enable" by the saving performed in step S226, the automatic update section 25d determines whether a group in which a value of the item "Automatic F/W Update Setting" set in the automatic F/W update group setting is "Select" is included in the target groups of the automatic F/W update specified in step S227 (S245).

When determining in step S245 that a group in which a value of the item "Automatic F/W Update Setting" in the automatic F/W update group setting is "Select" is included in the target groups of the automatic F/W update specified in step S227, the automatic update section 25d turns the flag 6 on (S246).

When determining in step S244 that the value of the item "Enable/Disable" in the automatic F/W update plan saved in step S226 has not been changed to "Enable" by the saving performed in step S226, the automatic update section 25d determines whether the value of the item "Enable/Disable" in the automatic F/W update plan saved in step S226 has been changed to "Disable" by the saving performed in step S226 (S247).

When determining in step S247 that the value of the item "Enable/Disable" in the automatic F/W update plan saved in step S226 has been changed to "Disable" by the saving performed in step S226, the automatic update section 25d turns the flag 1 on (S248).

Subsequently, the automatic update section 25d determines whether a group in which a value of the item "Automatic F/W Update Setting" set in the automatic F/W update group setting is "Select" is included in the target groups of the automatic F/W update specified in step S227 (S249).

When determining in step S249 that a group in which a value of the item "Automatic F/W Update Setting" in the automatic F/W update group setting is "Select" is included in the target groups of the automatic F/W update specified in step S227, the automatic update section 25d turns the flag 2 on (S250).

When it is determined in step S245 that a group in which a value of the item "Automatic F/W Update Setting" in the automatic F/W update group setting is "Select" is not included in the target groups of the automatic F/W update specified in step S227, when the process in step S246 is terminated, when it is determined in step S247 that the value of the item "Enable/Disable" in the automatic F/W update plan saved in S226 has not changed to "Disable" by the saving performed in step S226, when it is determined in step S249 that a group in which a value of the item "Automatic F/W Update Setting" in the automatic F/W update group setting is "Select" is not included in the target groups of the automatic F/W update specified in step S227, or when the process in step S250 is terminated, the automatic update section 25d determines whether the flag 2 is in an On state (S251).

When determining in step S251 that the flag 2 is in the On state, the automatic update section 25d sets "Prohibited" as a value of the item "Plan Permitted/Prohibited" for the automatic F/W update plan saved in step S226 in the automatic F/W update group setting of the group in which the value of the item "Automatic F/W Update Setting" in the automatic F/W update group setting is "Select" among the target groups of the automatic F/W update specified in step S227 (S252).

When determining in step S251 that the flag 2 is not in the On state or when the process in step S252 is terminated, the automatic update section 25d determines whether the flag 1 is in an On state (S253).

When determining in step S253 that the flag 1 is in an On state, "Cancel" is set as a value of the item "Status" of the task information 24n in all the automatic F/W update tasks in which a value of the item "Status" is "Pending" in the task information 24n among the automatic F/W tasks associated with the automatic F/W update plan saved in step S226 (S254).

When determining in step S253 that the flag 1 is not in an On state, or when the process in step S254 is terminated, the automatic update section 25d determines whether the flag 3 is in an On state (S255).

When determining in step S255 that the flag 3 is in an On state, the automatic update section 25d transmits information indicating that the group has been newly added to the automatic F/W update plan saved in step S226 to an e-mail address stored in the address information 24d of the user indicated by the item "Notification Setting" of the automatic F/W update group setting of the group in which a value of the item "automatic F/W update setting" in the automatic F/W update group setting is "Select" among the groups newly added by the saving performed in step S226 to the target groups of the automatic F/W update (S256). Therefore, when receiving the notification in step S256, the user may set, through the group setting edit screen, "Permitted" to a value of the item "Plan Permitted/Prohibited" for the automatic F/W update plan saved in step S226 in the automatic F/W update group setting of the group in which a value of the item "Automatic F/W Update Setting" is "Select" in the automatic F/W update group setting among the target groups of the automatic F/W update specified in step S227, for example. Note that, when transmitting an e-mail in step S256 to the e-mail address of the user indicated in the item "Notification Setting" of the automatic F/W update group setting of the group in which the value of the item "Automatic F/W Update Setting" in the automatic F/W update group setting is "Select", a link of a URL of a page of the group setting edit screen of the automatic F/W update group setting is given to the e-mail.

When determining in step S255 that the flag 3 is not in an On state, or when the process in step S256 is terminated, the automatic update section 25d determines whether one of the flags 4 to 6 is in an On state (S257).

When determining in step S257 that one of the flags 4 to 6 is in an On state, the automatic update section 25*d* generates an e-mail addressed to the e-mail address stored in the address information 24*d* of the user indicated by the item "Notification Setting" of the automatic F/W update group setting of the group in which a value of the item "Automatic F/W Update Setting" in the automatic F/W update group setting is "Select" among the target groups of the automatic F/W update specified in step S227 (S258). Note that, the automatic update section 25*d* assigns, to the e-mail, a link of a URL of a page of the group setting edit screen of the automatic F/W update group setting of the group in which a value of the item "Automatic F/W Update Setting" in the automatic F/W update group setting is "Select" among the target groups of the automatic F/W update specified in step S227.

When the process in step S258 is terminated, the automatic update section 25*d* determines whether the flag 4 is in an On state (S259).

When determining in step S259 that the flag 4 is in an On state, the automatic update section 25*d* adds information indicating that the F/W package has been changed in the automatic F/W update plan saved in step S226 to a body of the e-mail generated in step S258 (S260).

When determining in step S259 that the flag 4 is not in an On state, or when the process in step S260 is terminated, the automatic update section 25*d* determines whether the flag 5 is in an On state (S261).

When determining in step S261 that the flag 5 is in an On state, the automatic update section 25*d* adds information indicating that the automatic F/W update mode has been changed in the automatic F/W update plan saved in step S226 to the body of the e-mail generated in step S258 (S262).

When determining in step S261 that the flag 5 is not in an On state, or when the process in step S262 is terminated, the automatic update section 25*d* determines whether the flag 6 is in an On state (S263).

When determining in step S263 that the flag 6 is in an On state, the automatic update section 25*d* adds information indicating that the automatic F/W update plan saved in step S226 has been changed to "Enable" to the body of the e-mail generated in step S258 (S264).

When determining in step S263 that the flag 6 is not in an On state, or when the process in step S264 is terminated, the automatic update section 25*d* transmits the e-mail generated in step S258 (S265). Therefore, the user who has received the e-mail transmitted in step S265 may set, through the group setting edit screen, "Permitted" as a value of the item "Plan Permitted/Prohibited" for the automatic F/W update plan saved in step S226 in the automatic F/W update group setting of the group in which a value of the item "Automatic F/W Update Setting" is "Select" in the automatic F/W update group setting among the target groups of the automatic F/W update specified in step S227, for example.

When it is determined in step S224 that the cancel button 781 has been pressed or when it is determined in step S229 that the value of the item "Enable/Disable" in the automatic F/W update plan saved in step S226 is not "Enable", that is, "Disable", or when it is determined in step S230 that a group in which a value of the item "Automatic F/W Update setting" in the automatic F/W update group setting is "Select" is not included in the target groups of the automatic F/W update specified in step S227, when the process in step S231 is terminated, when it is determined in step S257 that none of the flags 4 to 6 is turned on, or when the process in step S265 is terminated, the automatic update section 25*d* causes the target user terminal to terminate the display of the plan edit screen 700 (S266), and thereafter, the operation illustrated in FIGS. 24 to 26 is terminated.

Subsequently, an operation of the device management system 20 performed when the automatic F/W update plan is to be deleted will be described.

Figure 28:
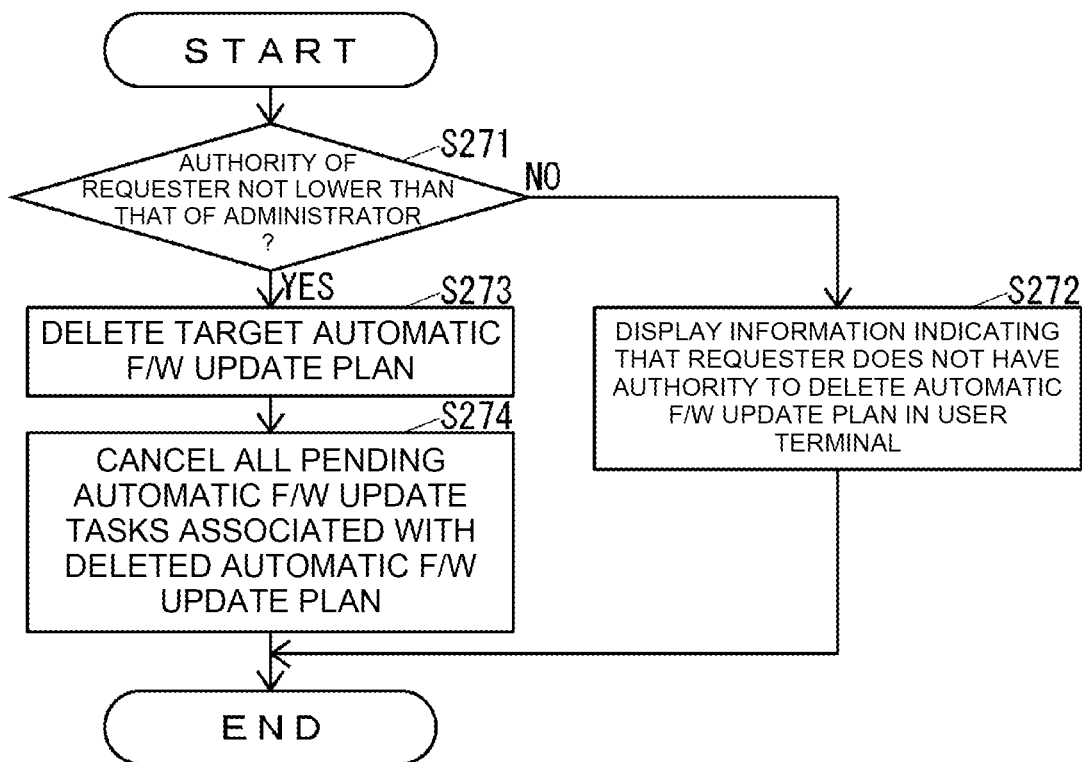
FIG. 28 is a flowchart of an operation of the device management system illustrated in FIG. 3 performed when the automatic F/W update plan is deleted.

FIG. 28 is a flowchart of an operation of the device management system 20 performed when the automatic F/W update plan is to be deleted.

A user who is logging into the device management system 20 may transmit a request (hereinafter referred to as a "plan deletion request") for deleting an automatic F/W update plan to the device management system 20 through a user terminal (hereinafter referred to as a "target user terminal" in a description made with reference to FIG. 28). When receiving the plan deletion request, the device management system 20 executes the process shown in FIG. 28.

As shown in FIG. 28, the automatic update section 25*d* determines whether authority of the user who has transmitted the plan deletion request (hereinafter referred to as a "requester" in the description of FIG. 28) is not lower than that of an administrator in the same manner as in the process in step S125 (S271).

When determining in step S271 that the authority of the requester is lower than that of an administrator, the automatic update section 25*d* causes the target user terminal to display information indicating that the requester does not have authority to delete an automatic F/W update plan (S272) and terminates the operation shown in FIG. 28.

When determining in step S271 that the authority of the requester is not lower than that of an administrator, the automatic update section 25*d* deletes an automatic F/W update plan of a target of the plan deletion request from the storage section 24 (S273).

Thereafter, the automatic update section 25*d* sets "Cancel" as a value of the item "Status" of the task information 24*n* in all automatic F/W update tasks in which a value of the item "Status" is "Pending" in the task information 24*n* among automatic F/W update tasks associated in the task information 24*n* with the automatic F/W update plan deleted in step S273 (S274), and terminates the operation illustrated in FIG. 28.

Subsequently, an operation of the device management system 20 performed when execution of the automatic F/W update is started will be described.

Figure 29:
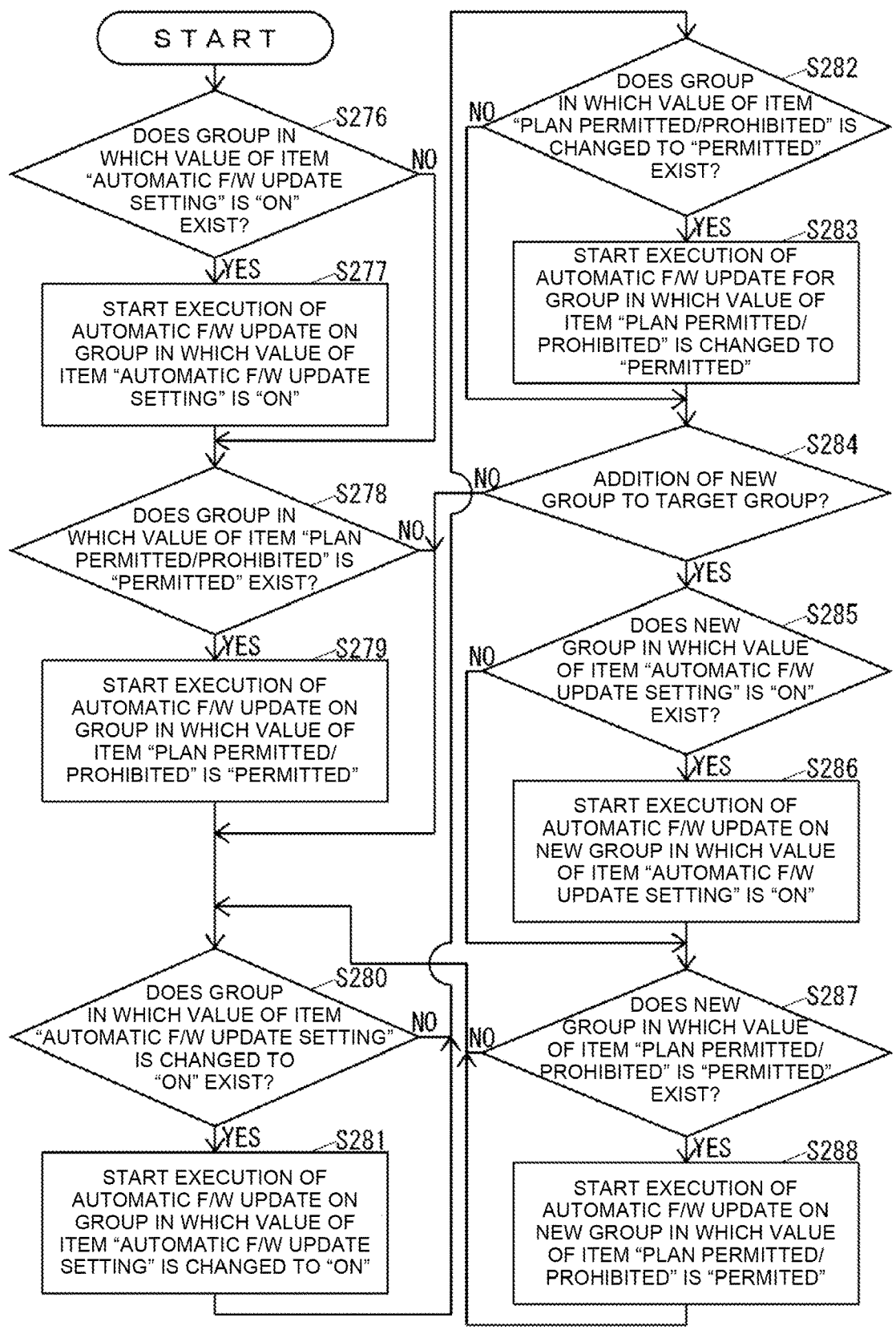
FIG. 29 is a flowchart of an operation of the device management system illustrated in FIG. 3 performed when the automatic F/W update is started.

FIG. 29 is a flowchart of an operation of the device management system 20 performed when execution of the automatic F/W update is started.

When an automatic F/W update plan in which a value of the item "Enable/Disable" is "Enable" is newly saved in the storage section 24, the operation illustrated in FIG. 29 is executed on the automatic F/W update plan (hereinafter referred to as a "target automatic F/W update plan" in the description made with reference to FIG. 29). Furthermore, the automatic update section 25*d* executes the operation shown in FIG. 29 based on the automatic F/W update plan also when the value of the item "Enable/Disable" of an existing automatic F/W update plan is changed to "Enable". Note that the automatic update section 25*d* terminates the operation shown in FIG. 29 when the value of the item "Enable/Disable" of the existing automatic F/W update plan is changed to "Disable".

As illustrated in FIG. 29, the automatic update section 25*d* determines whether a group in which a value of the item "Automatic F/W Update Setting" in the automatic F/W update group setting is "ON" is included in target groups of the automatic F/W update based on the target automatic F/W update plan (hereinafter simply referred to as "target groups" in a description made with reference to FIG. 29) (S276). Note that the automatic update section 25*d* identifies a target group based on information indicated by the item "Target Group" in the target automatic F/W update plan.

When determining in step S276 that the group in which a value of the item "Automatic F/W Update Setting" is "ON" in the automatic F/W update group setting is included in the target groups, the automatic update section 25*d* starts execution of the automatic F/W update based on the target automatic F/W update plan on the group having the value of the item "Automatic F/W Update Setting" of "ON" in the automatic F/W update group setting among the target groups (S277).

When it is determined in step S276 that the group in which a value of the item "Automatic F/W Update Setting" is "ON" in the automatic F/W update group setting is not included in the target groups or when the process in step S277 is terminated, the automatic update section 25*d* determines whether a group in which a value of the item "Automatic F/W Update Setting" is "Select" in the automatic F/W update group setting and a value of the "Plan Permitted/Prohibited" is "Permitted" for the target automatic F/W update plan in the automatic F/W update group setting is included in the target groups (S278).

When determining in step S278 that a group in which a value of the item "Automatic F/W Update Setting" is "Select" in the automatic F/W update group setting and a value of the "Plan Permitted/Prohibited" is "Permitted" for the target automatic F/W update plan in the automatic F/W update group setting is included in the target groups, the automatic update section 25*d* starts execution of the automatic F/W update based on the target automatic F/W update plan on the group in which a value of the item "Automatic F/W Update Setting" is "Select" in the automatic F/W update group setting and a value of the "Plan Permitted/Prohibited" is "Permitted" for the target automatic F/W update plan in the automatic F/W update group setting in the target groups (S279).

When it is determined in step S278 that a group in which a value of the item "Automatic F/W Update Setting" is "Select" in the automatic F/W update group setting and a value of the item "Plan Permitted/Prohibited" for the target automatic F/W update plan is "Permitted" is not included in the target groups or when the process in step S279 is terminated, the automatic update section 25*d* determines whether a group in which a value of the item "Automatic F/W Update Setting" in the automatic F/W update group setting is changed to "ON" is included in the target groups (S280).

When determining in step S280 that the group in which a value of the item "Automatic F/W Update Setting" in the automatic F/W update group setting is changed to "ON" is included in the target groups, the automatic update section 25*d* starts execution of the automatic F/W update based on the target automatic F/W update plan on the group in which the value of the item "Automatic F/W Update Setting" in the automatic F/W update group setting is changed to "ON" among the target groups (S281).

When it is determined in step S280 that a group in which a value of the item "Automatic F/W Update Setting" in the automatic F/W update group setting is changed to "ON" is not included in the target groups or when the process in step S281 is terminated, the automatic update section 25*d* determines whether a group in which a value of the item "Automatic F/W Update Setting" in the automatic F/W update group setting is "Select" and a value of the item "Plan Permitted/Prohibited" for the target automatic F/W update plan in the automatic F/W update group setting is changed to "Permitted" is included in the target groups (S282).

When determining in step S282 that a group in which a value of the item "Automatic F/W Update Setting" in the automatic F/W update group setting is "Select" and a value of the item "Plan Permitted/Prohibited" for the target automatic F/W update plan in the automatic F/W update group setting is changed to "Permitted" is included in the target groups, the automatic update section 25*d* starts execution of the automatic F/W update based on the target automatic F/W update plan on the group in which a value of the item "Automatic F/W Update Setting" in the automatic F/W update group setting is "Select" and a value of the item "Plan Permitted/Prohibited" for the target automatic F/W update plan in the automatic F/W update group setting is changed to "Permitted" (S283).

When it is determined in step S282 that a group in which a value of the item "Automatic F/W Update Setting" in the automatic F/W update group setting is "Select" and a value of the item "Plan Permitted/Prohibited" for the target automatic F/W update plan in the automatic F/W update group setting is changed to "Permitted" is not included in the target groups or when the process in step S283 is terminated, the automatic update section 25*d* determines whether a group has been newly added to the target groups (S284).

When determining in step S284 that a group has been newly added to the target groups, the automatic update section 25*d* determines whether a group in which a value of the item "Automatic F/W Update Setting" is "ON" in the automatic F/W update group setting is newly included in the target groups (S285).

When determining in step S285 that a group in which a value of the item "Automatic F/W Update Setting" is "ON" in the automatic F/W update group setting is included in the target groups, the automatic update section 25*d* starts execution of the automatic F/W update based on the target automatic F/W update plan on the group in which a value of the item "Automatic F/W Update Setting" is "ON" in the automatic F/W update group setting in the target groups (S286).

When it is determined in step S285 that a new group in which a value of the item "Automatic F/W Update Setting" is "ON" in the automatic F/W update group setting is not included in the target groups or when the process in step S286 is terminated, the automatic update section 25*d* determines whether a group in which a value of the item "Automatic F/W Update Setting" is "Select" in the automatic F/W update group setting and a value of the "Plan Permitted/Prohibited" is "Permitted" for the target automatic F/W update plan in the automatic F/W update group setting is newly included in the target groups (S287).

When determining in step S287 that a new group in which a value of the item "Automatic F/W Update Setting" is "Select" in the automatic F/W update group setting and a value of the "Plan Permitted/Prohibited" is "Permitted" for the target automatic F/W update plan in the automatic F/W update group setting is included in the target groups, the automatic update section 25*d* starts execution of the automatic F/W update based on the target automatic F/W update plan on the new group in which a value of the item "Automatic F/W Update Setting" is "Select" in the automatic F/W update group setting and a value of the "Plan Permitted/Prohibited" is "Permitted" for the target automatic F/W update plan in the automatic F/W update group setting in the target groups (S288).

When it is determined in step S284 that a group has not been newly added to the target groups, when it is determined in step S287 that a new group in which a value of the item "Automatic F/W Update Setting" is "Select" in the automatic F/W update group setting and a value of the item "Plan Permitted/Prohibited" is "Permitted" for the target automatic F/W update plan in the automatic F/W update group setting is not included in the target groups, or when the process in step S288 is terminated, the automatic update section 25d executes the process in step S280.

Next, an operation of the device management system 20 performed when the automatic F/W update is executed will be described.

Figure 30:
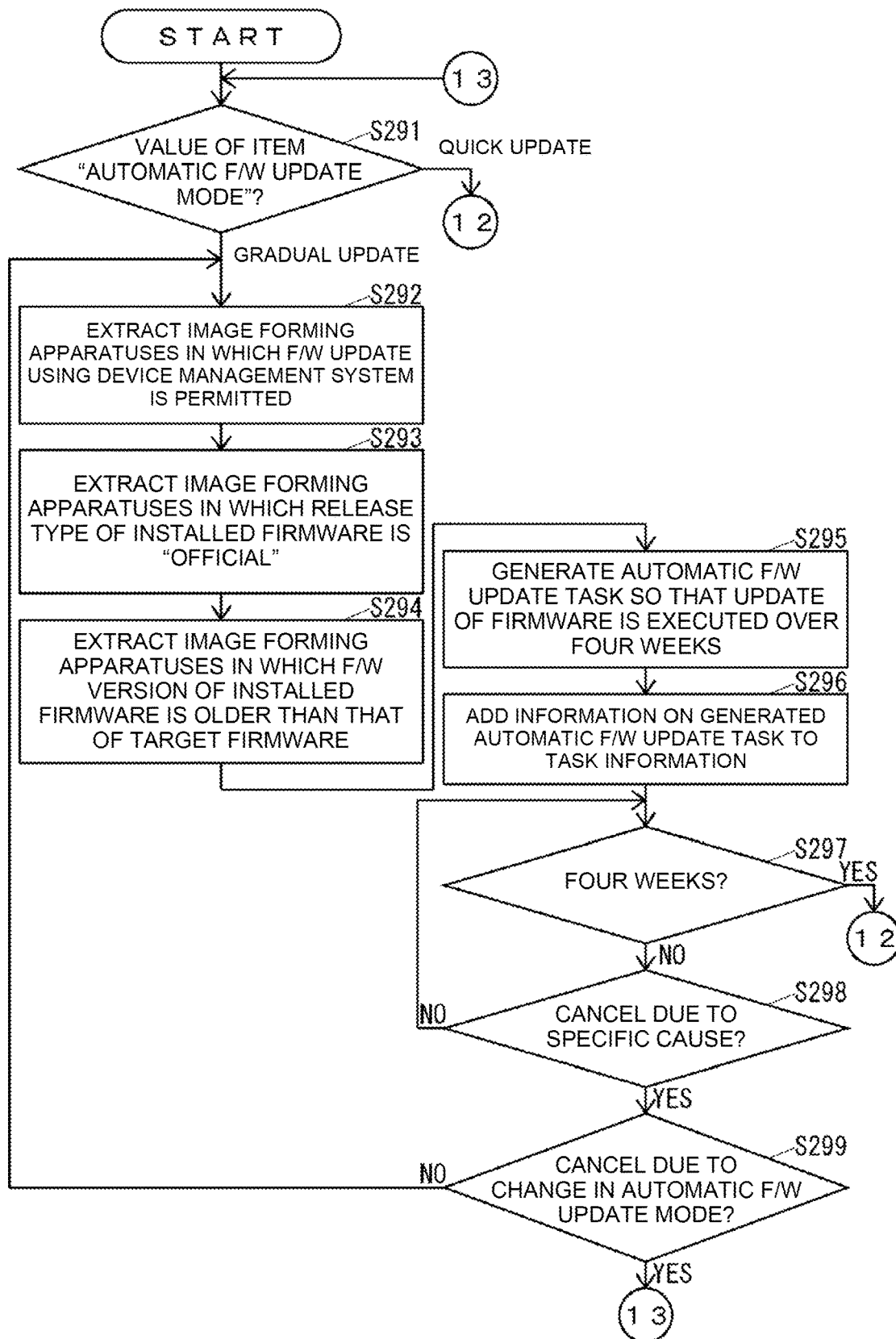
FIG. 30 is a flowchart of a portion of an operation of the device management system illustrated in FIG. 3 performed when the automatic F/W update is executed.
Figure 31:
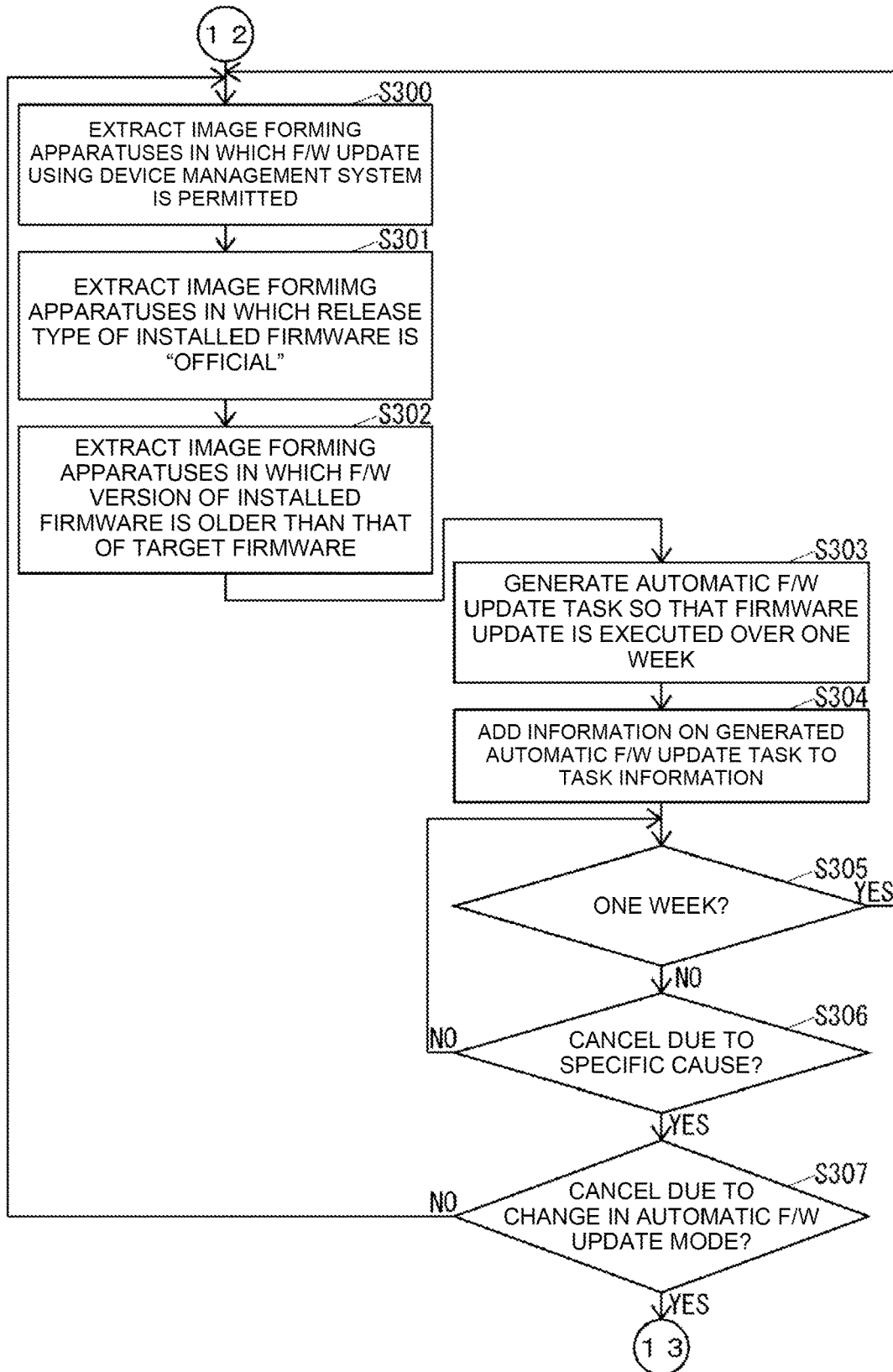
FIG. 31 is a flowchart following the flowchart of FIG. 30.

FIG. 30 is a flowchart of a portion of an operation of the device management system 20 performed when the automatic F/W update is executed. FIG. 31 is a flowchart following the flowchart of FIG. 30.

The automatic update section 25d performs the operation shown in FIGS. 30 and 31 for each combination of a group and an automatic F/W update plan. Note that the automatic update section 25d terminates the operation illustrated in FIGS. 30 and 31 when a value of the item "Automatic F/W Update Setting" in the automatic F/W update group setting of a group of a target of the operation of FIGS. 30 and 31 (hereinafter simply referred to as a "target group" in the description in FIGS. 30 and 31) is changed to "OFF". Furthermore, the automatic update section 25d terminates the operation illustrated in FIGS. 30 and 31 also when a value of the item "Automatic F/W Update Setting" in the automatic F/W update group setting is "Select" and a value of the item "Plan Permitted/Prohibited" for an automatic F/W update plan of a target of the operation illustrated in FIGS. 30 and 31 (hereinafter simply referred to as a "target automatic F/W update plan" in the description made with reference to FIGS. 30 and 31) in the automatic F/W update group setting is changed to "Prohibited". Furthermore, the automatic update section 25d terminates the operation illustrated in FIGS. 30 and 31 also when the value of the item "Enable/Disable" of the target automatic F/W update plan is changed to "Disable".

As shown in FIGS. 30 and 31, the automatic update section 25d determines a value of the item "Automatic F/W Update Mode" of the target automatic F/W update plan (S291).

When determining in step S291 that a value of the item "Automatic F/W Update Mode" of the target automatic F/W update plan is "Gradual Update", the automatic update section 25d extracts image forming apparatuses in which the F/W update using the device management system 20 is permitted among all image forming apparatuses belonging to a target group (S292). Here, the automatic update section 25d determines an image forming apparatus that belongs to the target group based on the device information 24f.

After the process in step S292, the automatic update section 25d extracts image forming apparatuses whose release type of installed firmware is "Official" from among all the image forming apparatuses extracted in step S292 (S293).

Subsequently, the automatic update section 25d extracts, from among all the image forming apparatuses extracted in step S293, image forming apparatuses whose F/W version of the installed firmware is older than that of firmware included in an F/W package set in the item "Target F/W package" in the target automatic F/W update plan (hereinafter simply referred to as a "target firmware in the description made with reference to FIGS. 30 and 31) (S294).

Next, the automatic update section 25d generates an automatic F/W update task based on the target automatic F/W update plan in the storage section 24 while a scheduled execution time of the automatic F/W update task is set so that the F/W update is executed for all the image forming apparatuses extracted in step S294 over a period of four weeks as shown in FIG. 8 (S295). Here, the automatic update section 25d sets the scheduled execution time of the automatic F/W update task within a time zone indicated in the item "Execution Time Zone Setting" in the automatic F/W update group setting for the target group.

After the process in step S295, the automatic update section 25d adds information on the automatic F/W update task generated in step S295 to the task information 24n (S296). Here, when adding information to the task information 24n in step S296, the automatic update section 25d adds "Pending" as a value of the item "Status" in the information to be added.

After the process of S296, the automatic update section 25d determines whether four weeks have elapsed since the start of the immediately-preceding process in step S295 (S297).

When determining in step S297 that four weeks has not elapsed since the start of the immediately-preceding process in step S295, the automatic update section 25d determines whether any of the automatic F/W update tasks generated in the immediately-preceding process in step S295 has been cancelled due to a specific cause (S298). Examples of the "cancellation due to a specific cause" in step S298 include cancellation due to a change in a value of the item "Execution Time Zone Setting" or a value of the item "Pre-Print Setting" in the automatic F/W update group setting (YES in step S190 and then step S192), cancellation due to a change in a target F/W package in the automatic F/W update plan (YES in step S233 and then step S254), and cancellation due to a change in an automatic F/W update mode in the automatic F/W update plan (YES in step S240 and then step S254).

When determining in step S298 that any of the automatic F/W update tasks generated immediately-preceding process in step S295 has been cancelled due to a specific cause, the automatic update section 25d determines whether the cancellation determined to have occurred in step S298 is caused by a change in the automatic F/W update mode (S299).

When determining in step S299 that the cancellation determined to have occurred in step S298 is cancellation due to a change in the automatic F/W update mode, the automatic update section 25d executes the process in step S291.

When determining in step S299 that the cancellation determined to have occurred in step S298 is not cancellation due to a change in the automatic F/W update mode, the automatic update section 25d executes the process in step S292.

When determining in step S298 that none of the automatic F/W update tasks generated in the immediately-preceding process in step S295 has been cancelled due to a specific cause, the automatic update section 25d executes a process in step S297.

When it is determined in step S291 that a value of the item "Automatic F/W Update Mode" of the target automatic F/W update plan is "Quick Update", or when it is determined in step S297 that four weeks has elapsed since the start of the immediately-preceding process in step S295, the automatic update section 25d extracts image forming apparatuses in which the F/W update using the device management system 20 is permitted from among all the image forming apparatuses belonging to the target group (S300). Here, the automatic update section 25*d* determines an image forming apparatus that belongs to the target group based on the device information 24*f*.

After the process in step S300, the automatic update section 25*d* extracts image forming apparatuses whose release type of installed firmware is "Official" from among all the image forming apparatuses extracted in step S300 (S301).

Subsequently, the automatic update section 25*d* extracts image forming apparatuses whose F/W version of the installed firmware is older than that of the target firmware from among all the image forming apparatuses extracted in step S301 (S302).

Thereafter, the automatic update section 25*d* generates an automatic F/W update task based on the target automatic F/W update plan in the storage section 24 while a scheduled execution time of the automatic F/W update task is set so that the F/W update is executed for all the image forming apparatuses extracted in step S302 over a period of one week (S303).

After the process in step S303, the automatic update section 25*d* adds information on the automatic F/W update task generated in step S303 to the task information 24*n* (S304). Here, when adding information to the task information 24*n* in step S304, the automatic update section 25*d* adds "Pending" as a value of the item "Status" in the information to be added.

After the process in step S304, the automatic update section 25*d* determines whether one week has elapsed since the start of the immediately-preceding process in step S303 (S305).

When determining in step S305 that one week has not elapsed since the start of the immediately-preceding process in step S303, the automatic update section 25*d* determines whether any of the automatic F/W update tasks generated in the immediately-preceding process in step S303 has been cancelled due to a specific cause (S306). The "cancellation due to a specific cause" in step S306 is the same as the "cancellation due to a specific cause" in step S298.

When determining in step S306 that any of the automatic F/W update tasks generated in the immediately-preceding process in step S303 has been cancelled due to a specific cause, the automatic update section 25*d* determines whether the cancellation determined to have occurred in step S306 is caused by a change in the automatic F/W update mode (S307).

When determining in step S307 that the cancellation determined to have occurred in step S306 is cancellation due to a change in the automatic F/W update mode, the automatic update section 25*d* executes the process in step S291.

When determining in step S307 that the cancellation determined to have occurred in step S306 is not cancellation due to a change in the automatic F/W update mode, the automatic update section 25*d* executes the process in step S300.

When determining in step S306 that none of the automatic F/W update tasks generated in the immediately-preceding process in step S303 has been cancelled due to a specific cause, the automatic update section 25*d* executes the process in step S305.

When determining in step S305 that one week has elapsed since the start of the immediately-preceding process in step S303, the automatic update section 25*d* executes the process in step S300.

As described with reference to FIGS. 30 and 31, "Quick Update" has a cycle for fully executing an automatic F/W update task generated for all the image forming apparatuses of the target group that is constantly one week long starting from a first cycle. "Gradual Update" has a cycle that is four weeks long for a first cycle, but constantly one week from a second cycle onwards.

Next, an operation of the device management system 20 performed when an automatic F/W update task is managed will be described.

Figure 32:
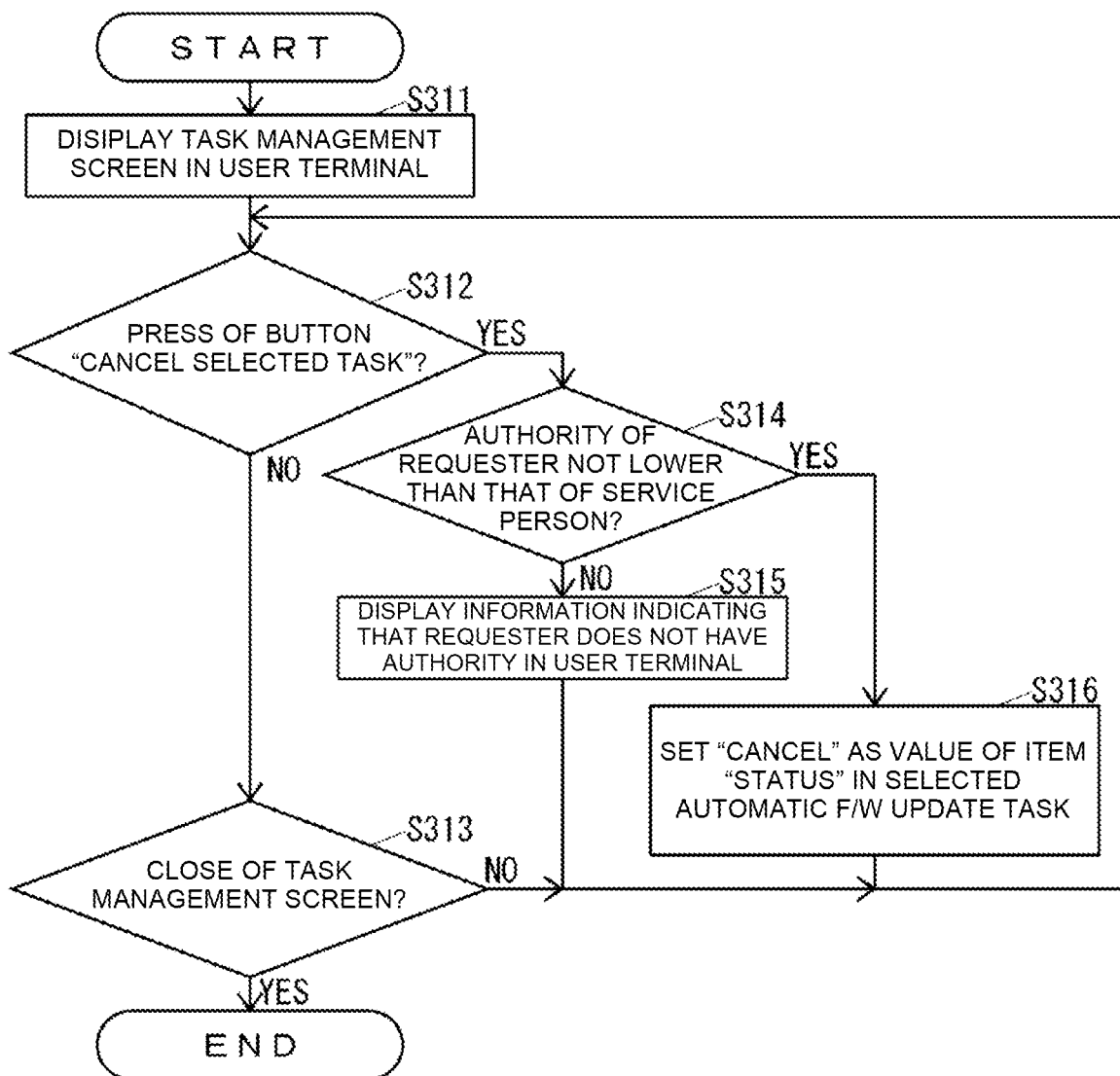
FIG. 32 is a flowchart of an operation of the device management system illustrated in FIG. 3 performed when the automatic F/W update task is managed.

FIG. 32 is a flowchart of an operation of the device management system 20 performed when an automatic F/W update task is managed.

A user who is logging into the device management system 20 may transmit a request (hereinafter referred to as a "task management screen display request") for displaying a screen (hereinafter referred to as a "task management screen") for managing an automatic F/W update task to the device management system 20 via a user terminal (hereinafter referred to as a "target user terminal" in a description made with reference to FIG. 32). When receiving the task management screen display request, the automatic update section 25*d* of the device management system 20 performs an operation shown in FIG. 32.

As shown in FIG. 32, the automatic update section 25*d* causes the target user terminal to display the task management screen by transmitting data on the task management screen to the target user terminal (S311).

Figure 33:
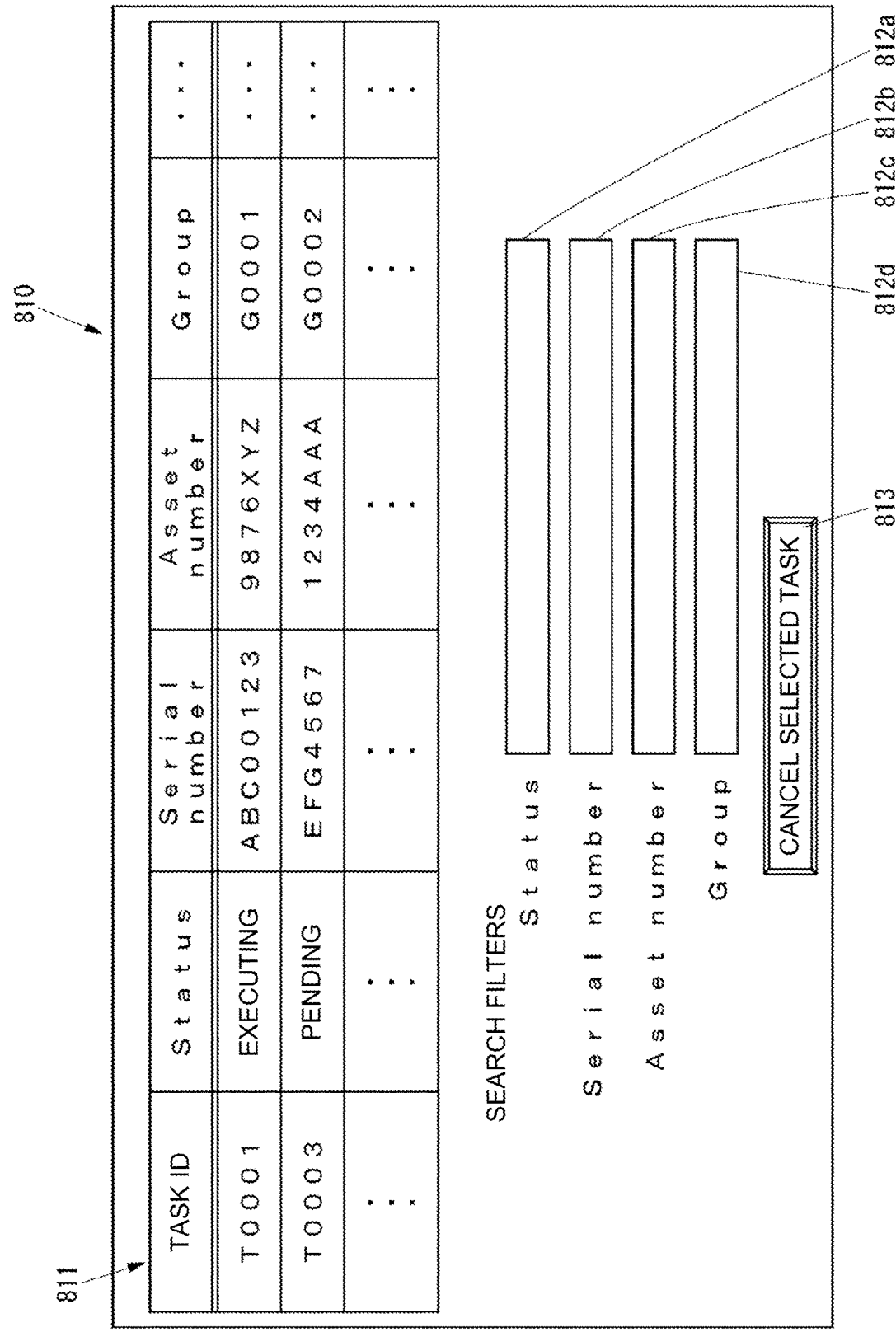
FIG. 33 is a diagram illustrating an example of a task management screen displayed in the user terminal in the operation illustrated in FIG. 32.

FIG. 33 is a diagram illustrating an example of a task management screen 810 displayed in the user terminal in the operation illustrated in FIG. 32.

As shown in FIG. 33, the task management screen 810 includes a list 811 showing a list of automatic F/W update tasks stored in the storage section 24, text boxes 812*a* to 812*d* to which text used for a search filter for searching an automatic F/W update task is input, and a button 813 of "Cancel Selected Task" for canceling an automatic F/W update task selected in the list 811.

The list 811 includes, for example, a task ID of an automatic F/W update task, "Status" indicating a status of the automatic F/W update task, "Serial Number" which is identification information of an image forming apparatus of a target of the automatic F/W update task and which is information set by a manufacturer of the image forming apparatus, "Asset number" which is identification information of the image forming apparatus of the target of the automatic F/W update task and which is information set by a device user, and "Group" which indicates a group to which the image forming apparatus of the target of the automatic F/W update task belongs for each automatic F/W update task. In the list 811, a group is represented by a group ID. The automatic update section 25*d* lists only automatic F/W update tasks for image forming apparatuses belonging to groups within a range of authority of a user who sent the task management screen display request (hereinafter referred to as a "requester" in the description made with reference to FIG. 32) which is determined based on a user ID of the requester, the authorization information 24*c*, and the device information 24*f*, among the automatic F/W update tasks stored in the storage section 24.

Text boxes 812*a* to 812*d* are where the text used to filter the search by "Status", "Serial number", "Asset number", and "Group" is entered, respectively. The automatic update section 25*d* performs an AND search when a plurality of search filters are specified. When text is entered in any of the text boxes 812*a* to 812*d*, the automatic update section 25*d* displays in the list 811 only automatic F/W update tasks that have been narrowed down by the search filter in accordance with the entered text.

The button 813 of "Cancel Selected Task" may be operated only when only an automatic F/W update task whose value of the item "Status" is "Pending" is selected in the list 811.

As shown in FIG. 32, the automatic update section 25d determines whether the button 813 of "Cancel Selected Task" has been pressed (S312) after the process in step S311.

When determining that the button 813 of "Cancel Selected Task" has not been pressed, the automatic update section 25d determines whether the task management screen 810 has been closed (S313).

When determining in step S313 that the task management screen 810 has not been closed, the automatic update section 25d executes the process in step S312.

When determining in step S312 that the button 813 of "Cancel Selected Task" has been pressed, the automatic update section 25d determines whether the authority of the requester is not lower than that of a service person based on the user ID of the requester and the authorization information 24c in the same way as the process in step S121 (S314).

When determining in step S314 that the authority of the requester is lower than that of a service person, the automatic update section 25d causes the target user terminal to display information indicating that the requester does not have authority to cancel the automatic F/W update task (S315) and executes the process in step S312.

When determining in step S314 that the authority of the requester is not lower than that of a service person, the automatic update section 25d sets "Cancel" as a value of the item "Status" of the task information 24n for an automatic F/W update task selected in the list 811 at a time when the button 813 of "Cancel Selected Task" is pressed (S316) and then executes the process in step S312.

When determining in step S313 that the task management screen 810 has been closed, the automatic update section 25d terminates the operation shown in FIG. 32.

Next, an operation of the device management system 20 performed when an image forming apparatus is deleted from a management target will be described.

Figure 34:
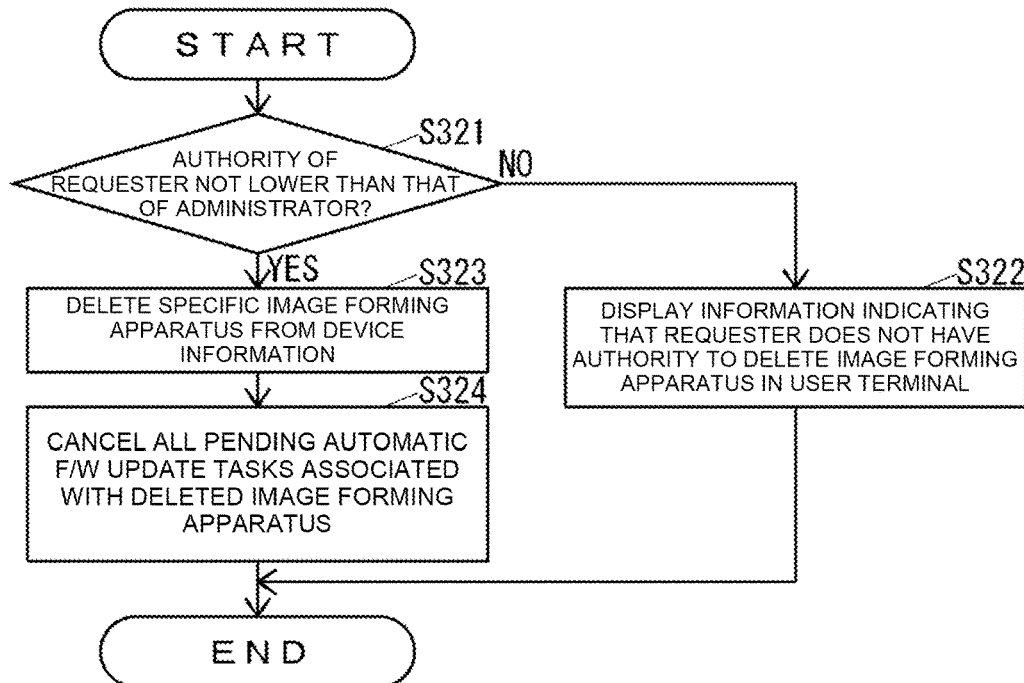
FIG. 34 is a flowchart of an operation of the device management system illustrated in FIG. 3 performed when an image forming apparatus is deleted from a management target.

FIG. 34 is a flowchart of an operation of the device management system 20 performed when an image forming apparatus is deleted from a management target.

A user who is logging into the device management system 20 may transmit a request (hereinafter referred to as an "device deletion request") for deleting an image forming apparatus from a management target to the device management system 20 through a user terminal (hereinafter referred to as a "target user terminal" in a description made with reference to FIG. 34). When receiving the device deletion request, the device management system 20 executes the operation shown in FIG. 34.

As shown in FIG. 34, the device management section 25f determines whether authority of a user who has transmitted the device deletion request (hereinafter referred to as a "requester" in the description made with reference to FIG. 34) is not lower than that of an administrator in the same manner as in the process in step S125 (S321).

When determining in step S321 that the authority of the requester is lower than that of an administrator, the device management section 25f causes the target user terminal to display information indicating that the requester does not have authority to delete an image forming apparatus (S322) and terminates the operation shown in FIG. 34.

When determining in step S321 that the authority of the requestor is not lower than that of an administrator, the device management section 25f deletes an image forming apparatus of a target of the device deletion request from the device information 24f (S323).

Thereafter, the automatic update section 25d sets "Cancel" as a value of the item "Status" of the task information 24n in all automatic F/W update tasks in which a value of the item "Status" is "Pending" in the task information 24n among automatic F/W update tasks associated in the task information 24n with the image forming apparatus deleted from the device information 24f in step S323 (S324), and terminates the operation illustrated in FIG. 34.

Next, an operation of the device management system 20 performed when a group of an image forming apparatus is deleted will be described.

Figure 35:
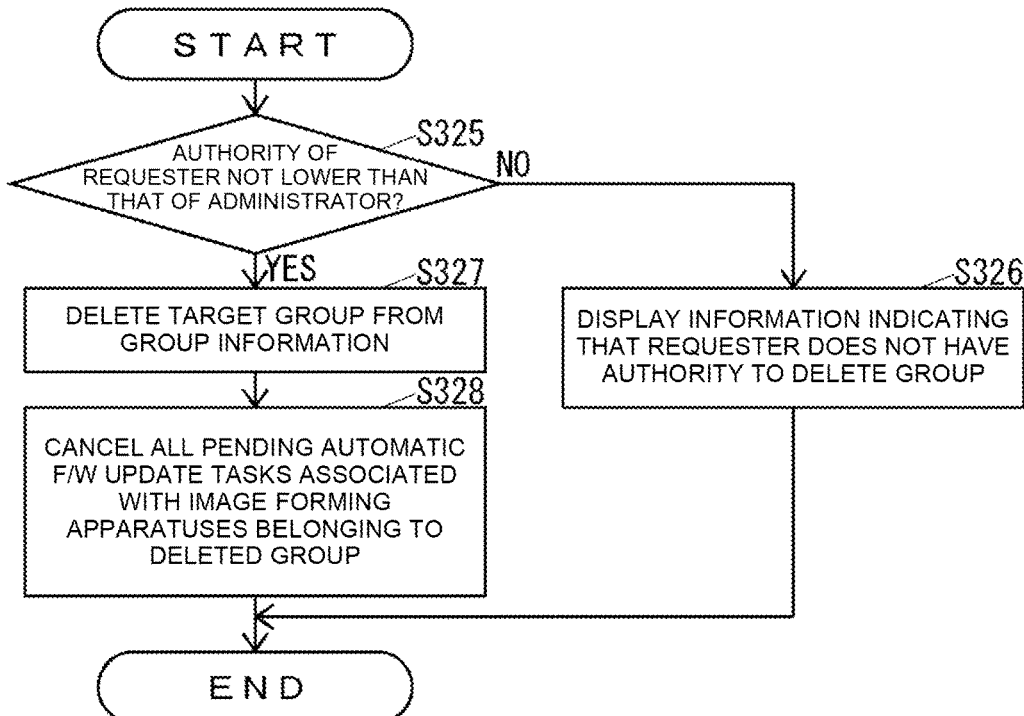
FIG. 35 is a flowchart of an operation of the device management system illustrated in FIG. 3 performed when a group including the image forming apparatus is deleted.

FIG. 35 is a flowchart of an operation of the device management system 20 performed when a group including the image forming apparatus is deleted.

A user who is logging into the device management system 20 may transmit a request (hereinafter referred to as a "group deletion request") for deleting a group including an image forming apparatus from a management target to the device management system 20 through a user terminal (hereinafter referred to as a "target user terminal" in the description made with reference to FIG. 35). When receiving the group deletion request, the device management system 20 executes the operation shown in FIG. 35.

As shown in FIG. 35, the device management section 25f determines whether authority of a user who has transmitted the group deletion request (hereinafter referred to as a "requester" in the description made with reference to FIG. 35) is not lower than that of an administrator in the same manner as in the process in step S125 (S325).

When determining in step S325 that the authority of the requester is lower than that of an administrator, the device management section 25f causes the target user terminal to display information indicating that the requester does not have authority to delete a group (S326) and terminates the operation shown in FIG. 35.

When determining in step S325 that the authority of the requestor is not lower than that of an administrator, the device management section 25f deletes a group of a target of the group deletion request from the group information 24e (S327).

Thereafter, the automatic update section 25d sets "Cancel" as a value of the item "Status" of the task information 24n in all automatic F/W update tasks in which a value of the item "Status" is "Pending" in the task information 24n among the automatic F/W update tasks associated in the task information 24n with the image forming apparatus belonging to the group deleted from the group information 24e in step S327 (S328), and terminates the operation illustrated in FIG. 35.

Next, an operation of the device management system 20 performed when pre-printing is performed on the no-mediation image forming apparatus will be described.

Figure 36:
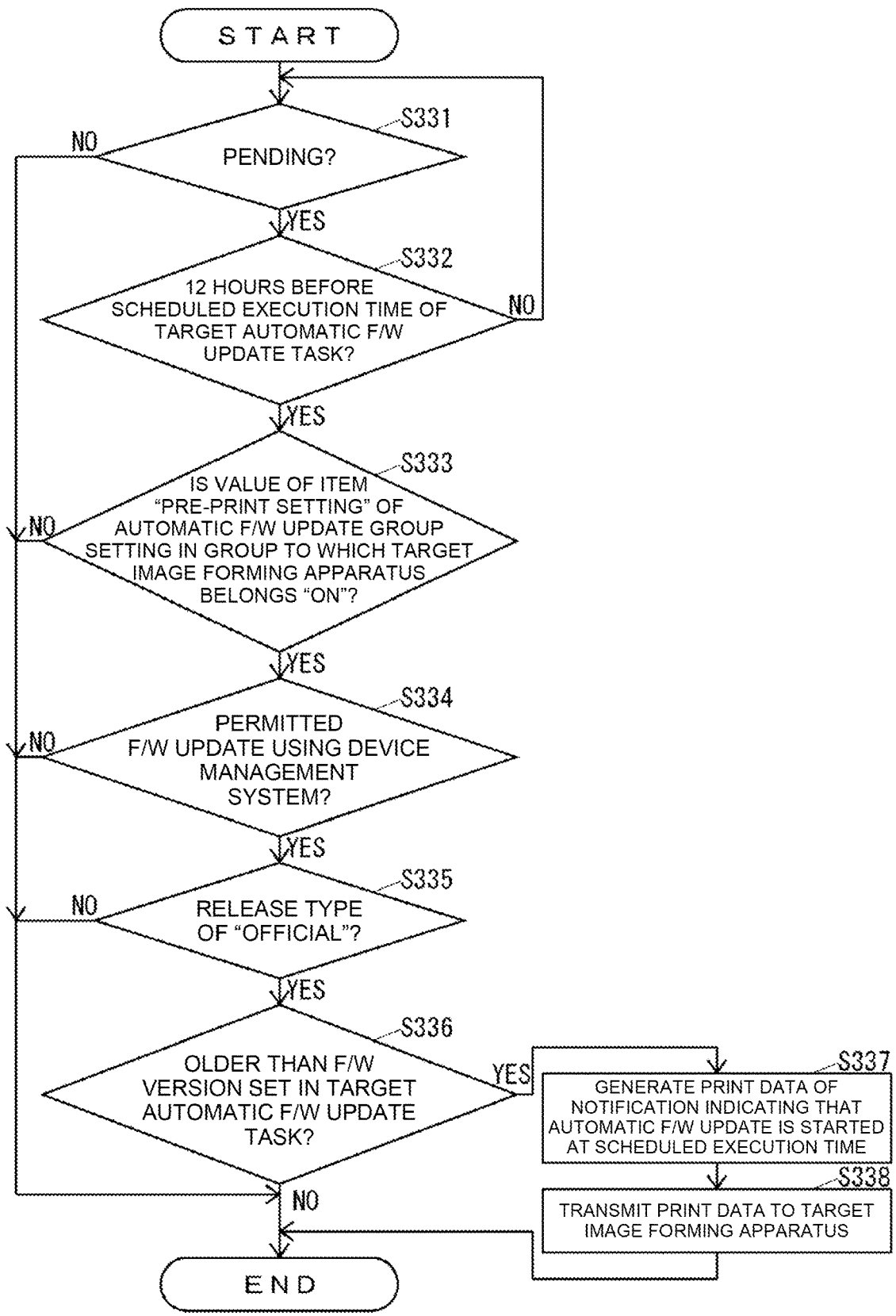
FIG. 36 is a flowchart of an operation of the device management system illustrated in FIG. 3 performed when pre-printing is performed on the no-mediation image forming apparatus.

FIG. 36 is a flowchart of an operation of the device management system 20 performed when pre-printing is performed on the no-mediation image forming apparatus.

The automatic update section 25d performs the operation shown in FIG. 36 for each combination of a no-mediation image forming apparatus and an automatic F/W update task.

As shown in FIG. 36, the automatic update section 25d determines whether a value of the item "Status" of the task information 24n is "Pending" for an automatic F/W update task of a target of the operation shown in FIG. 36 (hereinafter simply referred to as a "target automatic F/W update task" in the description made with reference to FIG. 36) (S331).

When determining in step S331 that the value of the item "Status" of the task information 24n is not "Pending" for the target automatic F/W update task, the automatic update section 25d terminates the operation shown in FIG. 36.

When determining in step S331 that a value of the item "Status" of the task information 24n is "Pending" for the target automatic F/W update task, the automatic update section 25d determines whether it is 12 hours before the scheduled execution time of the target automatic F/W update task (S332).

When determining in step S332 that it has not yet been 12 hours before the scheduled execution time of the target automatic F/W update task, the automatic update section 25d executes the process in step S331.

When determining in step S332 that it is 12 hours before the scheduled execution time of the target automatic F/W update task, the automatic update section 25d determines whether a value of the item "Pre-Print Setting" of the automatic F/W update group setting of the group to which the image forming apparatus of the target of the operation illustrated in FIG. 36 (hereinafter simply referred to as a "target image forming apparatus" in the description made with reference to FIG. 36) belongs is "ON" (S333). Here, the automatic update section 25d determines a group to which the target image forming apparatus belongs based on the device information 24f.

When determining in step S333 that a value of the item "Pre-Print Setting" in the automatic F/W update group setting of the group to which the target image forming apparatus belongs is "ON", the automatic update section 25d determines whether the F/W update using the device management system 20 is permitted to be performed on the target image forming apparatus, based on the device information 24f (S334).

When determining in step S334 that the F/W update using the device management system 20 is permitted to be performed on the target image forming apparatus, the automatic update section 25d determines whether a release type of firmware installed in the target image forming apparatus is "Official" based on the device information 24f (S335).

When determining in step S335 that the release type of the firmware installed in the target image forming apparatus is "Official", the automatic update section 25d determines whether an F/W version of the firmware installed in the target image forming apparatus is older than an F/W version set in the target automatic F/W update task, based on the device information 24f (S336).

When determining in step S336 that the F/W version of the firmware installed in the target image forming apparatus is older than the F/W version set in the target automatic F/W update task, the automatic update section 25d generates print data of a notification that execution of the F/W update in the automatic F/W update is to be started at the scheduled execution time of the target automatic F/W update task (S337). Here, the automatic update section 25d uses, as a language of the notification in step S337, a language indicated in the item "Language Setting" of the automatic F/W update group setting of the group to which the target image forming apparatus belongs.

After the process in step S337, the automatic update section 25d transmits the print data generated in step S337 to the target image forming apparatus (S338).

Note that, even when the transmission in step S338 fails or even when printing performed by the target image forming apparatus based on the print data transmitted in step S338 fails, the automatic update section 25d does not transmit the print data generated in S337 to the target image forming apparatus again.

When it is determined in step S333 that a value of the item "Pre-Print Setting" of the automatic F/W update group setting of the group to which the target image forming apparatus belongs is not "ON", when it is determined in step S334 that the F/W update using the device management system 20 is not permitted for the target image forming apparatus, when it is determined in step S335 that the acquired release type of the firmware installed in the target image forming apparatus is not "Official", when it is determined in step S336 that the F/W version of the firmware installed in the target image forming apparatus is not older than the F/W version set in the target automatic F/W update task, or when the process in step S338 is terminated, the automatic update section 25d terminates the operation shown in FIG. 36.

Next, an operation of the device management system 20 performed when an automatic F/W update task is to be executed on the no-mediation image forming apparatus will be described.

Figure 37:
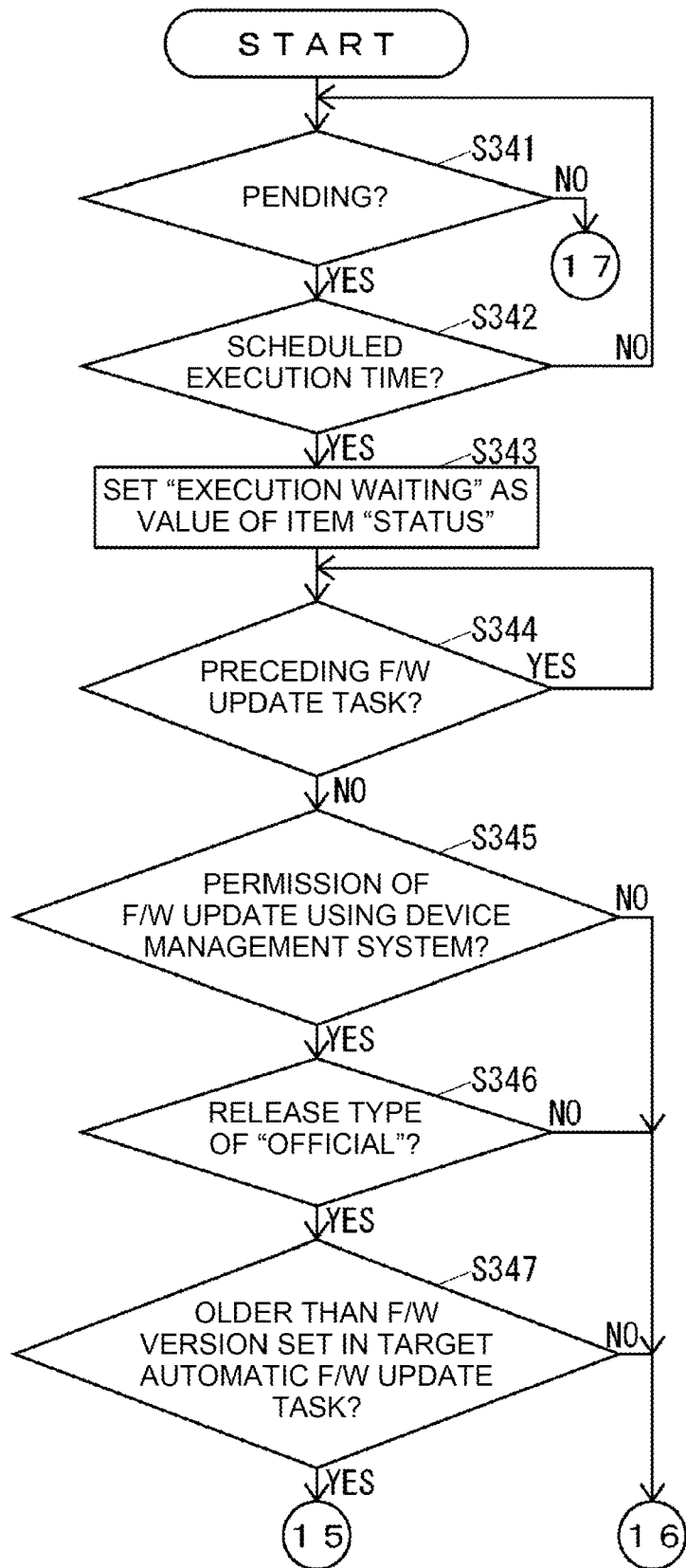
FIG. 37 is a flowchart of a portion of an operation of the device management system illustrated in FIG. 3 performed when an automatic F/W update task is performed on the no-mediation image forming apparatus.
Figure 38:
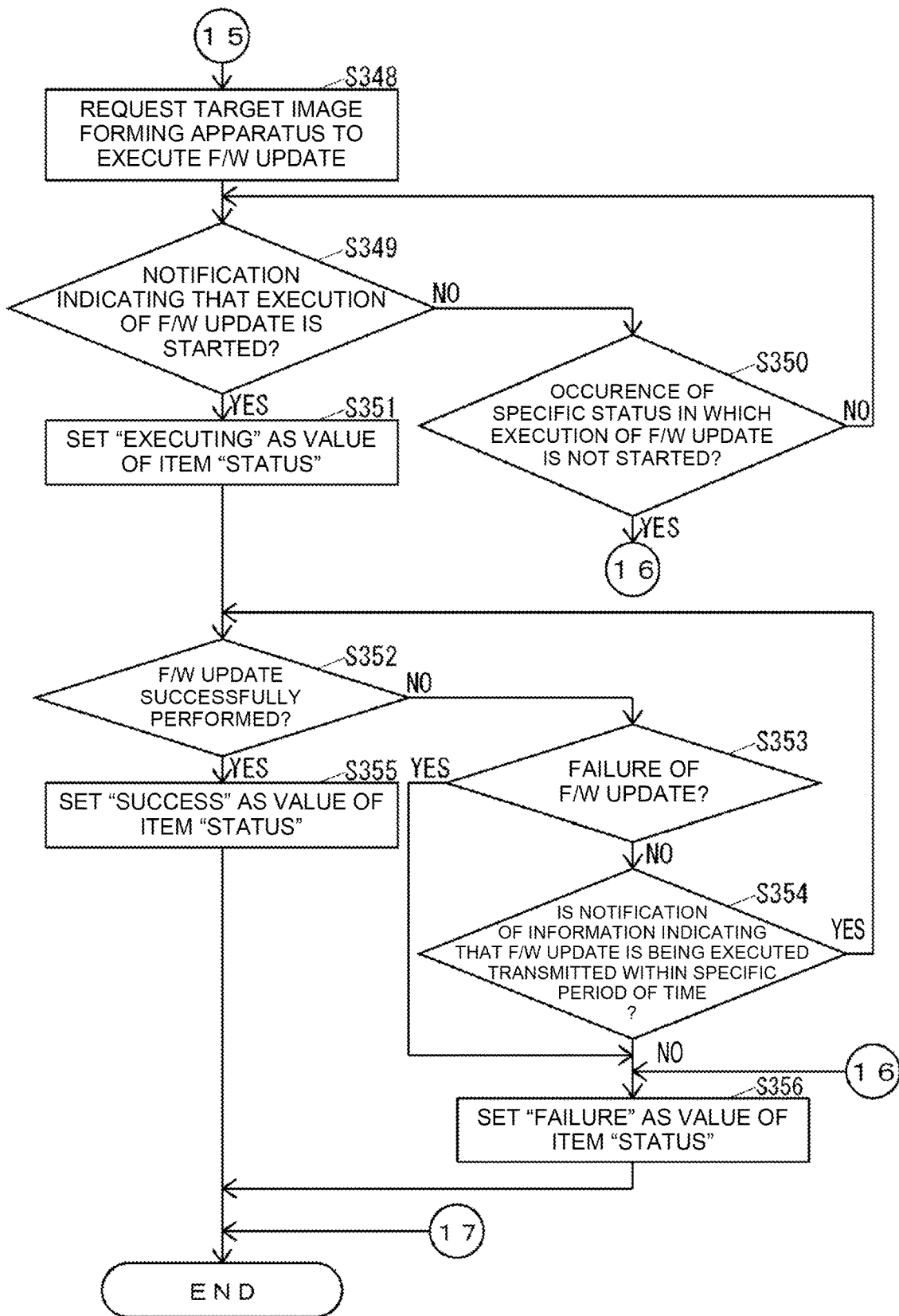
FIG. 38 is a flowchart following the flowchart of FIG. 37.

FIG. 37 is a flowchart of a portion of an operation of the device management system 20 performed when an automatic F/W update task is to be performed on a no-mediation image forming apparatus. FIG. 38 is a flowchart following the flowchart of FIG. 37.

The automatic update section 25d of the device management system 20 executes an operation shown in FIGS. 37 and 38 for each automatic F/W update task for a no-mediation image forming apparatus among the automatic F/W update tasks stored in the storage section 24.

As shown in FIGS. 37 and 38, the automatic update section 25d determines whether a value of the item "Status" of the task information 24n is "Pending" in an automatic F/W update task of a target of the operation shown in FIGS. 37 and 38 (hereinafter simply referred to as a "target automatic F/W update task" in the description made with reference to FIGS. 37 and 38) (S341).

When determining in step S341 that a value of the item "Status" of the task information 24n is not "Pending" in the target automatic F/W update task, the automatic update section 25d terminates the operation shown in FIGS. 37 and 38.

When determining in step S341 that a value of the item "Status" of the task information 24n is "Pending" in the target automatic F/W update task, the automatic update section 25d determines whether a scheduled execution time set in the target automatic F/W update task has been reached (S342).

When determining in step S342 that a scheduled execution time set in the target automatic F/W update task has not been reached, the automatic update section 25d executes the process in step S341.

When determining in step S342 that a scheduled execution time set in the target automatic F/W update task has been reached, the automatic update section 25d sets "Execution Waiting" as a value of the item "Status" of the task information 24n for the target automatic F/W update task (S343).

Subsequently, the automatic update section 25d determines, until it is determined that an F/W update task (hereinafter referred to as a "preceding F/W update task") in which "Execution Waiting" or "Executing" is set as a value of the item "Status" of the task information 24n for the image forming apparatus of a target of the target automatic F/W update task (hereinafter simply referred to as a "target image forming apparatus" in the description made with reference to FIGS. 37 and 38) before the target automatic F/W update task but "Success" or "Failure" has not been set does not exist, whether the preceding F/W update task for the target image forming apparatus exists (S344).

When determining in step S344 that the preceding F/W update task for the target image forming apparatus does not exist, the automatic update section 25d determines whether the F/W update using the device management system 20 is permitted to be performed on the target image forming apparatus based on the device information 24f (S345).

When determining in step S345 that the F/W update using the device management system 20 is permitted to be performed on the target image forming apparatus, the automatic update section 25d determines whether a release type of firmware installed in the target image forming apparatus is "Official" based on the device information 24f (S346).

When determining in step S346 that the release type of the firmware installed in the target image forming apparatus is "Official", the automatic update section 25d determines whether an F/W version of the firmware installed in the target image forming apparatus is older than an F/W version set in the target automatic F/W update task based on the device information 24f (S347).

When determining in step S347 that the F/W version of the firmware installed in the target image forming apparatus is older than the F/W version set in the target automatic F/W update task, the automatic update section 25d requests the target image forming apparatus to execute the F/W update using an F/W package specified by an ID of a package set in the target automatic F/W update task among F/W packages stored in the storage section 24 (S348). Note that the image forming apparatus may not start execution of the F/W update in certain cases, such as a case where printing is being executed.

After the process in step S348, the automatic update section 25d determines whether the target image forming apparatus has notified the automatic update section 25d of the start of the execution of the F/W update (S349). For example, when the image forming apparatus is performing printing and the printing is terminated, the image forming apparatus starts execution of the F/W update and notifies the device management system 20 of the start of execution of the F/W update.

When determining in step S349 that the target image forming apparatus has not notified the automatic update section 25d of the start of the execution of the F/W update, the automatic update section 25d determines whether a specific situation for not starting the execution of the F/W update in the target image forming apparatus has occurred (S350). Here, examples of the specific situation include a situation in which the target image forming apparatus is in a state in which the image forming apparatus is temporarily connected to the device management system 20 only at a timing when the image forming apparatus transmits information on the image forming apparatus, such as the number of copies, to the device management system 20.

When determining in step S350 that a specific situation for not starting the execution of the F/W update in the target image forming apparatus has not occurred, the automatic update section 25d executes the process in step S349.

When determining in step S349 that the image forming apparatus has notified the automatic update section 25d of the start of the execution of the F/W update, the automatic update section 25d sets "Executing" as a value of the item "Status" of the task information 24n in the target automatic F/W update task (S351).

After the process in step S351, the automatic update section 25d determines whether the F/W update requested to be executed in step S348 has been successfully performed (S352). Here, the automatic update section 25d may determine in step S352 that the F/W update requested to be performed in step S348 has been successfully performed, when automatic update section 25d receives information indicating that the F/W update requested to be executed in step S348 has been successfully performed from the target image forming apparatus.

When determining in step S352 that the F/W update requested to be performed in step S348 has not been successfully performed, the automatic update section 25d determines whether the F/W update requested to be executed in step S348 has failed (S353). Here, the automatic update section 25d may determine in step S353 that the F/W update requested to be performed in step S348 has failed, when the automatic update section 25d receives information indicating that the F/W update requested to be executed in step S348 has failed from the target image forming apparatus.

When determining in step S353 that the F/W update requested to be performed in step S348 has not failed, the automatic update section 25d determines whether notification indicating that the F/W update requested to be executed in step S348 is being executed has been transmitted from the target image forming apparatus within a specific period of time, such as 45 minutes (S354). Here, when being executing the F/W update requested to be performed in step S348 by the device management system 20, the target image forming apparatus notifies the device management system 20 of information indicating that the F/W update is being executed every minute, for example.

When determining, in S354, that the notification indicating that the F/W update requested to be executed in step S348 is being executed has been transmitted from the target image forming apparatus within the specific period of time, the automatic update section 25d executes the process in step S352.

When determining in step S352 that the F/W update requested to be performed in step S348 has been successfully performed, the automatic update section 25d sets "Success" as a value of the item "Status" of the task information 24n (S355).

When it is determined in step S345 that the F/W update using the device management system 20 is not permitted to be performed on the target image forming apparatus, when it is determined in step S346 that a release type of the firmware installed in the target image forming apparatus is not "Official", when it is determined in step S347 that the F/W version of the firmware installed in the target image forming apparatus is not older than the F/W version set in the target automatic F/W update task, when it is determined in step S350 that the specific status in which the execution of the F/W update is not started in the target image forming apparatus has occurred, or when it is determined in step S353 that the F/W update requested to be executed in step S348 has failed, or when it is determined in step S354 that the notification indicating that the F/W update requested to be executed in step S348 is being executed has not been transmitted from the target image forming apparatus for the specific period of time, the automatic update section 25d sets "Failure" as a value of the item "Status" of the task information 24n in the target automatic F/W update task (S356).

When determining in step S341 that a value of the item "Status" of the task information 24n is not "Pending" in the target automatic F/W update task, or when the process in step S355 or step S356 is terminated, the automatic update section 25d terminates the operation shown in FIGS. 37 and 38.

The operation of the device management system 20 performed when the automatic update section 25d executes the automatic F/W update task on the no-mediation image forming apparatus has been described hereinabove.

The automatic update section 25d executes a test F/W update task on the no-mediation image forming apparatus in the same manner as the automatic F/W update task performed on the no-mediation image forming apparatus. Here, since a specific scheduled execution time is not set for the test F/W update task, the automatic update section 25d immediately determines that the scheduled execution time set for the test F/W update task has been reached with respect to the test F/W update task stored in the storage section 24.

Furthermore, the manual update section 25c executes the manual F/W update task on the no-mediation image forming apparatus in the same manner as the automatic F/W update task performed on the no-mediation image forming apparatus by the automatic update section 25d. However, when executing the manual F/W update task, the manual update section 25c does not execute a process corresponding to step S346 and step S347, and immediately executes a process corresponding to step S348 when determining that the F/W update using the device management system 20 is permitted to be performed on the target image forming apparatus in the process corresponding to step S345.

Next, an operation of the information processing system 10 performed when a mediation device periodically request a F/W update task to the device management system 20 will be described.

Figure 39:
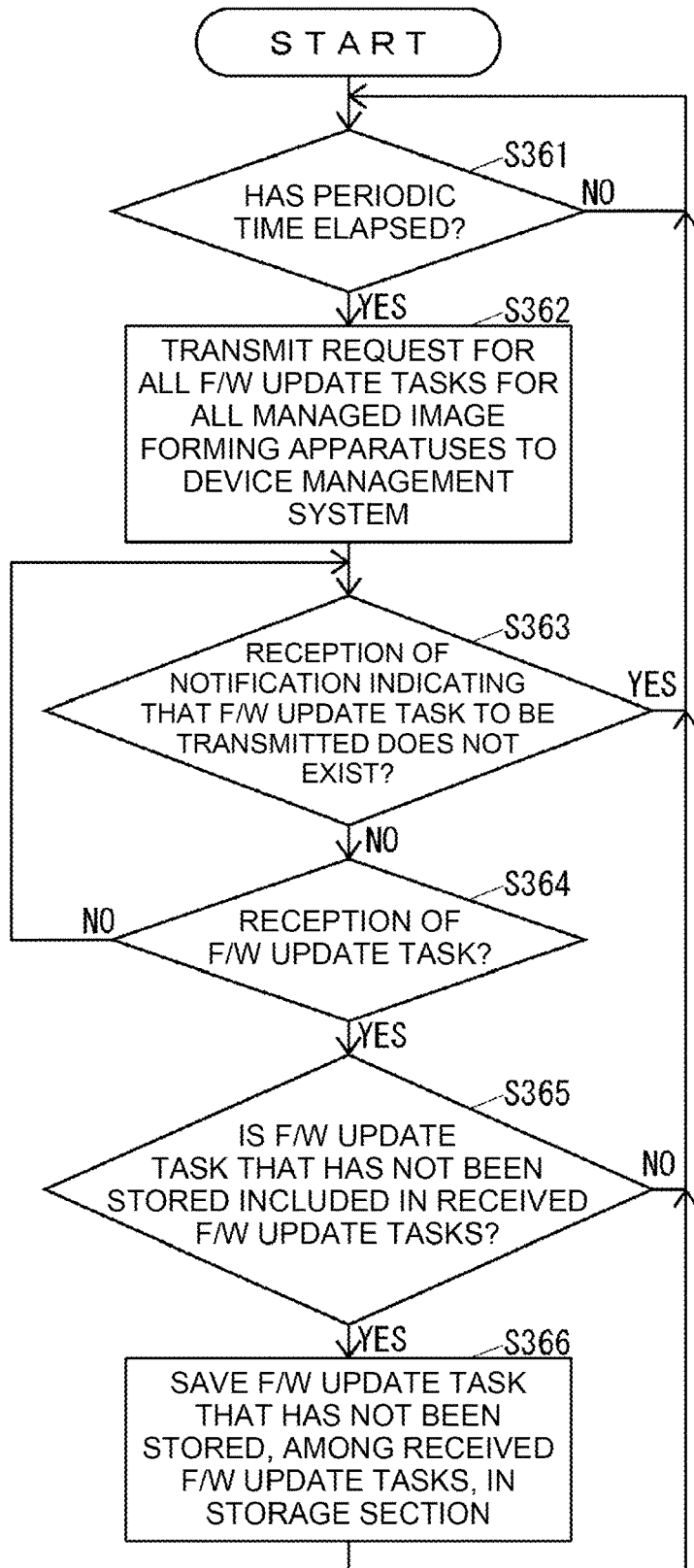
FIG. 39 is a flowchart of an operation of the mediation device illustrated in FIG. 1 performed when an F/W update task is periodically requested to the device management system.

FIG. 39 is a flowchart of an operation of the mediation device performed when an F/W update task is periodically requested to the device management system 20.

As shown in FIG. 39, the F/W update section of the mediation device determines whether a periodic period of time has elapsed until it is determined that the periodic period of time has elapsed (S361). Here, the periodic period of time is, for example, every three hours.

When determining in step S361 that the periodic period of time has elapsed, the F/W update section requests all F/W update tasks for all image forming apparatuses included in device information stored in the mediation device itself, that is, all image forming apparatuses managed by the mediation device itself to the device management system 20 (S362).

Figure 40:
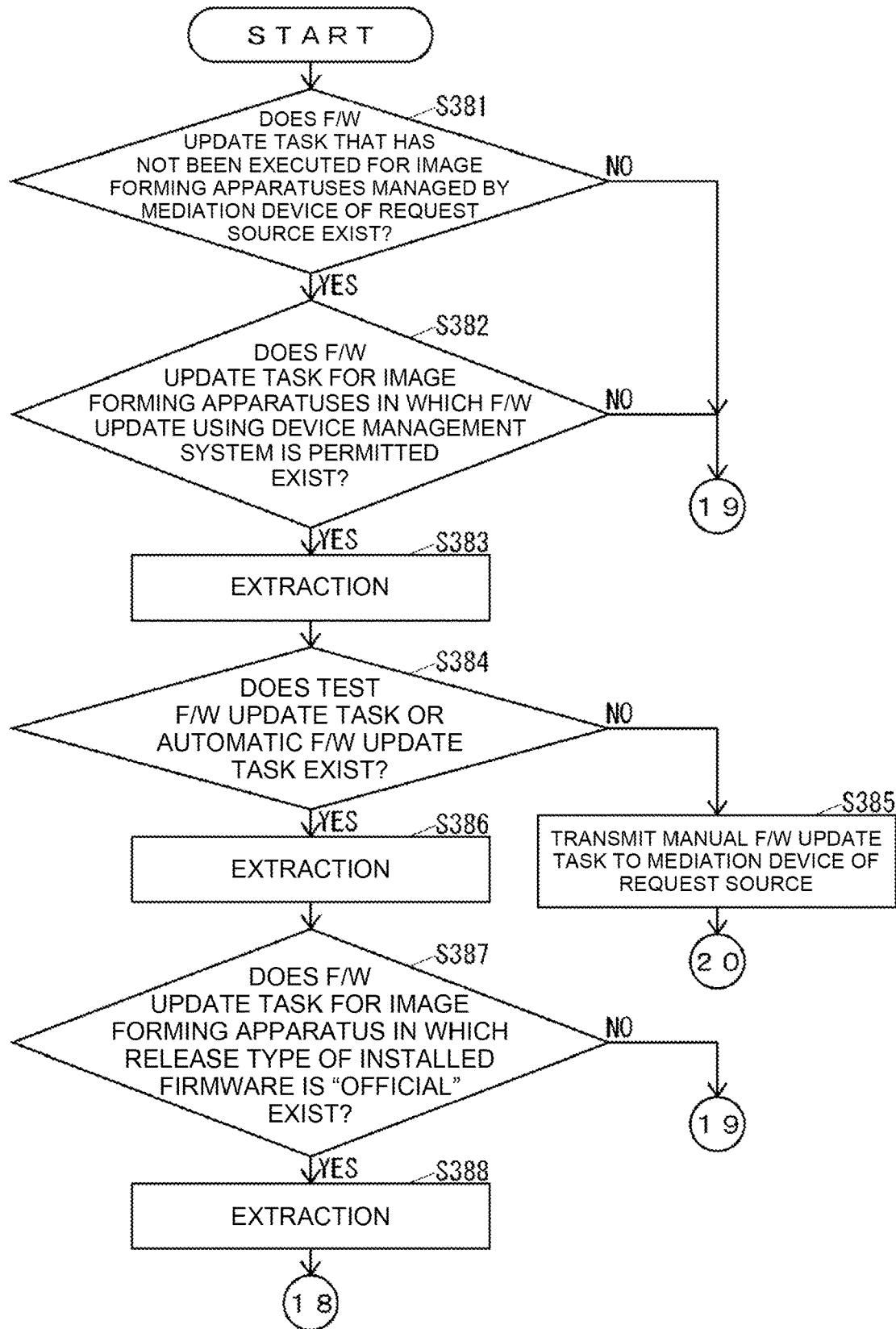
FIG. 40 is a flowchart of a portion of an operation of the device management system illustrated in FIG. 3 performed when the F/W update task is requested by the mediation device.
Figure 41:
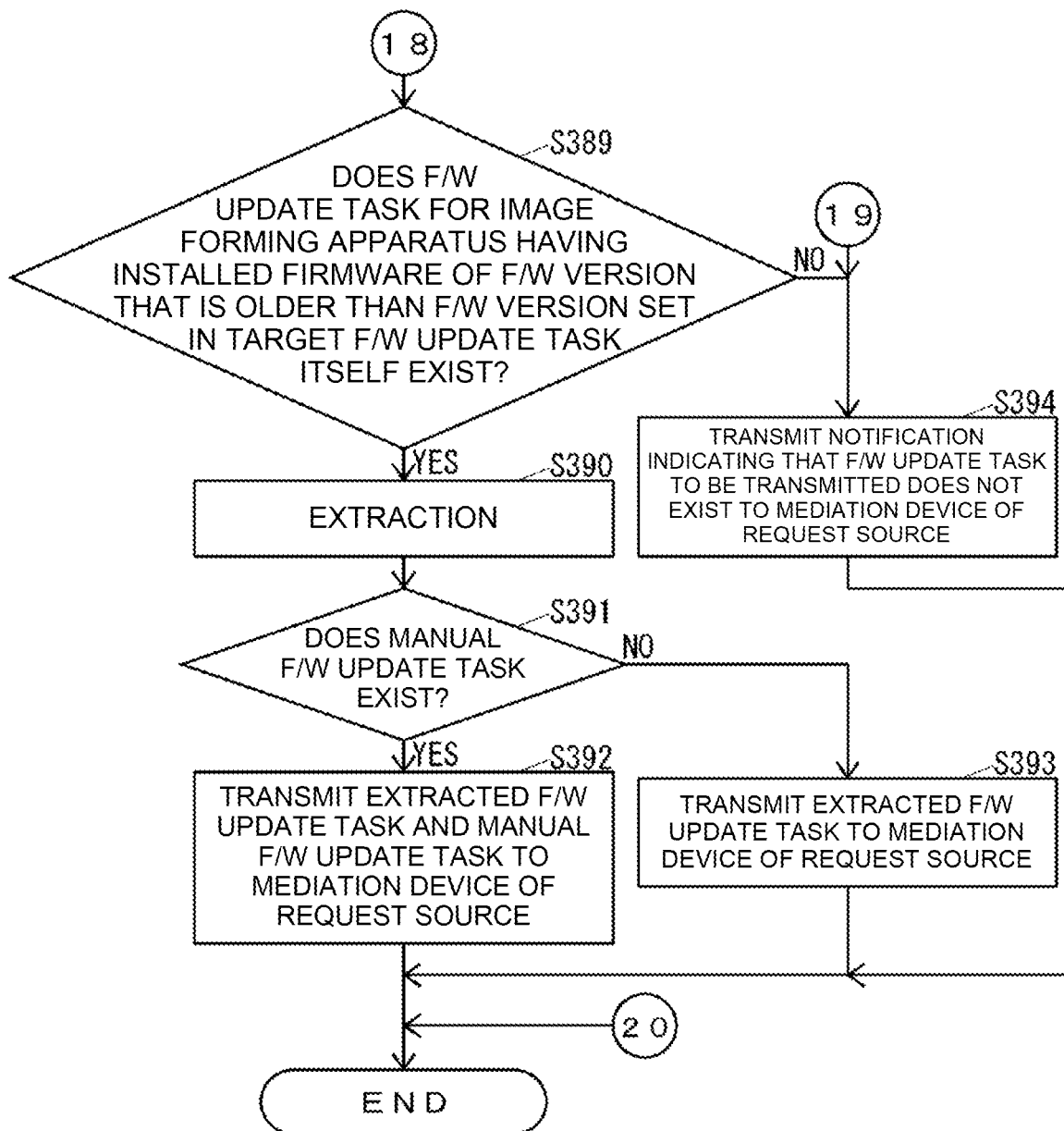
FIG. 41 is a flowchart following the flowchart of FIG. 40.

FIG. 40 is a flowchart of a portion of an operation of the device management system 20 performed when an F/W update task is requested by the mediation device. FIG. 41 is a flowchart following the flowchart of FIG. 40.

When receiving the request of the F/W update task from the mediation device, the task management section 25e of the device management system 20 executes the operation illustrated in FIGS. 40 and 41.

As shown in FIGS. 40 and 41, the task management section 25e determines whether, among F/W update tasks stored in the storage section 24, there exists an F/W update task which has not been executed on an image forming apparatus managed by the mediation device of a request source of the F/W update task (hereinafter simply referred to as a "mediation device of a request source" in the description made with reference to FIGS. 40 and 41) (S381). Here, the task management section 25e determines the image forming apparatus managed by the mediation device of the request source based on the device information 24f, and determines the F/W update task for the image forming apparatus based on the task information 24n. In addition, the task management section 25e determines an F/W update task in which a value of the item "Status" of the task information 24n is "Pending" as an unexecuted F/W update task.

When determining in step S381 that unexecuted F/W update tasks for the image forming apparatus managed by the mediation device of the request source are included in the F/W update tasks stored in the storage section 24, the task management section 25e determines whether an F/W update task for an image forming apparatus in which the F/W update using the device management system 20 is permitted is included in the unexecuted F/W update tasks for the image forming apparatus managed by the mediation device of the request source (S382). Here, the task management section 25e determines, based on the device information 24f, whether the F/W update using the device management system 20 is permitted for the image forming apparatus.

When determining in step S382 that an F/W update task for an image forming apparatus in which the F/W update using the device management system 20 is permitted is included in the unexecuted F/W update tasks for the image forming apparatuses managed by the mediation device of the request source, the task management section 25e extracts only F/W update tasks for image forming apparatuses in which the F/W update using the device management system 20 is permitted from among the unexecuted F/W update tasks for the image forming apparatuses managed by the mediation device of the request source (S383).

After the process in step S383, the task management section 25e determines whether a test F/W update task or an automatic F/W update task is included in the F/W update tasks extracted in step S383 (S384).

When determining in step S384 that a test F/W update task or an automatic F/W update task is not included in the F/W update tasks extracted in step S383, the task management section 25e transmits F/W update tasks other than test F/W update tasks or automatic F/W update tasks, that is, manual F/W update tasks, among the F/W update tasks extracted in step S383, to the mediation device of the request source (S385), and terminates the operation shown in FIGS. 40 and 41.

When determining in step S384 that a test F/W update task or an automatic F/W update task is included in the F/W update tasks extracted in step S383, the task management section 25e extracts test F/W update tasks and automatic F/W update tasks from the F/W update tasks extracted in step S383 (S386).

Subsequently, the task management section 25e determines whether F/W update tasks for an image forming apparatus whose release type of installed firmware is "Official" are included in the test F/W update tasks and the automatic F/W update tasks extracted in step S386 (S387). Here, the task management section 25e determines whether the release type of the firmware installed in the image forming apparatus is "Official" based on the device information 24f.

When determining in step S387 that F/W update tasks for the image forming apparatus whose release type of the installed firmware is "Official" are included in the test F/W update tasks and the automatic F/W update tasks extracted in step S386, the task management section 25e extracts only F/W update tasks for an image forming apparatus whose release type of the installed firmware is "Official" from among the test F/W update tasks and the automatic F/W update tasks extracted in step S386 (S388).

Subsequently, the task management section 25e determines whether F/W update tasks for an image forming apparatus whose F/W version of installed firmware is older than an F/W version set in a target F/W update task are included in the F/W update tasks extracted in step S388 (S389). Here, the task management section 25e determines whether an F/W version of firmware installed in the image forming apparatus is older than an F/W version set in the target F/W update task based on the device information 24f.

When determining in step S389 that F/W update tasks for an image forming apparatus whose F/W version of the installed firmware is older than an F/W version set in the target F/W update task are included in the F/W update tasks extracted in step S388, the task management section 25e extracts only F/W update tasks for an image forming apparatus whose F/W version of installed firmware is older than the F/W version set in the target F/W update task from among the F/W update tasks extracted in step S388 (S390).

Thereafter, the task management section 25e determines whether manual F/W update tasks are included in the F/W update tasks extracted in step S383 (S391).

When determining in step S391 that manual F/W update tasks are included in the F/W update tasks extracted in step S383, the task management section 25e transmits the F/W update tasks extracted in step S390 and the manual F/W update tasks extracted in step S383 to the mediation device of the request source (S392) and terminates the operation illustrated in FIGS. 40 and 41.

When determining in step S391 that manual F/W update tasks are not included in the F/W update tasks extracted in step S383, the task management section 25e transmits the F/W update tasks extracted in step S390 to the mediation device of the request source (S393) and terminates the operation illustrated in FIGS. 40 and 41.

When it is determined in step S381 that unexecuted F/W update tasks for the image forming apparatus managed by the mediation device of the request source are not included in the F/W update tasks stored in the storage section 24, when it is determined in step S382 that F/W update tasks for an image forming apparatus in which the F/W update using the device management system 20 is permitted are not included in the unexecuted F/W update tasks for the image forming apparatus managed by the mediation device of the request source, when it is determined in step S387 that F/W update tasks for the image forming apparatus whose F/W version of the installed firmware is older than the F/W version set in the target F/W update task are not included in the test F/W update tasks and the automatic F/W update tasks extracted in step S386, or when it is determined in step S389 that F/W update tasks for the image forming apparatus in which an F/W version of installed firmware is older than an F/W version set in the target F/W update task are not included in the F/W update tasks extracted in step S388, the task management section 25e transmits a notification indicating that an F/W update task to be transmitted does not exist to the mediation device of the request source (S394) and terminates the operation illustrated in FIGS. 40 and 41.

Note that, the task management section 25e transmits the F/W update tasks stored in the storage section 24 to the mediation device, but does not delete the F/W update tasks from the storage section 24.

As shown in FIG. 39, the F/W update section of the mediation device determines, after the process in step S362, whether a notification indicating that an F/W update task to be transmitted does not exist has been received from the device management system 20 (S363).

When determining in step S363 that the notification indicating that an F/W update task to be transmitted does not exist has not been received from the device management system 20, the F/W update section determines whether an F/W update task has been received from the device management system 20 (S364).

When determining in step S364 that an F/W update task has not been received from the device management system 20, the F/W update section executes the process in step S363.

When determining in step S364 that F/W update tasks have been received from the device management system 20, the F/W update section determines whether an F/W update task that is not stored in the storage section of the mediation device itself is included in the F/W update tasks received from the device management system 20 (S365). Here, the F/W update section identifies an F/W update task by a task ID set in the F/W update task.

When determining in step S365 that the F/W update tasks that have not been stored in the storage section of the mediation device itself are included in the F/W update tasks received from the device management system 20, the F/W update section stores F/W update tasks that have not been stored in the storage section of the mediation device itself in the storage section of the mediation device among the F/W update tasks received from the device management system 20 (S366).

When it is determined in step S363 that the notification indicating that the F/W update tasks to be transmitted are not included is received from the device management system 20, when it is determined in step S365 that F/W update tasks that have been not been stored in the storage section of the mediation device itself are not included in the F/W update tasks received from the device management system 20, or when the process in step S366 is terminated, the F/W update section executes the process in step S361.

Next, an operation of the mediation device performed when pre-printing is performed on the image forming apparatus managed by the mediation device itself will be described.

Figure 42:
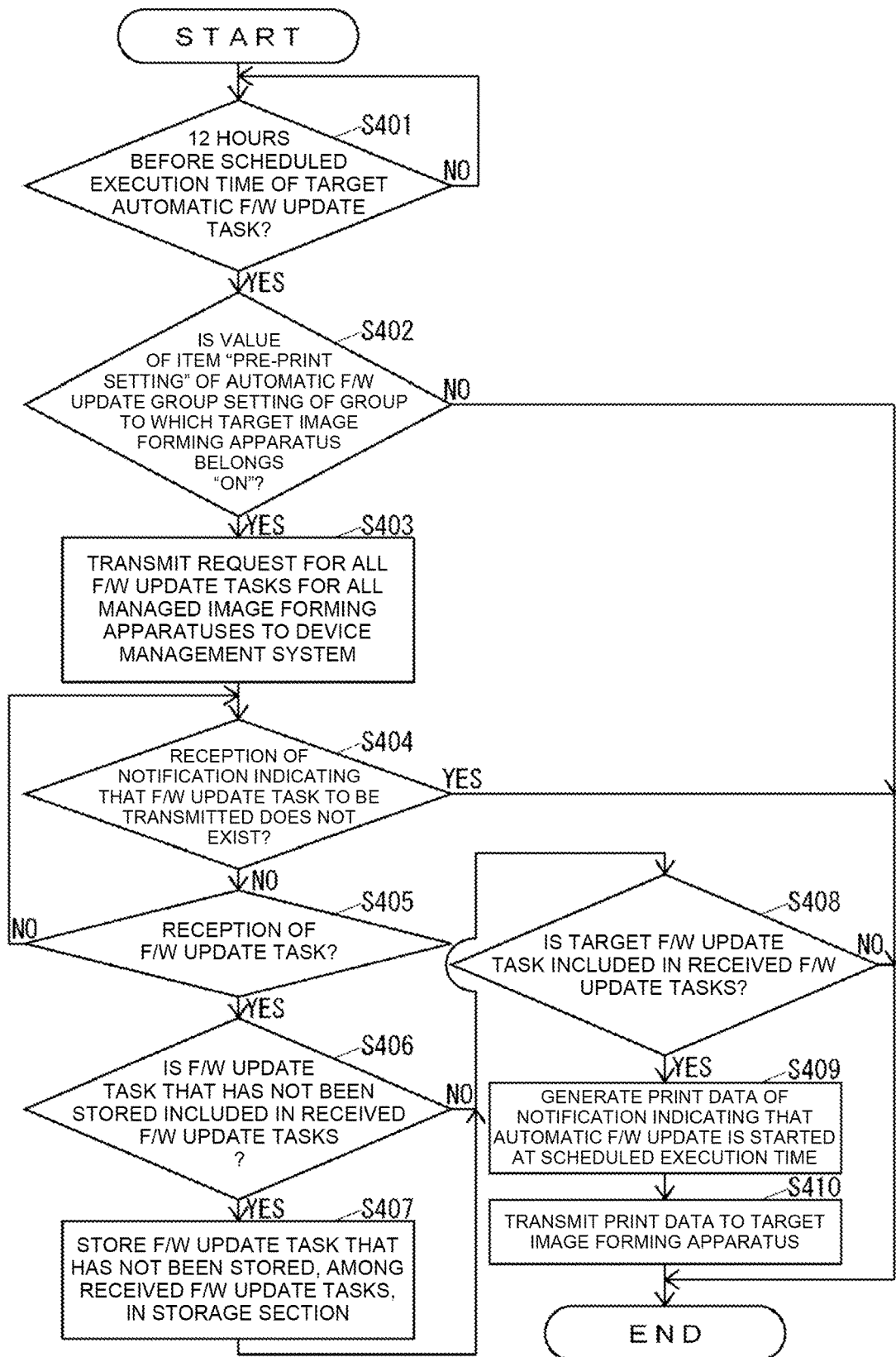
FIG. 42 is a flowchart of an operation of the mediation device illustrated in FIG. 1 performed when pre-printing is executed on an image forming apparatus managed by the mediation device.

FIG. 42 is a flowchart of an operation of the mediation device performed when pre-printing is performed on an image forming apparatus managed by itself.

The F/W update section of the mediation device executes the operation shown in FIG. 42 for each combination of an image forming apparatus managed by the mediation device itself and an automatic F/W update task stored in the storage section of the mediation device itself.

As shown in FIG. 42, until it is determined that it is 12 hours before the scheduled execution time of the automatic F/W update task of the target of the operation illustrated in FIG. 42 (hereinafter simply referred to as a "target automatic F/W update task") in the description made with reference to FIG. 42), the F/W update section determines whether it is 12 hours before the scheduled execution time of the target automatic F/W update task (S401).

When determining in step S401 that it is 12 hours before the scheduled execution time of the target automatic F/W update task, the F/W update section determines whether a value of the item "Pre-Print Setting" of the automatic F/W update group setting of the group to which the image forming apparatus of a target of the operation illustrated in FIG. 42 (hereinafter simply referred to as a "target image forming apparatus" in the description made with reference to FIG. 42) belongs is "ON" by making an inquiry to the device management system 20 (S402).

When determining in step S402 that a value of the item "Pre-Print Setting" in the automatic F/W update group setting to which the target image forming apparatus belongs is "ON", the F/W update section requests all F/W update tasks for all image forming apparatuses included in the device information stored in the mediation device itself, that is, all image forming apparatuses managed by the mediation device itself to the device management system 20 (S403). Accordingly, the task management section 25*e* of the device management system 20 executes the operation shown in FIGS. 40 and 41.

As shown in FIG. 42, the F/W update section of the mediation device determines, after the process in step S403, whether a notification indicating that any F/W update task to be transmitted does not exist has been received from the device management system 20 (S404).

When determining in step S404 that the notification indicating that an F/W update task to be transmitted does not exist has not been received from the device management system 20, the F/W update section determines whether F/W update tasks are received from the device management system 20 (S405).

When determining in step S405 that any F/W update task has not been received from the device management system 20, the F/W update section executes the process in step S404.

When determining in step S405 that the F/W update tasks have been received from the device management system 20, the F/W update section determines whether an F/W update task that is not stored in the storage section of the mediation device itself is included in the F/W update tasks received from the device management system 20 (S406). Here, the F/W update section identifies an F/W update task by a task ID set in the F/W update task.

When determining in step S406 that an F/W update task that has not been stored in the storage section of the mediation device itself is included in the F/W update tasks received from the device management system 20, the F/W update section stores the F/W update task that has not been stored in the storage section of the mediation device itself in the storage section of the mediation device among the F/W update tasks received from the device management system 20 (S407).

When determining in step S406 that an F/W update task that has not been stored in the storage section of the mediation device itself is not included in the F/W update tasks received from the device management system 20 or when the process in step S407 is terminated, the F/W update section 45*a* determines whether a target automatic F/W update task is included in the F/W update tasks received from the device management system 20 (S408). Here, the F/W update section identifies an F/W update task by a task ID set in an F/W update task.

When determining in step S408 that a target automatic F/W update task is included in the F/W update tasks received from the device management system 20, the F/W update section generates print data of a notification indicating that execution of the F/W update in the automatic F/W update is to be started at the scheduled execution time of the target automatic F/W update task (S409). Here, the F/W update section inquires a language indicated in the item "Language Setting" of the automatic F/W update group setting of the group to which the target image forming apparatus belongs to the device management system 20 and uses the language returned as a response from the device management system 20 as a language of the notification in step S409.

After the process in step S409, F/W update section transmits the print data generated in step S409 to the target image forming apparatus (S410).

Note that, even when the transmission in step S410 fails or even when printing performed by the target image forming apparatus based on the print data transmitted in step S410 fails, the F/W update section does not transmit the print data generated in step S409 to the target image forming apparatus again.

When it is determined in step S402 that a value of the item "Pre-Print Setting" in the automatic F/W update group setting of the group to which the target image forming apparatus belongs is not "ON", when it is determined in step S404 that the notification indicating that an F/W update task to be transmitted does not exist is received from the device management system 20, when it is determined in step S408 that the target automatic F/W update task is not included in the F/W update tasks received from the device management system 20, or when the process in step S410 is terminated, the F/W update section terminates the operation illustrated in FIG. 42.

Next, an operation of the mediation device performed when an automatic F/W update task is to be executed on an image forming apparatus managed by the mediation device itself will be described.

Figure 43:
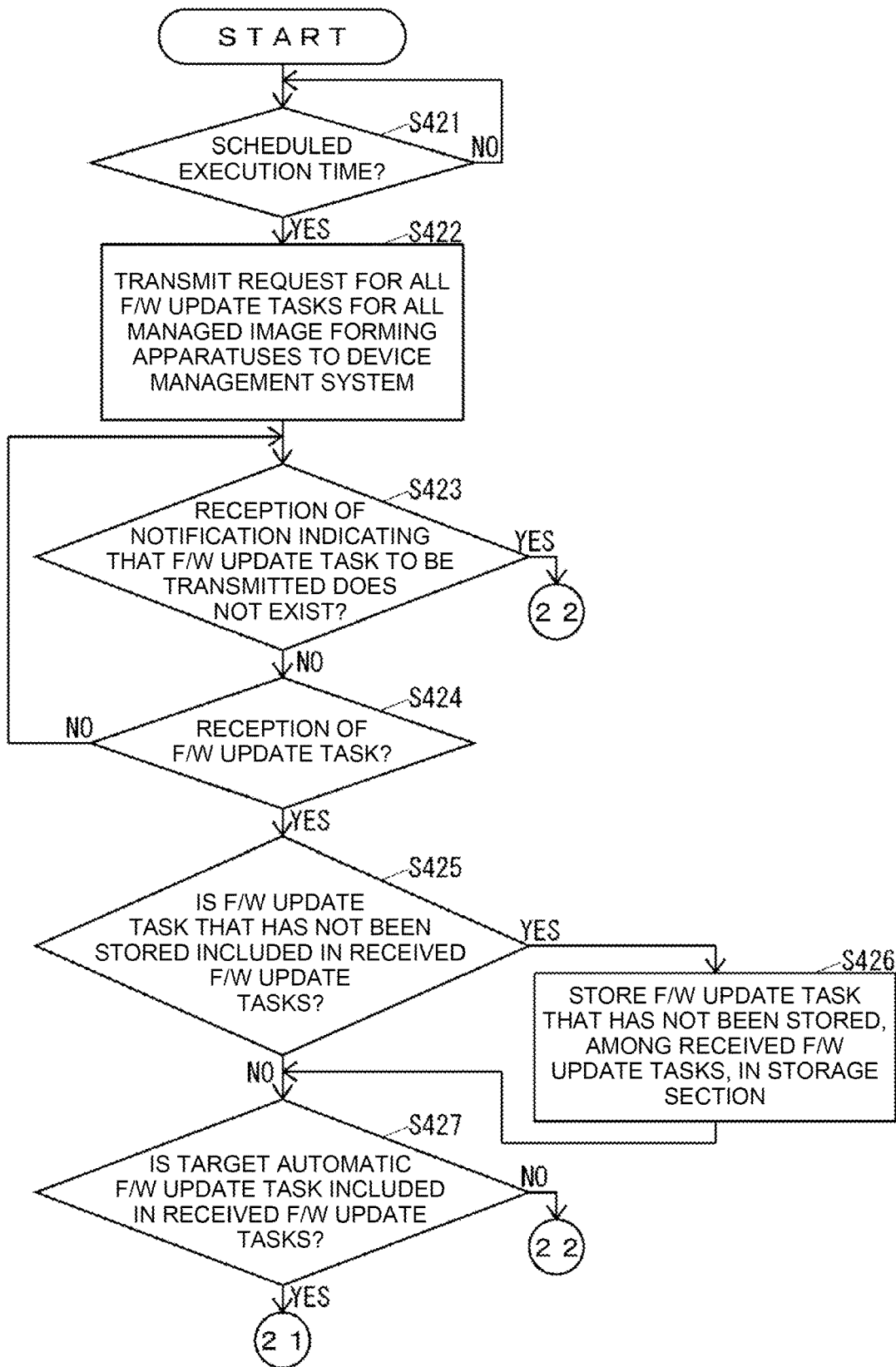
FIG. 43 is a flowchart of a portion of an operation of the mediation device illustrated in FIG. 1 performed when the automatic F/W update task is executed on the image forming apparatus managed by the mediation device.
Figure 44:
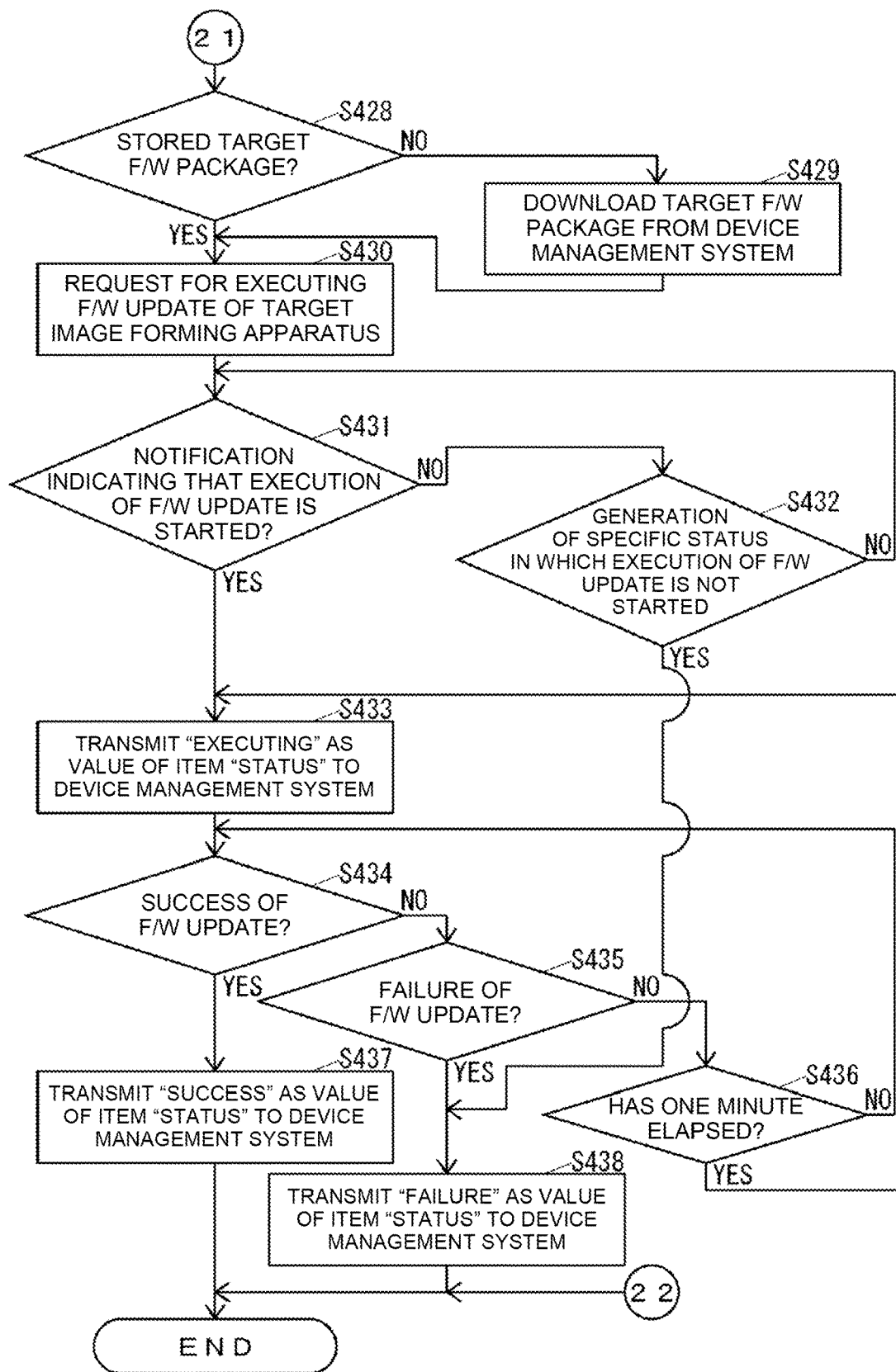
FIG. 44 is a flowchart following the flowchart of FIG. 43.

FIG. 43 is a flowchart of a portion of an operation of the mediation device performed when the automatic F/W update task is to be performed on an image forming apparatus managed by the mediation device itself. FIG. 44 is a flowchart following the flowchart of FIG. 43.

The F/W update section of the mediation device executes the operation shown in FIGS. 43 and 44 for each automatic F/W update task stored in the storage section of the mediation device itself.

As shown in FIGS. 43 and 44, until it is determined that the scheduled execution time set in an automatic F/W update task of the target of the operation illustrated in FIGS. 43 and 44 (hereinafter simply referred to as a "target automatic F/W update task" in the description made with reference to FIGS. 43 and 44) has been reached, the F/W update section of the mediation device determines whether the scheduled execution time set in the target automatic F/W update task has been reached (S421).

When determining in step S421 that the scheduled execution time set in the target automatic F/W update task has been reached, the F/W update section requests all F/W update tasks for all image forming apparatuses included in the device information stored in the mediation device itself, that is, all image forming apparatuses managed by the mediation device itself, to the device management system 20 (S422). Accordingly, the task management section 25*e* of the device management system 20 executes the operation shown in FIGS. 40 and 41.

As shown in FIGS. 43 and 44, the F/W update section of the mediation device determines, after the process in step S422, whether a notification indicating that an F/W update task to be transmitted does not exist has been received from the device management system 20 (S423).

When determining in step S423 that the notification indicating that an F/W update task to be transmitted does not exist has not been received from the device management system 20, the F/W update section determines whether an F/W update task is received from the device management system 20 (S424).

When determining in step S424 that an F/W update task has not been received from the device management system 20, the F/W update section executes the process in step S423.

When determining in step S424 that the F/W update tasks have been received from the device management system 20, the F/W update section determines whether the F/W update task that is not stored in the storage section of the mediation device itself is included in the F/W update tasks received from the device management system 20 (S425). Here, the F/W update section identifies an F/W update task by a task ID set in an F/W update task.

When determining in step S425 that the F/W update tasks that have not been stored in the storage section of the mediation device itself are included in the F/W update tasks received from the device management system 20, the F/W update section 45a stores F/W update tasks that have not been stored in the storage section of the mediation device itself in the storage section of the mediation device among the F/W update tasks received from the device management system 20 (S426).

When determining in step S425 that the F/W update tasks that have not been stored in the storage section of the mediation device itself are not included in the F/W update tasks received from the device management system 20 or when the process in step S426 is terminated, the F/W update section determines whether the target automatic F/W update task is included in the F/W update tasks received from the device management system 20 (S427). Here, the F/W update section identifies an F/W update task by a task ID set in an F/W update task.

When determining in step S427 that the target F/W update task is included in the F/W update tasks received from the device management system 20, the F/W update section determines whether an F/W package (hereinafter referred to as a "target F/W package" in the description made with reference to FIGS. 43 and 44) identified by a package ID set in the target automatic F/W update task has been stored in the storage section of the mediation device itself (S428).

When determining in step S428 that the target F/W package is not stored in the storage section of the mediation device itself, the F/W update section downloads a target F/W package from the device management system 20 using a link for package downloading that is set in the target automatic F/W update task (S429). That is, the F/W update section acquires the target F/W package from the device management system 20, and stores the acquired F/W package in the storage section of the mediation device itself.

When determining in step S428 that the target F/W package has been stored in the storage section of the mediation device itself or when the process in step S429 is terminated, the F/W update section requests execution of the F/W update to an image forming apparatus of a target of the target automatic F/W update task (hereinafter simply referred to as a "target image forming apparatus" in the description made with reference to FIGS. 43 and 44) using the target F/W package stored in the storage section of the mediation device itself (S430). Note that the image forming apparatus may not start execution of the F/W update in certain cases, such as a case where printing is being executed.

After the process in step S430, the F/W update section determines whether the target image forming apparatus has notified the F/W update section of start of the execution of the F/W update (S431). For example, when the image forming apparatus is performing printing and the printing is terminated, the image forming apparatus starts execution of the F/W update and notifies the mediation device of the start of execution of the F/W update.

When determining in step S431 that the target image forming apparatus has not notified the F/W update section of the start of the execution of the F/W update, the F/W update section determines whether a specific situation for not starting the execution of the F/W update in the target image forming apparatus has occurred (S432).

When determining in step S432 that a specific situation for not starting the execution of the F/W update in the target image forming apparatus has not occurred, the F/W update section 45a executes the process in step S431.

When determining in step S431 that the image forming apparatus has notified the F/W update section of the start of the execution of the F/W update, the F/W update section transmits "Executing" as a value of the item "Status" of the task information 24n in the target automatic F/W update task to the device management system 20 (S433).

After the process in step S433, the F/W update section determines whether the F/W update requested to be executed in step S430 has been successfully performed (S434). Here, the F/W update section may determine in step S434 that the F/W update requested to be performed in step S430 has been successfully performed, when the F/W update section receives the notification indicating that the F/W update requested to be executed in step S430 has been successfully performed from the target image forming apparatus.

When determining in step S434 that the F/W update requested to be performed in step S430 has not been successfully performed, the F/W update section determines whether the F/W update requested to be executed in step S430 has failed (S435). Here, the F/W update section may determine in step S435 that the F/W update requested to be performed in step S430 has failed, when the F/W update section receives the information indicating that the F/W update requested to be executed in step S430 has failed from the target image forming apparatus.

When determining in step S435 that the F/W update requested to be performed in step S430 has not failed, the F/W update section 45a determines whether one minute has elapsed after an immediately-preceding transmission of "Executing" as a value of the item "Status" of the task information in the target automatic F/W update task to the device management system 20 (S436).

When determining in step S436 that one minute has not elapsed after the immediately-preceding transmission of "Executing" to the device management system 20 as a value of the item "Status" of the task information in the target automatic F/W update task, the F/W update section executes the process in step S434.

When determining in step S436 that one minute has elapsed after the immediately-preceding transmission of "Executing" to the device management system 20 as a value of the item "Status" of the task information in the target automatic F/W update task, the F/W update section executes the process in step S433.

When determining in step S434 that the F/W update requested to be performed in step S430 has been successfully performed, the F/W update section transmits "Success" as a value of the item "Status" of the task information in the target automatic F/W update task, to the device management system 20 (S437).

When it is determined in step S432 that a specific situation for not starting execution of the F/W update in the target image forming apparatus has occurred or when it is determined in step S435 that the F/W update that has requested to be performed in step S430 has failed, the F/W update section transmits "Failure" as a value of the item "Status" of the task information in the target automatic F/W update task to the device management system 20 (S438).

When it is determined in step S423 that the notification indicating that an F/W update task to be transmitted is not included is received from the device management system 20, when it is determined in step S427 that the target automatic F/W update task is not included in the F/W update tasks received from the device management system 20, or when the process in step S437 or step S438 is terminated, the F/W update section terminates the operation illustrated in FIGS. 43 and 44.

In the foregoing description, the operation of the mediation device performed when the F/W update section executes the automatic F/W update task on the mediation image forming apparatus has been described.

The F/W update section executes a test F/W update task on the mediation image forming apparatus in the same manner as the automatic F/W update task performed on the mediation image forming apparatus. Here, since a specific scheduled execution time is not set for the test F/W update task, the F/W update section immediately determines that the scheduled execution time set for the test F/W update task has been reached with respect to the test F/W update task stored in the storage section of the mediation device itself.

Furthermore, the F/W update section executes a manual F/W update task on the mediation image forming apparatus in the same manner as the automatic F/W update task performed on the mediation image forming apparatus.

Next, an operation of the device management system 20 performed when a value is set to the item "Status" in the task information 24n of the F/W update task for an mediation image forming apparatus will be described.

Figure 45:
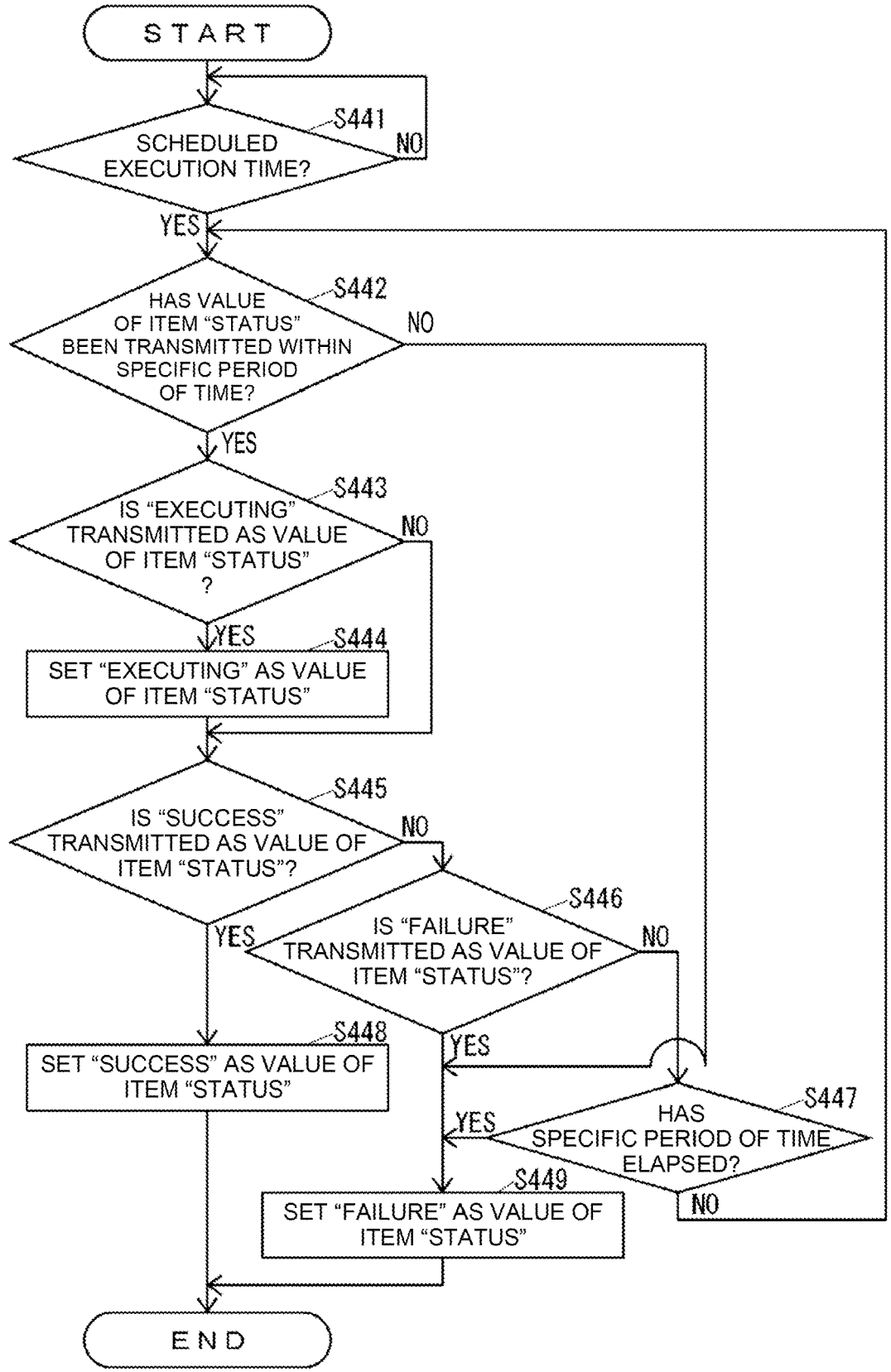
FIG. 45 is a flowchart of an operation of the device management system illustrated in FIG. 3 performed when a value is set to an item "Status" in task information of a F/W update task for a mediation image forming apparatus.

FIG. 45 is a flowchart of an operation of the device management system 20 performed when a value is set to the item "Status" in the task information 24n of an F/W update task for the mediation image forming apparatus.

The task management section 25e of the device management system 20 executes the operation illustrated in FIG. 45 for each F/W update task for the mediation image forming apparatus.

As shown in FIG. 45, until it is determined that a scheduled execution time set in an F/W update task of a target of the operation illustrated in FIG. 45 (hereinafter simply referred to as a "target F/W update task" in the description made with reference to FIG. 45) has been reached, the F/W task management section 25e determines whether the scheduled execution time set in the target F/W update task has been reached (S441).

When determining in step S441 that the scheduled execution time set in the target F/W update task has been reached, the F/W update section 45a determines whether a value of the item "Status" of the task information has been transmitted from the mediation device within a specific period of time after the scheduled execution time set in the target F/W update task (S442). Here, the specific period of time is, for example, 30 minutes.

When determining in step S442 that a value of the item "Status" of the task information has been transmitted from the mediation device within the specific period of time after the scheduled execution time set for the target F/W update task, the F/W update section 45a determines whether "Executing" has been transmitted from the mediation device as a value of the item "Status" of the task information for the target F/W update task (S443).

When determining in step S443 that "Executing" has been transmitted from the mediation device as a value of the item "Status" of the task information for the target F/W update task, the task management section 25e sets "Executing" as a value of the item "Status" of the task information 24n for the target F/W update task (S444).

When it is determined in step S443 that "Executing" has not been transmitted from the mediation device as a value of the item "Status" of the task information for the target F/W update task or when the process in step S444 is terminated, the task management section 25e determines whether "Success" has been transmitted from the mediation device as a value of the item "Status" of the task information for the target F/W update task (S445).

When determining in step S445 that "Success" has not been transmitted from the mediation device as a value of the item "Status" of the task information for the target F/W update task, the task management section 25e determines whether "Failure" has been transmitted from the mediation device as a value of the item "Status" of the task information for the target F/W update task (S446).

When determining in step S446 that "Failure" has not been transmitted from the mediation device as a value of the item "Status" of the task information for the target F/W update task, the task management section 25e determines whether a specific period of time has elapsed after "Executing" has been lately transmitted from the mediation device as a value of the item "Status" of the task information for the target F/W update task (S447). Here, the specific period of time is a time exceeding one minute, which is a determination criterion for the process in step S436 process, such as 10 minutes.

When determining in step S447 that the specific period of time has not elapsed after "Executing" is transmitted from the mediation device as a value of the item "Status" of the task information for the target automatic F/W update task, the task management section 25e executes the process in step S442.

When determining in step S445 that "Success" has been transmitted from the mediation device as a value of the item "Status" of the task information for the target F/W update task, the task management section 25e sets "Success" as a value of the item "Status" of the task information 24n for the target F/W update task (S448).

When it is determined in step S442 that the value of the item "Status" of the task information has not been transmitted from the mediation device for the specific period of time after the scheduled execution time set for the target F/W update task, when it is determined in step S446 that "Failure" has been transmitted from the mediation device as a value of the item "Status" of the task information for the target F/W update task, or when it is determined in step S447 that the specific period of time has elapsed after "Executing" is lately transmitted from the mediation device as the value of the item "Status" of the task information, the task management section 25e sets "Failure" as a value of the item "Status" of the task information 24n for the target F/W update task (S449).

When the process in step S448 or step S449 is terminated, the task management section 25e terminates the operation illustrated in FIG. 45.

Next, an operation of the device management system 20 performed when progress of the F/W update in accordance with the automatic F/W update plan is to be displayed will be described.

Figures 46, 47:
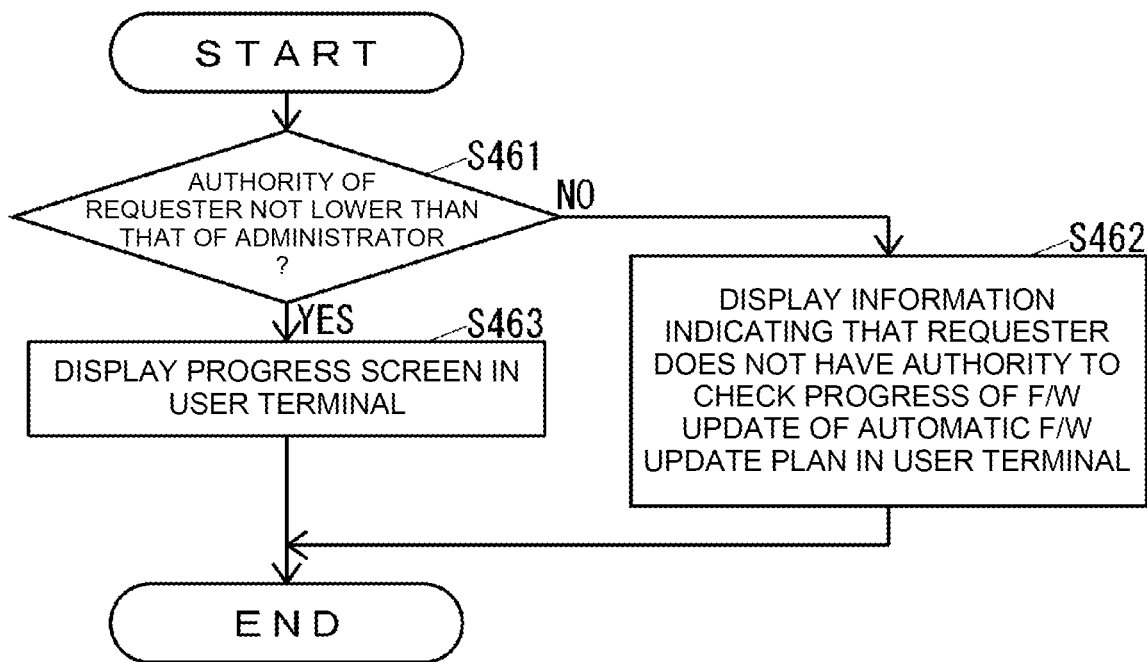
FIG. 46 is a flowchart of an operation of the device management system illustrated in FIG. 3 performed when progress of the F/W update in accordance with the automatic F/W update plan is displayed.
FIG. 47 is a diagram illustrating an example of a progress screen displayed in the user terminal in the operation illustrated in FIG. 46.

FIG. 46 is a flowchart of an operation of the device management system 20 performed when progress of the F/W update in accordance with the automatic F/W update plan is displayed.

A user who is logging into the device management system 20 may specify a specific automatic F/W update plan and transmit a request (hereinafter referred to as a "progress confirmation request") for confirming progress of the F/W update based on the automatic F/W update plan to the device management system 20 through a user terminal (hereinafter referred to as a "target user terminal" in a description made with reference to FIG. 46). When receiving the progress confirmation request, the automatic update section 25*d* of the device management system 20 performs the operation shown in FIG. 46.

As shown in FIG. 46, the automatic update section 25*d* determines whether authority of the user who has transmitted the progress confirmation request (hereinafter referred to as a "requester" in the description of FIG. 46) is not lower than that of an administrator based on a user ID of the requester and the authorization information 24*c* in the same manner as in the process in step S125 (S461).

When determining in step S461 that the authority of the requester is lower than that of an administrator, the automatic update section 25*d* causes the target user terminal to display information indicating that the requester does not have authority to confirm the progress of the F/W update in accordance with the automatic F/W update plan (S462) and terminates the operation shown in FIG. 46.

When determining in step S461 that the authority of the requester is not lower than that of an administrator, the automatic update section 25*d* transmits data on a screen (hereinafter referred to as a "progress screen") for displaying the progress of the F/W update in accordance with the automatic F/W update plan that is a target of the progress confirmation request to the target user terminal so as to cause the target user terminal to display the progress screen (S463), and then terminates the operation illustrated in FIG. 46.

FIG. 47 is a diagram illustrating an example of a progress screen 820 displayed in the user terminal in the operation illustrated in FIG. 46.

As shown in FIG. 47, the progress screen 820 includes an item "Success" indicating the number of image forming apparatuses that have been successfully subjected to the F/W update based on the automatic F/W update plan, an item "Skip" indicating the number of image forming apparatuses that have skipped the F/W update based on the automatic F/W update plan, an item Failure" indicating the number of image forming apparatuses that have failed to update F/W based on the automatic F/W update plan, an item "Not Target" indicating the number of image forming apparatuses that are not a target of the F/W update based on the automatic F/W update plan, an item "Execution Waiting" indicating the number of image forming apparatuses that are waiting for execution of the F/W update based on the automatic F/W update plan, and an item "Total" indicating the number of target image forming apparatuses of the automatic F/W update plan.

Next, an operation of the device management system 20 performed when the progress screen 820 is updated will be described.

Figure 48:
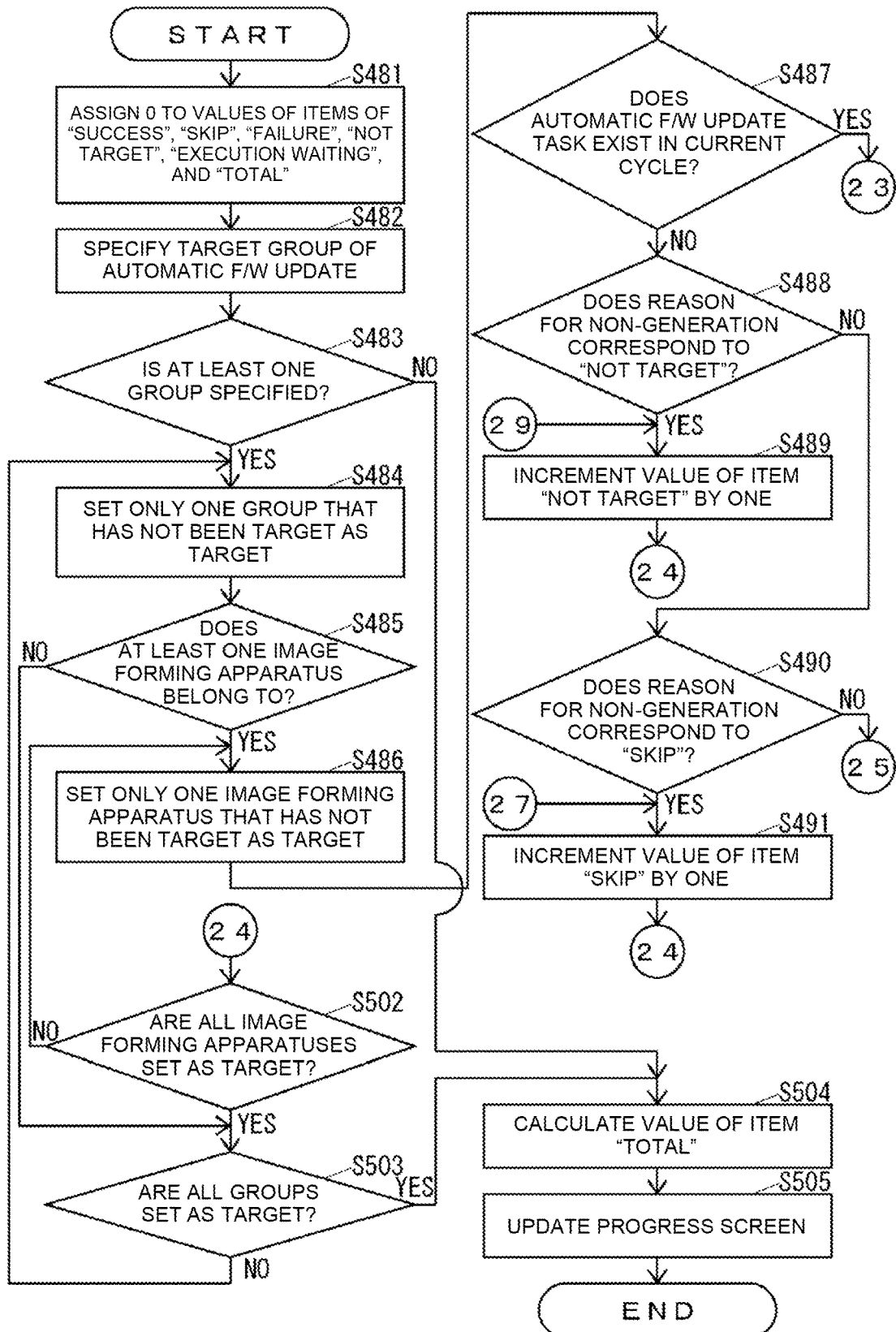
FIG. 48 is a flowchart of a portion of an operation of the device management system illustrated in FIG. 3 performed when the progress screen is updated.
Figure 49:
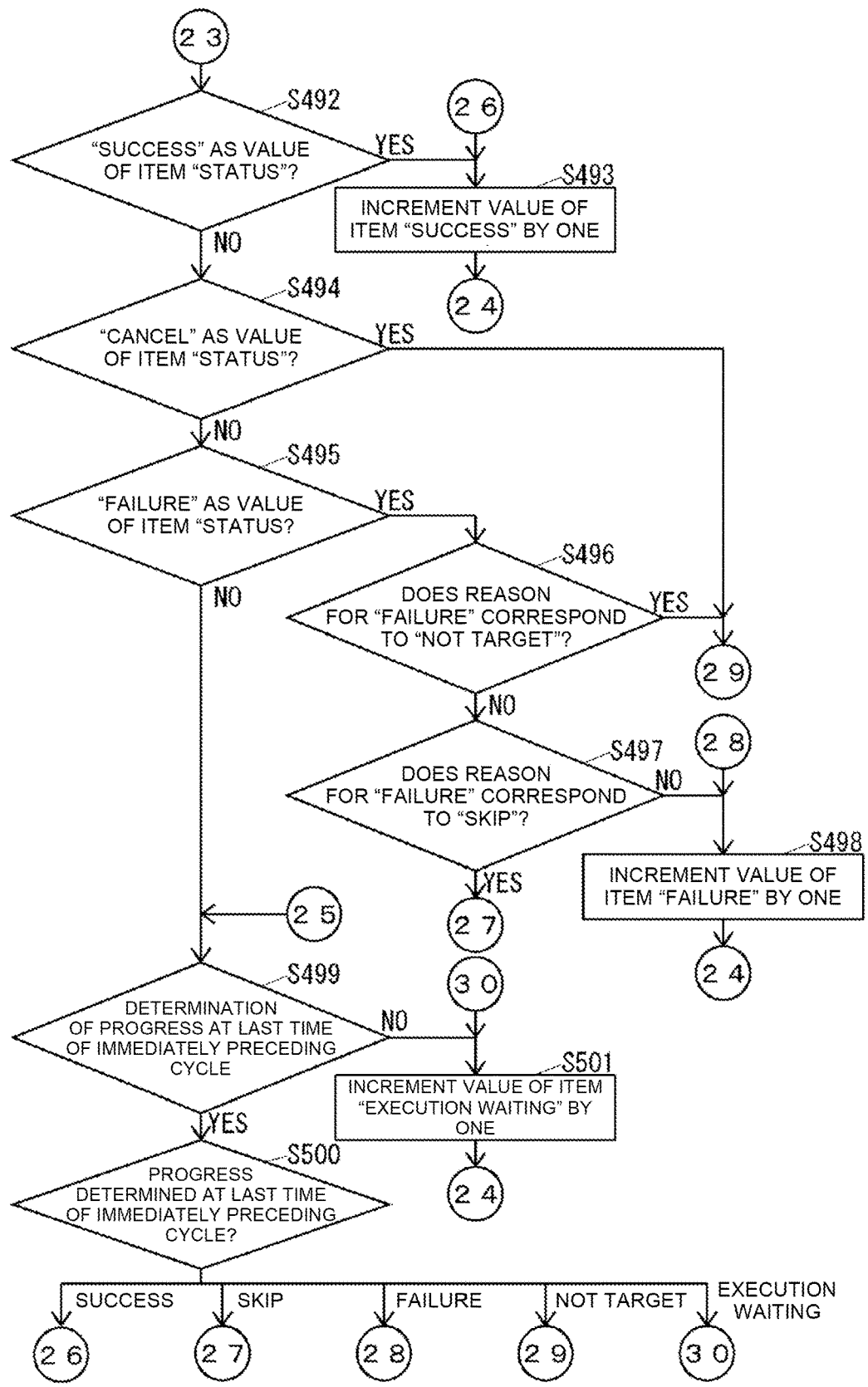
FIG. 49 is a flowchart following the flowchart of FIG. 48.

FIG. 48 is a flowchart of a portion of an operation of the device management system 20 performed when the progress screen 820 is updated. FIG. 49 is a flowchart following the flowchart of FIG. 48.

The automatic update section 25*d* updates the progress displayed on the progress screen 820 on at least a daily basis. The automatic update section 25*d* executes the operation shown in FIGS. 48 and 49 at a timing when the progress screen 820 is updated.

As shown in FIGS. 48 and 49, the automatic update section 25*d* sets the individual values of the item "Success", the item "Skip", the item "Failure", the item "Not Target", the item "Execution Waiting", and the item "Total" to 0 (S481).

Subsequently, the automatic update section 25*d* specifies target groups of the automatic F/W update in accordance with the target automatic F/W update plan based on information indicated in the item "Target Group" in the automatic F/W update plan of a target of the progress screen 820 (hereinafter simply referred to as a "target automatic F/W update plan" in the description made with reference to FIGS. 48 and 49) (S482).

Thereafter, the automatic update section 25*d* determines whether at least one group has been specified in step S482 (S483).

When determining in step S483 that at least one group has been specified in step S482, the automatic update section 25*d* targets only one group which has not yet been targeted in the operation performed this time in FIGS. 48 and 49 among the groups specified in step S482 (S484).

Thereafter, the automatic update section 25*d* determines whether at least one image forming apparatus belongs to the current target group (S485).

When determining in step S485 that one or more image forming apparatuses belong to the current target group, the automatic update section 25*d* targets only one image forming apparatus which has not been targeted in the operation performed this time in FIGS. 48 and 49 among the image forming apparatuses which belong to the current target group (S486).

Subsequently, the automatic update section 25*d* determines whether an automatic F/W update task is included in a current cycle for the image forming apparatus of the current target (S487).

When determining in step S487 that an automatic F/W update task is not included in the current cycle for the current target image forming apparatus, the automatic update section 25*d* determines whether a reason that an automatic F/W update task is not generated in the current cycle for the current target image forming apparatus corresponds to "Not Target" (S488). Here, examples of the reason corresponding to "Not Target" include a reason that a value of the item "Automatic F/W Update Setting" in the automatic F/W update group setting of the current target group is "OFF", a reason that a value of the item "Automatic F/W Update Setting" is "Select" and a value of the item "Plan Permitted/Prohibited" for the target automatic F/W update plan is "Prohibited" in the automatic F/W update group setting for the current target group, a reason that the F/W update using the device management system 20 is not permitted for the current target image forming apparatus, and a reason that a release type of firmware installed in the current target image forming apparatus is not "Official".

When determining in step S488 that a reason that an automatic F/W update task in the current cycle for the current target image forming apparatus is not generated corresponds to "Not Target", the automatic update section 25*d* increments a value of the item "Not Target" by one (S489). In other words, the automatic update section 25*d* determines that current progress of the F/W update based on the target automatic F/W update plan is "Not Target" for the current target image forming apparatus.

When determining in step S488 that a reason that an automatic F/W update task is not generated in the current cycle for the current target image forming apparatus does not correspond to "Not Target", the automatic update section 25*d* determines whether a reason that an automatic F/W update task is not generated in the current cycle for the current target image forming apparatus corresponds to "Skip" (S490). Here, examples of the reason correspond to "Skip" include a reason that an F/W version of firmware installed in the current target image forming apparatus is not older than an F/W version set in a target automatic F/W update task.

When determining in step S490 that the reason that the automatic F/W update task in the current cycle for the current target image forming apparatus is not generated corresponds to "Skip", the automatic update section 25*d* increments a value of the item "Skip" by one (S491). In other words, the automatic update section 25*d* determines that current progress of the F/W update based on the target automatic F/W update plan is "Skip" for the current target image forming apparatus.

When determining in step S487 that an automatic F/W update task is included in the current cycle for the current target image forming apparatus, the automatic update section 25*d* determines whether a value of the item "Status" of the task information 24*n* of the automatic F/W update task in the current cycle for the current target image forming apparatus is "Success" (S492).

When determining in step S492 that a value of the item "Status" of the task information 24*n* of the automatic F/W update task in the current cycle for the current target image forming apparatus is "Success", the automatic update section 25*d* increments the value of the item "Success" by one (S493). In other words, the automatic update section 25*d* determines that current progress of the F/W update based on the target automatic F/W update plan is "Success" for the current target image forming apparatus.

When determining in step S492 that the value of the item "Status" of the task information 24*n* of the automatic F/W update task in the current cycle for the current target image forming apparatus is not "Success", the automatic update section 25*d* determines whether a value of the item "Status" of the task information 24*n* of the automatic F/W update task in the current cycle for the current target image forming apparatus is "Cancel" (S494).

When determining in step S494 that a value of the item "Status" of the task information 24*n* of the automatic F/W update task in the current cycle for the current target image forming apparatus is "Cancel", the automatic update section 25*d* executes the process in step S489.

When determining in step S494 that the value of the item "Status" of the task information 24*n* of the automatic F/W update task in the current cycle for the current target image forming apparatus is not "Cancel", the automatic update section 25*d* determines whether a value of the item "Status" of the task information 24*n* of the automatic F/W update task in the current cycle for the current target image forming apparatus is "Failure" (S495).

When determining in step S495 that the value of the item "Status" of the task information 24*n* of the automatic F/W update task in the current cycle for the current target image forming apparatus is "Failure", the automatic update section 25*d* determines whether a reason that the value of the item "Status" of the task information 24*n* of the automatic F/W update task in the current cycle for the current target image forming apparatus is "Failure" corresponds to "Not Target" (S496). Here, examples of the reason corresponding to "Not Target" include a reason that a value of the item "Automatic F/W Update Setting" in the automatic F/W update group setting of the current target group is "OFF", a reason that a value of the item "Automatic F/W Update Setting" is "Select" and a value of the item "Plan Permitted/Prohibited" for the target automatic F/W update plan is "Prohibited" in the automatic F/W update group setting for the current target group, a reason that the F/W update using the device management system 20 is not permitted for the current target image forming apparatus, a reason that a release type of firmware installed in the current target image forming apparatus is not "Official", and a reason that the target image forming apparatus is set such that the image forming apparatus is temporarily connected to the device management system 20 only at a timing when the image forming apparatus transmits information on the image forming apparatus, such as the number of copies, to the device management system 20.

When determining in step S496 that a reason that a value of the item "Status" of the task information 24*n* of the automatic F/W update task in the current cycle for the current target image forming apparatus is "Failure" corresponds to "Not Target", the automatic update section 25*d* executes the process in step S489.

When determining in step S496 that a reason that the value of the item "Status" of the task information 24*n* of the automatic F/W update task in the current cycle for the current target image forming apparatus is "Failure" does not correspond to "Not Target", the automatic update section 25*d* determines whether a reason that the value of the item "Status" of the task information 24*n* of the automatic F/W update task in the current cycle for the current target image forming apparatus is "Failure" corresponds to "Skip" (S497). Here, examples of the reason correspond to "Skip" include a reason that an F/W version of firmware installed in the current target image forming apparatus is not older than an F/W version set in a target automatic F/W update task.

When determining in step S497 that a reason that a value of the item "Status" of the task information 24*n* of the automatic F/W update task in the current cycle for the current target image forming apparatus is "Failure" corresponds to "Skip", the automatic update section 25*d* executes the process in step S491.

When determining in step S497 that a reason that a value of the item "Status" of the task information 24*n* of the automatic F/W update task in the current cycle for the current target image forming apparatus is "Failure" does not correspond to "Skip", the automatic update section 25*d* increments the value of the item "Failure" by one (S498). In other words, the automatic update section 25*d* determines that current progress of the F/W update based on the target automatic F/W update plan is "Failure" for the current target image forming apparatus.

When it is determined in step S490 that a reason that the automatic F/W update task is not generated in the current cycle for the current target image forming apparatus does not correspond to "Skip" or it is determined in step S495 that the value of the "Status" of the task information 24*n* of the automatic F/W update task in the current cycle for the current target image forming apparatus is not "Failure", the automatic update section 25*d* determines whether progress of the F/W update based on the target automatic F/W update plan has been determined at an end of an immediately-preceding cycle of the current target image forming apparatus (S499).

When determining in step S499 that the progress of the F/W update based on the target automatic F/W update plan is determined at the end of the immediately preceding cycle of the current target image forming apparatus, the automatic update section 25*d* determines, among "Success", "Skip", "Failure", "Not Target", and "Execution Waiting", the progress determined at the end of the immediately-preceding cycle of the F/W update based on the target automatic F/W update plan for the current target image forming apparatus (S500).

When determining in step S500 that the progress determined at the end of the immediately-preceding cycle of the F/W update based on the target automatic F/W update plan for the current target image forming apparatus corresponds to "Success", the automatic update section 25d executes the process in step S493.

When determining in step S500 that the progress determined at the end of the immediately-preceding cycle of the F/W update based on the target automatic F/W update plan for the current target image forming apparatus corresponds to "Skip", the automatic update section 25d executes the process in step S491.

When determining in step S500 that the progress determined at the end of the immediately-preceding cycle of the F/W update based on the target automatic F/W update plan for the current target image forming apparatus corresponds to "Failure", the automatic update section 25d executes the process in step S498.

When determining in step S500 that the progress determined at the end of the immediately-preceding cycle of the F/W update based on the target automatic F/W update plan for the current target image forming apparatus corresponds to "Not Target", the automatic update section 25d executes the process in step S489.

When it is determined in step S499 that the progress of the F/W update based on the target automatic F/W update plan is not determined at the end of the immediately-preceding cycle for the current target image forming apparatus or when it is determined in step S500 that the progress determined at the end of the immediately-preceding cycle of the F/W update based on the target automatic F/W update plan is "Execution Waiting" with respect to the current target image forming apparatus, the automatic update section 25d increments a value of the item "Execution Waiting" by one (S501). In other words, the automatic update section 25d determines that current progress of the F/W update based on the target automatic F/W update plan is "Execution Waiting" for the current target image forming apparatus.

When the process in step S489, step S491, step S493, step S498 or step S501 is terminated, the automatic update section 25d determines whether all the image forming apparatuses belonging to the current target group have been targeted (S502).

When determining in step S502 that at least one of the image forming apparatuses belonging to the current target group has not been targeted, the automatic update section 25d executes the process in step S486.

When it is determined in step S485 that no image forming apparatus belongs to the current target group or when it is determined in step S502 that all the image forming apparatuses belonging to the current target group have been targeted, the automatic update section 25d determines whether all the groups specified in step S482 have been targeted (S503).

When determining in step S503 that at least one of the groups specified in step S482 has not been targeted, the automatic update section 25d executes the process in step S484.

When it is determined in step S483 that none of the groups is specified in step S482, or when it is determined in step S503 that all the groups specified in step S482 have been targeted, the automatic update section 25d calculates a value of the item "Total" by adding a current value of the item "Success", a current value of the item "Skip", a current value of the item "Failure", a current value of the item "Not Target", and a current value of the item "Execution Waiting" (S504).

Thereafter, the automatic update section 25d updates the progress screen 820 using the current value of the item "Success", the current value of the item "Skip", the current value of the item "Failure", the current value of the item "Not Target", the current value of the item "Execution Waiting", and the current value of the item "Total" (S505), and then terminates the operation shown in FIGS. 48 and 49.

FIG. 50 is a diagram illustrating an example of a change in the progress displayed in the progress screen 820.

In the example shown in FIG. 50, the progress is updated on a daily basis. In FIG. 50, the cycle of execution of the automatic F/W update task is shown up to a third time. In the example shown in FIG. 50, a mode of the automatic F/W update is "Quick Update", and therefore, each of the cycles corresponds to one week, i.e. seven days.

The first day in the first cycle in the example shown in FIG. 50 will now be described. A number shown in the item "Success" of the progress screen 820 is "2" because the execution of automatic F/W update tasks of image forming apparatuses A and E in the first cycle is successfully performed (YES in step S492) (S493). A number shown in the item "Skip" of the progress screen 820 is "0" because there is no image forming apparatus corresponding to the item "Skip" in the image forming apparatuses managed by the device management system 20 (S481). A number shown in the item "Failure" of the progress screen 820 is "0" because there is no image forming apparatus corresponding to the item "Failure" in the image forming apparatuses managed by the device management system 20 (S481). A number shown in the item "Not Target" of the progress screen 820 is "1" because the F/W update using the device management system 20 is not permitted for the image forming apparatus F (YES in step S488) (S489). A number shown in the item "Execution Waiting" of the progress screen 820 is "4" because the automatic F/W update tasks of image forming apparatuses B, C, G, and H have not yet been executed (NO in step S499) (S501). Therefore, a number shown in the item "Total" of the progress screen 820 is "7" (S504). Note that an image forming apparatus D is not yet managed by the device management system 20, and therefore, a status thereof is not reflected in the progress screen 820.

The second day in the first cycle in the example shown in FIG. 50 will be described. A number shown in the item "Success" of the progress screen 820 is "3" because the execution of the automatic F/W update tasks of the image forming apparatuses A, B, and E in the first cycle is successfully performed (YES in step S492) (S493). A number shown in the item "Skip" of the progress screen 820 is "0" because there is no image forming apparatus corresponding to the item "Skip" in the image forming apparatuses managed by the device management system 20 (S481). A number shown in the item "Failure" of the progress screen 820 is "0" because there is no image forming apparatus corresponding to the item "Failure" in the image forming apparatuses managed by the device management system 20 (S481). A number shown in the item "Not Target" of the progress screen 820 is "1" because the F/W update using the device management system 20 is not permitted for the image forming apparatus F (YES in step S488) (S489). A number shown in the item "Execution Waiting" in the progress screen 820 is "3" because the automatic F/W update tasks of the image forming apparatuses C, G, and H have not yet been executed (NO in step S499) (S501). Therefore, a number shown in the item "Total" of the progress screen 820 is "7" (S504). Note that the image forming apparatus D is not yet managed by the device management system 20, and therefore, a status thereof is not reflected in the progress screen 820.

The third day in the first cycle in the example shown in FIG. 50 will be described. A number shown in the item "Success" of the progress screen 820 is "3" because the execution of the automatic F/W update tasks of the image forming apparatuses A, B, and E in the first cycle is successfully performed (YES in step S492) (S493). A number shown in the item "Skip" of the progress screen 820 is "0" because there is no image forming apparatus corresponding to the item "Skip" in the image forming apparatuses managed by the device management system 20 (S481). A number shown in the item "Failure" of the progress screen 820 is "1" because the execution of the automatic F/W update task of an image forming apparatus C in the first cycle has failed (NO in step S497) (S498). A number shown in the item "Not Target" in the progress screen 820 is "2" because the F/W update using the device management system 20 is not permitted to be performed on the image forming apparatus F (YES in step S488) and a release type of firmware installed in the image forming apparatus H is not "Official" (YES in step S496) (S489). A number shown in the item "Execution Waiting" in the progress screen 820 is "1" because the automatic F/W update task of the image forming apparatus G has not yet been executed (NO in step S499) (S501). Therefore, a number shown in the item "Total" of the progress screen 820 is "7" (S504). Note that the image forming apparatus D is not yet managed by the device management system 20, and therefore, a status thereof is not reflected in the progress screen 820.

The fourth day in the first cycle in the example shown in FIG. 50 will be described. On the fourth day in the first cycle, the F/W update using the device management system 20 is permitted to the image forming apparatus F. However, since it is in the middle of the first cycle, an automatic F/W update task for the image forming apparatus F is not newly generated. A number shown in the item "Success" of the progress screen 820 is "3" because the execution of the automatic F/W update tasks of the image forming apparatuses A, B, and E in the first cycle is successfully performed (YES in step S492) (S493). A number shown in the item "Skip" in the progress screen 820 is "1" because an F/W version of firmware installed in the image forming apparatus G is newer than an F/W version set in a target automatic F/W update task (YES in step S497) (S491). A number shown in the item "Failure" in the progress screen 820 is "1" because the execution of the automatic F/W update task of the image forming apparatus C in the first cycle has failed (NO in step S497) (S498). A number shown in the item "Not Target" in the progress screen 820 is "1" because a release type of firmware installed in the image forming apparatus H is not "Official" (YES in step S496) (S489). A number shown in the item "Execution Waiting" in the progress screen 820 is "1" because the automatic F/W update task of the image forming apparatus F has not yet been executed (NO in step S499) (S501). Therefore, a number shown in the item "Total" of the progress screen 820 is "7" (S504). Note that the image forming apparatus D is not yet managed by the device management system 20, and therefore, a status thereof is not reflected in the progress screen 820.

The fifth day in the first cycle in the example shown in FIG. 50 will be described. On the fifth day in the first cycle, the image forming apparatus D is newly managed by the device management system 20. However, since it is in the middle of the first cycle, an automatic F/W update task for the image forming apparatus D is not newly generated. A number shown in the item "Success" of the progress screen 820 is "3" because the execution of the automatic F/W update tasks of the image forming apparatuses A, B, and E in the first cycle is successfully performed (YES in step S492) (S493). A number shown in the item "Skip" in the progress screen 820 is "1" because an F/W version of firmware installed in the image forming apparatus G is newer than an F/W version set in a target automatic F/W update task (YES in step S497) (S491). A number shown in the item "Failure" of the progress screen 820 is "1" because the execution of the automatic F/W update task of the image forming apparatus C in the first cycle has failed (NO in step S497) (S498). A number shown in the item "Not Target" in the progress screen 820 is "1" because a release type of firmware installed in the image forming apparatus H is not "Official" (YES in step S496) (S489). A number shown in the item "Execution Waiting" in the progress screen 820 is "2" because the automatic F/W update tasks have not yet been performed in the image forming apparatuses D and F (NO in step S499) (S501). Therefore, a number shown in the item "Total" of the progress screen 820 is "8" (S504).

The progress screen 820 for the sixth day and the seventh day in the first cycle in the example shown in FIG. 50 is the same as that in the progress screen 820 for the fifth day in the first cycle.

The first day in the second cycle in the example shown in FIG. 50 will be described. A number shown in the item "Success" in the progress screen 820 is "2" because the last progress of the image forming apparatuses B and E in the first cycle is "Success" (YES in step S500) although the automatic F/W update task has not been executed on the image forming apparatuses B and E in the second cycle (S493). A number shown in the item "Skip" in the progress screen 820 is "2" because the F/W version of the firmware installed in the image forming apparatus A is the same as the F/W version set in the target automatic F/W update task (YES in step S497), and the F/W version of the firmware installed in the image forming apparatus G is newer than the F/W version set in the target automatic F/W update task (YES in step S497) (S491). A number shown in the item "Failure" in the progress screen 820 is "1" because the last progress of the image forming apparatus C in the first cycle is "Failure" ("Failure" in step S500) although the automatic F/W update task of the image forming apparatus C has not yet been executed in the second cycle (S498). A number shown in the item "Not Target" in the progress screen 820 is "1" because the last progress of the image forming apparatus H in the first cycle is "Not Target" ("Not Target" in step S500) although the automatic F/W update task has not yet been executed in the image forming apparatus H in the second cycle (S489). A number shown in the item "Execution Waiting" in the progress screen 820 is "2" because the last progress of the image forming apparatuses D and F in the first cycle is "Execution Waiting" ("Execution Waiting" in step S500) although the automatic F/W update task has not been executed on the image forming apparatuses D and F in the second cycle (S501). Therefore, a number shown in the item "Total" of the progress screen 820 is "8" (S504).

The second day in the second cycle in the example shown in FIG. 50 will be described. A number shown in the item "Success" in the progress screen 820 is "1" because the last progress of the image forming apparatus E in the first cycle is "Success" ("Success" in step S500) although the automatic F/W update task has not yet been executed in the image forming apparatus E in the second cycle (S493). A number shown in the item "Skip" in the progress screen 820 is "3" because the F/W versions of the firmware installed in the image forming apparatuses A and B are the same as the F/W version set in the target automatic F/W update task (YES in step S497), and the F/W version installed in the image forming apparatus G is newer than the F/W version set in the target automatic F/W update task (YES in step S497) (S491). A number shown in the item "Failure" in the progress screen 820 is "1" because the last progress of the image forming apparatus C in the first cycle is "Failure" ("Failure" in step S500) although the automatic F/W update task of the image forming apparatus C has not yet been executed in the second cycle (S498). A number shown in the item "Not Target" in the progress screen 820 is "1" because a release type of firmware installed in the image forming apparatus H is not "Official" (YES in step S496) (S489). A number shown in the item "Execution Waiting" in the progress screen 820 is "2" because the last progress of the image forming apparatuses D and F in the first cycle is "Execution Waiting" ("Execution Waiting" in step S500) although the automatic F/W update task has not been executed on the image forming apparatuses D and F in the second cycle (S501). Therefore, a number shown in the item "Total" of the progress screen 820 is "8" (S504).

The third day in the second cycle in the example shown in FIG. 50 will be described. A number shown in the item "Success" in the progress screen 820 is "3" because the automatic F/W update tasks are successfully performed in the image forming apparatuses C and D in the second cycle (YES in step S492) and the last progress of the image forming apparatus E in the first cycle is "Success" ("Success" in step S500) although the automatic F/W update task has not yet been executed in the image forming apparatus E in the second cycle (S493). A number shown in the item "Skip" in the progress screen 820 is "3" because the F/W versions of the firmware installed in the image forming apparatuses A and B are the same as the F/W version set in the target automatic F/W update task (YES in step S497), and the F/W version installed in the image forming apparatus G is newer than the F/W version set in the target automatic F/W update task (YES in step S497) (S491). A number shown in the item "Failure" of the progress screen 820 is "0" because there is no image forming apparatus corresponding to the item "Failure" in the image forming apparatuses managed by the device management system 20 (S481). A number shown in the item "Not Target" in the progress screen 820 is "1" because a release type of firmware installed in the image forming apparatus H is not "Official" (YES in step S496) (S489). A number shown in the item "Execution Waiting" in the progress screen 820 is "1" because the last progress of the image forming apparatus F in the first cycle is "Execution Waiting" ("Execution Waiting" in step S500) although the automatic F/W update task has not yet been executed in the image forming apparatus F in the second cycle (S501). Therefore, a number shown in the item "Total" of the progress screen 820 is "8" (S504).

The fourth day in the second cycle in the example shown in FIG. 50 will be described. A number shown in the item "Success" of the progress screen 820 is "3" because the automatic F/W update tasks are successfully performed in the image forming apparatuses C, D, and F in the second cycle (YES in step S492) (S493). A number shown in the item "Skip" in the progress screen 820 is "4" because the F/W versions of the firmware installed in the image forming apparatuses A, B, and E are the same as the F/W version set in the target automatic F/W update task (YES in step S497), and the F/W version installed in the image forming apparatus G is newer than the F/W version set in the target automatic F/W update task (YES in step S497) (S491). A number shown in the item "Failure" of the progress screen 820 is "0" because there is no image forming apparatus corresponding to the item "Failure" in the image forming apparatuses managed by the device management system 20 (S481). A number shown in the item "Not Target" in the progress screen 820 is "1" because a release type of firmware installed in the image forming apparatus H is not "Official" (YES in step S496) (S481). A number shown in the item "Execution Waiting" in the progress screen 820 is "0" because there is no image forming apparatus corresponding to the item "Execution Waiting" in the image forming apparatuses managed by the device management system 20 (S481). Therefore, a number shown in the item "Total" of the progress screen 820 is "8" (S504).

The progress screen 820 for the fifth day to the seventh day in the second cycle in the example shown in FIG. 50 is the same as the progress screen 820 for the fourth day in the second cycle.

The first day in the third cycle in the example shown in FIG. 50 will be described. A number shown in the item "Success" in the progress screen 820 is "2" because the last progress of the image forming apparatuses C and D in the second cycle is "Success" ("Success" in step S500) although the automatic F/W update task has not yet been executed in the image forming apparatuses C and D in the third cycle (S493). A number shown in the item "Skip" in the progress screen 820 is "5" because the last progress of the image forming apparatuses A, B, and E in the second cycle is "Skip" ("Skip" in step S500) although the automatic F/W update tasks have not yet been executed in the image forming apparatuses A, B, and E in the third cycle, the F/W version of the firmware installed in the image forming apparatus F is the same as the F/W version set in the target automatic F/W update task (YES in step S497), and the F/W version installed in the image forming apparatus G is newer than the F/W version set in the target automatic F/W update task (YES in step S497) (S491). A number shown in the item "Failure" of the progress screen 820 is "0" because there is no image forming apparatus corresponding to the item "Failure" in the image forming apparatuses managed by the device management system 20 (S481). A number shown in the item "Not Target" in the progress screen 820 is "1" because the last progress of the image forming apparatus H in the second cycle is "Not Target" ("Not Target" in step S500) although the automatic F/W update task has not yet been executed in the image forming apparatus H in the third cycle (S489). A number shown in the item "Execution Waiting" in the progress screen 820 is "0" because there is no image forming apparatus corresponding to the item "Execution Waiting" in the image forming apparatuses managed by the device management system 20 (S481). Therefore, a number shown in the item "Total" of the progress screen 820 is "8" (S504).

The second day of the third cycle in the example shown in FIG. 50 will be described. A number shown in the item "Success" in the progress screen 820 is "2" because the last progress of the image forming apparatuses C and D in the second cycle is "Success" ("Success" in step S500) although the automatic F/W update task has not yet been executed in the image forming apparatuses C and D in the third cycle (S493). A number shown in the item "Skip" in the progress screen 820 is "5" because the last progress of the image forming apparatus E in the second cycle is "Skip" ("Skip" in step S500) although the automatic F/W update task has not yet been executed in the image forming apparatus E in the third cycle, the F/W versions of the firmware installed in the image forming apparatuses A, B, and F are the same as the F/W version set in the target automatic F/W update task (YES in step S497), and the F/W version installed in the image forming apparatus G is newer than the F/W version set in the target automatic F/W update task (YES in step S497) (S491). A number shown in the item "Failure" of the progress screen 820 is "0" because there is no image forming apparatus corresponding to the item "Failure" in the image forming apparatuses managed by the device management system 20 (S481). A number shown in the item "Not Target" in the progress screen 820 is "1" because a release type of firmware installed in the image forming apparatus H is not "Official" (YES in step S496) (S481). A number shown in the item "Execution Waiting" in the progress screen 820 is "0" because there is no image forming apparatus corresponding to the item "Execution Waiting" in the image forming apparatuses managed by the device management system 20 (S481). Therefore, a number shown in the item "Total" of the progress screen 820 is "8" (S504).

The third day in the third cycle in the example shown in FIG. 50 will be described. A number shown in the item "Success" in the progress screen 820 is "0" because there is no image forming apparatus corresponding to the item "Success" in the image forming apparatuses managed by the device management system 20 (S481). A number shown in the item "Skip" in the progress screen 820 is "7" because the last progress of the image forming apparatus E in the second cycle is "Skip" ("Skip" in step S500) although the automatic F/W update task has not yet been executed in the image forming apparatus E in the third cycle, the F/W versions of the firmware installed in the image forming apparatuses A, B, C, D, and F are the same as the F/W version set in the target automatic F/W update task (YES in step S497), and the F/W version of the firmware installed in the image forming apparatus G is newer than the F/W version set in the target automatic F/W update task (YES in step S497) (S491). A number shown in the item "Failure" of the progress screen 820 is "0" because there is no image forming apparatus corresponding to the item "Failure" in the image forming apparatuses managed by the device management system 20 (S481). A number shown in the item "Not Target" in the progress screen 820 is "1" because a release type of firmware installed in the image forming apparatus H is not "Official" (YES in step S496) (S481). A number shown in the item "Execution Waiting" in the progress screen 820 is "0" because there is no image forming apparatus corresponding to the item "Execution Waiting" in the image forming apparatuses managed by the device management system 20 (S481). Therefore, a number shown in the item "Total" of the progress screen 820 is "8" (S504).

The fourth day in the third cycle in the example shown in FIG. 50 will be described. A number shown in the item "Success" in the progress screen 820 is "0" because there is no image forming apparatus corresponding to the item "Success" in the image forming apparatuses managed by the device management system 20 (S481). A number shown in the item "Skip" in the progress screen 820 is "7" because the F/W versions of the firmware installed in the image forming apparatuses A to F are the same as the F/W version set in the target automatic F/W update task (YES in step S497), and the F/W version of the firmware installed in the image forming apparatus G is newer than the F/W version set in the target automatic F/W update task (YES in step S497) (S491). A number shown in the item "Failure" of the progress screen 820 is "0" because there is no image forming apparatus corresponding to the item "Failure" in the image forming apparatuses managed by the device management system 20 (S481). A number shown in the item "Not Target" in the progress screen 820 is "1" because a release type of firmware installed in the image forming apparatus H is not "Official" (YES in step S496) (S481). A number shown in the item "Execution Waiting" in the progress screen 820 is "0" because there is no image forming apparatus corresponding to the item "Execution Waiting" in the image forming apparatuses managed by the device management system 20 (S481). Therefore, a number shown in the item "Total" of the progress screen 820 is "8" (S504).

The progress screen 820 for the fifth day to the seventh day in the third cycle in the example shown in FIG. 50 is the same as the progress screen 820 for the fourth day in the third cycle.

Note that, in the example shown in FIG. 50, the progress of a plurality of image forming apparatuses whose timing of cycle updates are the same as each other are shown in order to facilitate understanding of changes in the progress shown in the progress screen 820. However, the progress screen 820 may show progress of a plurality of image forming apparatuses whose cycle update timings are different from each other.

Next, an operation of the device management system 20 performed when a list of image forming apparatuses managed by the device management system 20 itself is displayed will be described.

A user who is logging into the device management system 20 may transmit a request (hereinafter referred to as a "device list display request") for displaying a list (hereinafter referred to as a "device list") of image forming apparatuses managed by the device management system 20 to the device management system 20 via a user terminal (hereinafter referred to as a "target user terminal"). When receiving the device list display request, the device management section 25f of the device management system 20 transmits data on the device list to a target user terminal so as to cause the target user terminal to display the device list. Here, the device management section 25f adds a latest date and time when the F/W update based on the F/W update task is executed to information of each image forming apparatus in the device list.

As described above, the device management system 20 generates an automatic F/W update task for each of all the image forming apparatuses to be a target of the automatic F/W update in one mode selected from a plurality of modes (S291 to S307), so that the convenience of update of the firmware may be improved.

The device management system 20 generates an F/W update task for each of all the image forming apparatuses to be a target of the F/W update in a selected one of the following modes: the "Quick Update" mode and the "Gradual Update" mode in which a length of the first cycle in which the F/W update is fully executed for all the image forming apparatuses to be subjected to the F/W update is longer than the "Quick Update" mode and a length of the second and subsequent cycles is the same as that of the "Quick Update" mode (S291 to S307). Therefore, a user who desires to quickly execute the F/W update on all the image forming apparatuses to be subjected to the F/W update may select the "Quick Update" mode, and in addition, a user who desires to gradually execute the F/W update on all the image forming apparatuses to be subjected to the F/W update to make sure that the F/W update causes an error in the image forming apparatuses may select the "Gradual Update" mode. Consequently, convenience of the update of the firmware may be improved.

The device management system 20 generates an F/W update task for each of all the image forming apparatuses to be subjected to the F/W update in a selected one of the "Quick Update" mode and the "Gradual Update" mode (S291 to S307). In the "Quick Update" mode, a rate of the number of image forming apparatuses to be subjected to the F/W update per unit time to the number of all the image forming apparatuses to be subjected to the F/W update is not changed in all cycles in which the F/W update is fully executed on all the image forming apparatuses to be subjected to the F/W update. In the "Gradual Update" mode, a rate of the number of image forming apparatuses to be subjected to the F/W update per unit time to the number of all the image forming apparatuses to be subjected to the F/W update is increased in the first cycle and is not changed in the second cycle onwards. Accordingly, a user who desires to quickly execute the F/W update on all the image forming apparatuses to be subjected to the F/W update may select the "Quick Update" mode, and in addition, a user who desires to gradually execute the F/W update on all the image forming apparatuses to be subjected to the F/W update to make sure that the F/W update causes an error in the image forming apparatuses may select the "Gradual Update" mode. Consequently, convenience of the firmware update may be improved.

In the device management system 20, since the second and subsequent cycles have the same length in the "Quick Update" mode and the "Gradual Update" mode (S291 to S307), after it is confirmed that the F/W update does not cause a problem in the image forming apparatuses, the F/W update may be quickly performed on all the image forming apparatuses to be subjected to the F/W update, and as a result, the convenience of the firmware update may be improved.

In the device management system 20, since the rate of the number of image forming apparatuses to be subjected to the F/W update per unit time to all the image forming apparatuses to be subjected to the F/W update is not changed in the second and subsequent cycles in the "Quick Update" mode and the "Gradual Update" mode (S291 to S307), after it is confirmed that the F/W update does not cause a problem in the image forming apparatuses, the F/W update may be quickly performed on all the image forming apparatuses to be subjected to the F/W update, and as a result, the convenience of the firmware update may be improved.

The device management system 20 may generate the tasks so that the cycle is repeated. Even when the image forming apparatus that has been successfully updated in a preceding cycle is included in all the image forming apparatuses, the tasks may be generated for the individual image forming apparatuses.

The device management system 20 generates an automatic F/W update task for each of all the image forming apparatuses to be subjected to the F/W update even when the image forming apparatus that has been successfully subjected to the F/W update in a preceding cycle is included in all the image forming apparatuses to be subjected to the F/W update. Accordingly, even when firmware of another version is newly updated in the image forming apparatus in which the F/W update is successfully performed in the preceding cycle after the F/W update successfully performed, firmware of an original version is updated again in this cycle, and as a result, variation of the firmware among a plurality of image forming apparatuses may be reduced.

Furthermore, the device management system 20 repeatedly and automatically generates an automatic F/W update task at a specific timing in accordance with an automatic F/W update plan (S295 and S303). Accordingly, even when, after successful update of firmware in an image forming apparatus by one of automatic F/W update tasks repeatedly and automatically generated at a specific timing in accordance with the automatic F/W update plan, firmware of another version is newly updated in the image forming apparatus, for example, firmware of an original version may be updated again in this image forming apparatus by a subsequent automatic F/W update task repeatedly and automatically generated at the specific timing in accordance with the automatic F/W update plan. Consequently, variation of the firmware among the plurality of image forming apparatuses may be reduced.

The device management system 20 automatically generates an automatic F/W update task in accordance with an automatic F/W update plan and an automatic F/W update group setting, for each group, that specifies an automatic F/W update plan used to automatically generate an automatic F/W update task (S295 and S303). Accordingly, variation of the firmware among the plurality of image forming apparatuses that belong to the same group may be reduced.

In a case where the automatic F/W update group setting specifies that an automatic F/W update task is automatically generated in accordance with an automatic F/W update plan that is uniquely selected (YES in step S230), when an automatic F/W update plan that specifies a group of a target of the automatic F/W update group setting is generated (YES in step S228), a notification indicating the generation of the automatic F/W update plan is transmitted to a specific destination (S231), so that a user who has received the notification of the generation of the automatic F/W update plan may specify, in the automatic F/W update group setting, that an automatic F/W update task is automatically generated in accordance with the automatic F/W update plan. Consequently, the convenience of the F/W update may be improved.

When the automatic F/W update group setting is edited, the device management system 20 may accept an instruction of test update on a specific image forming apparatus by firmware specified in a specific automatic F/W update plan (YES in step S185), and execute the test in accordance with the accepted instruction (S186). Accordingly, a user may determine whether to specify automatic generation of an automatic F/W update task in accordance with the automatic F/W update plan in the automatic F/W update group setting based on a result of the test, and as a result, the convenience of the F/W update may be improved.

When an automatic F/W update task is automatically generated in accordance with the automatic F/W update plan and the automatic F/W update group setting, the device management system 20 sets a scheduled execution time of the automatic F/W update task within a time zone specified in the automatic F/W update group setting. Accordingly, the F/W update may be executed by the automatic F/W update task in a time zone in which a problem is negligible even though an image forming apparatus may not be used due to the F/W update, and as a result, the convenience of the F/W update may be improved.

When an automatic F/W update task is automatically generated in accordance with the automatic F/W update plan and the automatic F/W update group setting that specifies execution of pre-printing as a pre-output, the device management system 20 executes the pre-printing a predetermined period of time before execution of update (S338). Accordingly, a user of the image forming apparatus may recognize in advance that the image forming apparatus may not be used due to the F/W update, and as a result, the convenience of the F/W update may be improved.

Note that the device management system 20 executes the automatic F/W update task regardless of whether the pre-printing is executed and regardless of whether the pre-printing is successfully performed.

Since the device management system 20 manages progress of the F/W update based on the automatic F/W update plan (S481 to S505), the user may recognize progress of the F/W update based on the automatic F/W update plan, and as a result, the convenience of the F/W update may be improved.

The device management system 20 repeatedly and automatically generates an automatic F/W update task at a specific timing in accordance with the automatic F/W update plan and the automatic F/W update group setting. Therefore, after specifying an automatic F/W update plan and an automatic F/W update group setting, the user is not required to perform operations other than an operation of confirming progress of the F/W update based on the automatic F/W update plan, and accordingly, the convenience may be improved.

Note that, since the variation of the firmware among a plurality of image forming apparatuses is reduced, when a failure occurs in one of the plurality of image forming apparatuses, it is highly likely that a similar failure occurs in the other image forming apparatuses. Accordingly, a period of time required to investigate a cause of the failure and to cope with the failure may be reduced when compared with a configuration in which variation of firmware among a plurality of image forming apparatuses is large.

Since the device management system 20 starts generation of an automatic F/W update task from a next cycle for an image forming apparatus that newly becomes a target of the F/W update in the middle of a cycle in which the F/W update is fully executed on all image forming apparatuses to be subjected to the F/W update, management of the automatic F/W update task may be facilitated when compared with a configuration in which generation of the automatic F/W update task is started at the time when the image forming apparatus is newly subjected to the F/W update in the middle of the cycle.

Although the electronic apparatus in the present disclosure is an image forming apparatus in this embodiment, the electronic apparatus may be other than an image forming apparatus, such as the PC.

Although the software of the present disclosure is firmware in this embodiment, the software may be other than firmware, such as application software.

What is claimed is:

1. A device management system, having a hardware processor executing computer instructions to manage an electronic apparatus to update a software of the electronic apparatus,
wherein the device management system is arranged to:
present, to the electronic apparatus, a plurality of modes to update the software of the electronic apparatus, the plurality of modes being different from each other in at least one of a length of a cycle in which update of the software is fully executed on all electronic apparatuses to be subjected to the update and a rate of the number of electronic apparatuses which are subjected to the update per unit time to the number of all the electronic apparatuses, and
generate a task to update the software of the electronic apparatus in accordance with a selected one of the plurality of modes, for each of all the electronic apparatuses and execute the task to the electronic apparatus so that the electronic apparatus updates the software thereof in accordance with the selected one of the plurality of modes,
wherein the task is generated such that the cycle is repeated, and
wherein the plurality of modes include a first mode, and a second mode in which a length of a first cycle is longer than a length of a cycle of the first mode and a length of each of second and subsequent cycles is the same as the length of the cycle of the first mode.

2. The device management system according to claim 1, wherein
the plurality of modes include
a first mode, and
a second mode having a cycle longer than a cycle of the first mode.

3. The device management system according to claim 2, wherein
the rate is not changed in the cycle in the first mode, and
the rate is increased in the cycle in the second mode.

4. The device management system according to claim 1, wherein
the rate is not changed in the cycle in the first mode, and
the rate is increased in the first cycle and is not changed in the second and subsequent cycles in the second mode.

5. The device management system according to claim 1, wherein
the task is generated such that the cycle is repeated, and
even when the electronic apparatus which has been successfully updated in a preceding cycle is included in all the electronic apparatuses, the task is generated for each of all the electronic apparatuses.

6. The device management system according to claim 1, wherein
the task is generated such that the cycle is repeated, and
the generation of the task is started from a next cycle for an electronic apparatus which newly becomes a target of the update in the course of the cycle.

7. A non-transitory computer-readable storage medium storing a device management program of a device management system that manages an electronic apparatus to update a software of the electronic apparatus, the device management program causes the device management system to function
to provide, to the electronic apparatus, a plurality of modes which are different from each other in at least one of a length of a cycle in which update of software is fully executed on all electronic apparatuses to be subjected to the update and a rate of the number of electronic apparatuses which are subjected to the update per unit time to the number of all the electronic apparatuses, and
to generate a task to update the software of the electronic apparatus in accordance with a selected one of the plurality of modes, for each of all the electronic apparatuses and execute the task to the electronic apparatus so that the electronic apparatus updates the software thereof in accordance with the selected one of the plurality of modes,
wherein the task is generated such that the cycle is repeated, and wherein the plurality of modes include a first mode, and a second mode in which a length of a first cycle is longer than a length of a cycle of the first mode and a length of each of second and subsequent cycles is the same as the length of the cycle of the first mode.

8. A device management system, having a hardware processor executing computer instructions that manages an electronic apparatus to update a software of the electronic apparatus, the device management system comprising;
an automatic updater for automatically generating a task to update the software of the electronic apparatus, in accordance with an automatic update plan which includes a setting for automatically generating the task and executing the task to the electronic apparatus so that the electronic apparatus updates the software thereof in accordance with the setting included in the automatic update plan, wherein
the automatic update plan specifies the software for the update, and
the automatic updater automatically generates the task at a specific timing in a repeat manner in accordance with the automatic update plan,
wherein the automatic update plan specifies the electronic apparatus of a target of the update by specifying a group to which the electronic apparatus belongs,
the automatic updater automatically generates the task in accordance with the automatic update plan and an automatic update group setting for each group for automatically executing the update, and
the automatic update group setting specifies an automatic update plan used to automatically generate the task, and
wherein, in a case where automatic generation of the task in accordance with an automatic update plan independently selected is specified in the automatic update group setting, when the automatic update plan in which a group of a target of the automatic update group setting is specified is generated, the automatic updater notifies a specific address of the generation of the automatic update plan.

9. The device management system according to claim 8, wherein, when the automatic update group setting is edited, the automatic updater receives an instruction of a test of the update on a specific electronic apparatus by software specified in a specific automatic update plan and executes the test in accordance with the received instruction.

10. The device management system according to claim 8, wherein
the automatic update group setting specifies a time zone for starting execution of the update, and
when the task is automatically generated in accordance with the automatic update plan and the automatic update group setting, the automatic updater sets a scheduled execution time of the task within the time zone specified in the automatic update group setting.

11. The device management system according to claim 8, wherein
the automatic update group setting specifies whether pre-output in which a notification indicating that the update is to be executed is output to the electronic apparatus of the target of the update before the update is to be executed, and
when the task is automatically generated in accordance with the automatic update plan and the automatic update group setting which specifies execution of the pre-output, the automatic updater executes the pre-output a specific period of time before execution of the update.

12. The device management system according to claim 8, wherein the automatic updater manages progress of the update based on the automatic update plan.

13. A non-transitory computer-readable storage medium storing a device management program of a device management system that manages an electronic apparatus to update a software of the electronic apparatus, the device management program causing a computer to function as an automatic updater that automatically generates a task of update of software of an electronic apparatus, in accordance with an automatic update plan which includes a setting for automatically generating the task, and executes the task to the electronic apparatus so that the electronic apparatus updates the software thereof in accordance with the setting included in the automatic update plan, wherein
the automatic update plan specifies the software for the update, and
the automatic updater automatically generates the task at a specific timing in a repeat manner in accordance with the automatic update plan,
wherein the automatic update plan specifies the electronic apparatus of a target of the update by specifying a group to which the electronic apparatus belongs,
the automatic updater automatically generates the task in accordance with the automatic update plan and an automatic update group setting for each group for automatically executing the update, and
the automatic update group setting specifies an automatic update plan used to automatically generate the task, and
wherein, in a case where automatic generation of the task in accordance with an automatic update plan independently selected is specified in the automatic update group setting, when the automatic update plan in which a group of a target of the automatic update group setting is specified is generated, the automatic updater notifies a specific address of the generation of the automatic update plan.

* * * * *